United States Patent
Yanovsky et al.

(10) Patent No.: US 10,735,137 B2
(45) Date of Patent: Aug. 4, 2020

(54) DISTRIBUTED STORAGE SYSTEM DATA MANAGEMENT AND SECURITY

(71) Applicant: Datomia Research Labs OU, Tallinn (EE)

(72) Inventors: David Yanovsky, Tallinn (EE); Teimuraz Namoradze, Tallinn (EE); Vera Dmitriyevna Miloslavskaya, Saint-Petersburg (RU); Denys Smirnov, Tallinn (EE)

(73) Assignee: ClineHair Commercial Endeavors, Carrollton, TX (US)

( * ) Notice: Subject to any disclaimer, the term of this patent is extended or adjusted under 35 U.S.C. 154(b) by 414 days.

(21) Appl. No.: 15/460,093

(22) Filed: Mar. 15, 2017

(65) Prior Publication Data

US 2017/0272209 A1 Sep. 21, 2017

Related U.S. Application Data

(60) Provisional application No. 62/308,223, filed on Mar. 15, 2016, provisional application No. 62/332,002, (Continued)

(51) Int. Cl.
*H04L 1/00* (2006.01)
*G06F 12/14* (2006.01)
(Continued)

(52) U.S. Cl.
CPC .......... *H04L 1/0057* (2013.01); *G06F 3/065* (2013.01); *G06F 3/067* (2013.01); *G06F 3/0619* (2013.01);
(Continued)

(58) Field of Classification Search
None
See application file for complete search history.

(56) References Cited

U.S. PATENT DOCUMENTS 6,665,308 B1 12/2003 Rakib
6,952,737 B1 10/2005 Coates et al.
(Continued)

FOREIGN PATENT DOCUMENTS

CN 105335160 2/2016
WO WO 2014/005279 1/2014
(Continued)

OTHER PUBLICATIONS

Rizzo, L. (Apr. 1997). "Effective erasure codes for reliable computer communication protocols". ACM SIGCOM:M computer communication review, 27(2), 24-36.Retrieved from the internet on Aug. 31, 2015 <http://ccr.sigcomm.org/archive/1997/apr97/ccr-9704-rizzo.pdf> Rizzo, L. Dec. 31, 1997 (Dec. 31, 1997) Whole document.
(Continued)

*Primary Examiner* — Justin R Knapp
(74) *Attorney, Agent, or Firm* — Leason Ellis LLP

(57) ABSTRACT

A system and method for distributing data over a plurality of remote storage nodes. Data are split into segments and each segment is encoded into a number of codeword chunks. None of the codeword chunks contains any of the segments. Each codeword chunk is packaged with at least one encoding parameter and identifier, and metadata are generated for at least one file and for related segments of the at least one file. The metadata contains information to reconstruct from the segments, and information for reconstructing from corresponding packages. Further, metadata are encoded into package(s), and correspond to a respective security level and a protection against storage node failure. A plurality of packages are assigned to remote storage nodes to optimize workload distribution. Each package is transmitted to at least one respective storage node as a function iteratively
(Continued)

accessing and retrieving the packages of metadata and file data.

16 Claims, 36 Drawing Sheets

Related U.S. Application Data filed on May 5, 2016, provisional application No. 62/349,145, filed on Jun. 13, 2016, provisional application No. 62/434,421, filed on Dec. 15, 2016.

(51) Int. Cl.

| | | |
|---|---|---|
| *H03M 13/13* | (2006.01) | |
| *G06F 12/02* | (2006.01) | |
| *G06F 3/06* | (2006.01) | |
| *H03M 13/00* | (2006.01) | |
| *G06F 16/174* | (2019.01) | |
| *G06F 11/10* | (2006.01) | |
| *G06F 21/00* | (2013.01) | |
| *G06F 21/62* | (2013.01) | |
| *H04L 29/06* | (2006.01) | |
| *H04L 9/08* | (2006.01) | |
| *H04L 29/08* | (2006.01) | |
| *G06F 12/0846* | (2016.01) | |
| *H04L 9/32* | (2006.01) | |
| *H03M 13/15* | (2006.01) | |
| *H03M 13/29* | (2006.01) | |

(52) U.S. Cl.
CPC ...... *G06F 11/1076* (2013.01); *G06F 11/1088* (2013.01); *G06F 12/0253* (2013.01); *G06F 12/0848* (2013.01); *G06F 12/1408* (2013.01); *G06F 12/1466* (2013.01); *G06F 16/1752* (2019.01); *G06F 21/00* (2013.01); *G06F 21/6218* (2013.01); *H03M 13/13* (2013.01); *H03M 13/1515* (2013.01); *H03M 13/2921* (2013.01); *H03M 13/616* (2013.01); *H04L 9/0863* (2013.01); *H04L 9/0894* (2013.01); *H04L 9/3226* (2013.01); *H04L 63/0428* (2013.01); *H04L 67/1097* (2013.01); *G06F 2212/1052* (2013.01); *G06F 2212/282* (2013.01); *G06F 2212/702* (2013.01); *G06F 2221/2107* (2013.01)

(56) References Cited

U.S. PATENT DOCUMENTS

| | | | |
|---|---|---|---|
| 7,010,532 B1 | 3/2006 | Stakutis et al. | |
| 8,296,812 B1 | 10/2012 | Ganesan | |
| 8,332,375 B2 | 12/2012 | Chatley | |
| 8,442,989 B2 | 5/2013 | Massoulie et al. | |
| 8,621,318 B1 | 12/2013 | Micheloni et al. | |
| 8,935,493 B1 * | 1/2015 | Dolan | G06F 3/0649 711/117 |
| 9,104,691 B2 | 8/2015 | Resch et al. | |
| 9,864,550 B2 | 1/2018 | Song et al. | |
| 9,916,198 B2 | 3/2018 | Baker et al. | |
| 10,216,740 B2 | 2/2019 | Neporada et al. | |
| 2001/0001616 A1 | 5/2001 | Rakib | |
| 2002/0133491 A1 | 9/2002 | Sim | |
| 2003/0074486 A1 * | 4/2003 | Anastasiadis | H04L 29/06 719/321 |
| 2005/0216813 A1 * | 9/2005 | Cutts | G06F 11/1076 714/752 |
| 2007/0008847 A1 | 1/2007 | Maruyama | |
| 2007/0079083 A1 | 4/2007 | Gladwin et al. | |
| 2008/0046104 A1 | 2/2008 | Van Camp et al. | |
| 2009/0199274 A1 | 8/2009 | Frazier et al. | |
| 2009/0228763 A1 | 9/2009 | Wang | |
| 2010/0094957 A1 | 4/2010 | Zuckerman et al. | |
| 2010/0218037 A1 | 8/2010 | Swartz et al. | |
| 2010/0250497 A1 | 9/2010 | Redlich et al. | |
| 2011/0072115 A1 | 3/2011 | Gladwin et al. | |
| 2011/0106972 A1 | 5/2011 | Grube et al. | |
| 2011/0161666 A1 | 6/2011 | Gladwin et al. | |
| 2011/0219100 A1 | 9/2011 | Dhuse et al. | |
| 2012/0060072 A1 | 3/2012 | Simitci et al. | |
| 2013/0111166 A1 | 5/2013 | Resch et al. | |
| 2013/0117560 A1 | 5/2013 | Resch | |
| 2014/0351624 A1 | 11/2014 | Resch | |
| 2014/0380114 A1 | 12/2014 | Alexeev et al. | |
| 2015/0067819 A1 | 3/2015 | Shribman | |
| 2015/0256617 A1 | 9/2015 | Klose | |
| 2016/0072891 A1 | 3/2016 | Joshi | |
| 2017/0063397 A1 * | 3/2017 | Richardson | G06F 16/285 |
| 2017/0272100 A1 | 9/2017 | Yanovsky et al. | |
| 2017/0272209 A1 | 9/2017 | Yanovsky et al. | |
| 2017/0286223 A1 | 10/2017 | Baptist | |
| 2018/0018261 A1 | 1/2018 | Vekiarides et al. | |
| 2018/0018285 A9 | 1/2018 | Volvovski et al. | |

FOREIGN PATENT DOCUMENTS

| | | |
|---|---|---|
| WO | WO 2014/0102565 | 7/2014 |
| WO | WO 2015/057240 | 4/2015 |
| WO | WO 2015/0175411 | 11/2015 |
| WO | WO 2017/161050 | 9/2017 |

OTHER PUBLICATIONS

Li, Mingqiang, "On the Confidentiality of Information Dispersal Algorithms and Their Erasure Codes", Mar. 13, 2013, The Chinese University of Hong Kong, pp. 1-4.

Dimakis, A.G., et al., "Network coding for Distributed Storage Systems," IEEE Transactions of Information Theory, vol. 56, No. 9, Sep. 2010, pp. 4539-4551.

Rabin, M.O., "Efficient Dispersal of Information for Security, Load Balancing, and Fault Tolerance," Journal of the Association for Computing Machinery, vol. 36, No. 2, Apr. 1989, pp. 335-348.

Blokh, E.L., et al., Math-Net.Ru—All Russian mathematical portal, "Coding of Generalized Concatenated Codes," Problems of Information Transmission, 1974, vol. 10, No. 3, http://www.mathnet.ru/eng/agreement, pp. 218-222.

Arikan, E., "Channel Polarization: A Method for Constructing Capacity-Achieving Codes for Symmetric Binary-Input Memoryless Channels," IEEE Transactions on Information Theory, vol. 55, No. 7, Jul. 2009, pp. 3051-3073.

Zyablov, V. et al., "An Introduction to Generalized Concatenated Codes*," European Transactions on Telecommunications, vol. 10, No. 6, Nov.-Dec. 1999, pp. 609-622.

Miloslayskaya V., Trifonov P. "Design of polar codes with arbitrary kernels" Proceedings of IEEE Information Theory Workshop. Sep. 3-7, 2012. pp. 119-123.

Miloslayskaya V., Trifonov P. "Sequential Decoding of Reed-Solomon Codes" Proceedings of International Symposium on Information Theory and Applications. Oct. 26-29, 2014. pp. 424-428.

* cited by examiner

DISTRIBUTED STORAGE SYSTEM DATA MANAGEMENT AND SECURITY

CROSS-REFERENCE TO RELATED APPLICATIONS

This application is based on and claims priority to: U.S. Provisional Patent Application No. 62/308,223, filed Mar. 15, 2016; U.S. Provisional Patent Application No. 62/332,002, filed May 5, 2016; U.S. Provisional Patent Application No. 62/349,145, filed Jun. 13, 2016; and U.S. Provisional Patent Application No. 62/434,421, filed Dec. 15, 2016, the entire contents of each which is incorporated by reference as if expressly set forth in its respective entirety herein. This application further incorporates by reference U.S. Non-Provisional patent application Ser. No. 15/304,457, filed Oct. 14, 2016 as if expressly set forth in its entirety herein.

FIELD OF THE APPLICATION

The application described herein, generally, relates to distributed storage system and, more particularly, to techniques for data protection against failures in distributed storage systems.

BACKGROUND OF THE APPLICATION

Distributed storage systems play an important role in management of big data, particularly for data generated at tremendous speed. A distributed storage system may require many hardware devices, which often results in component failures that require recovery operations. Moreover, components in a distributed storage system may become unavailable, such as due to poor network connectivity or performance, without necessarily completely failing. In view that any individual storage node may become unreliable, redundancy measures are often introduced to protect data against storage node failures and outages, or other impediments. Such measures can include distributing data with redundancy over a set of independent storage nodes.

One relatively simple redundancy measure is replication. Replication, particularly triple replication, is often used in distributed storage systems to provide fast access to data. Triple replication, however, can suffer from very low storage efficiency which, as used herein, generally refers to a ratio of an amount of original data to an amount of actually stored data, i.e., data with redundancy. Error-correcting coding, and more particularly erasure coding, provides an opportunity to store data with a relatively high storage efficiency, while simultaneously maintaining an acceptable level of tolerance against storage node failure. Thus, a relatively high storage efficiency can be achieved by maximum distance separable (MDS) codes, such as, but not limited to, Reed-Solomon codes. Long MDS codes, however, can incur prohibitively high repair costs. In case of employing locally decodable codes, for example, any single storage node failure can be recovered by accessing a pre-defined number of storage nodes and by performing corresponding computations. Locally decodable codes (LDC) are designed to minimize I/O overhead. In the case of cloud storage systems, minimization of I/O overhead is especially desirable because data transmission can consume many resources, while computational complexity is less significant. In spite of promising theoretical results, the number of practical constructions of LDC codes is low. It is recognized by the inventors that some generalized concatenated codes (GCC) demonstrate a property of locality. Yet another important consideration regards bandwidth optimization, which leads to reduced latency. Regenerating codes can be used to reduce the amount of data transmitted during repair from each storage node. One drawback, however, is that advantages provided by regenerated codes are limited to partial read operations within storage system.

It is observed that requirements of error-correcting code in redundant arrays of independent disks (RAID) can be different, such as in view of computational complexity and storage efficiency. Moreover, the number of disks within a RAID is usually limited to a relatively low number, resulting in codes having a relatively small length being employed. Accordingly, array codes such as RDP, EVENODD, are not optimal for cloud storage systems and distributed storage systems, in general.

Yet another consideration of cloud storage systems is security and, more particularly, data encryption. The computation complexity of data encryption is high, unfortunately, and maintaining keys continues to be an operational issue. Alternative approaches can include mixing original data, such that any amount of original data can be reconstructed only by accessing not less than a pre-defined number of storage nodes. This pre-defined number of storage nodes is such that probability that a malicious adversary is able to access all these nodes is negligible.

SUMMARY

In one or more implementations, the present application includes a system and method for distributing data of a plurality of files over a plurality of respective remote storage nodes. This includes splitting into segments, by at least one processor configured to execute code stored in non-transitory processor readable media, the data of the plurality of files. Each segment is encoded, by the at least one processor, into a number of codeword chunks, wherein none of the codeword chunks contains any of the segments. Each codeword chunk is packaged with encoding parameters and identifiers, and the at least one processor generates metadata for at least one file of the plurality of files and metadata for related segments of the at least one file. The metadata for the at least one file contains information to reconstruct the at least one file from the segments, and metadata for the related segments contains information for reconstructing the related segments from corresponding packages. Further, the at least one processor encodes the metadata into at least one package, wherein the encoding corresponds to a respective security level and a protection against storage node failure. The at least one processor further assigns a plurality of packages to remote storage nodes, wherein the step of assigning corresponds to optimized workload distribution as a function of available network bandwidth. Each of the package is transmitted to at least one respective storage node, and at least one of the plurality of is retrieved files as a function iteratively accessing and retrieving the packages of metadata and file data.

In one or more implementations, the present application includes that the step of splitting into segments provides data within a respective segment that comprises a part of one individual file or several files.

In one or more implementations, the present application includes aggregating a plurality of files for a segment as a function of minimizing a difference between segment size and a total size of embedded files, and a likelihood of joint retrieval of embedded files.

In one or more implementations, the present application includes that the step of encoding each segment includes deduplication as a function of hash-based features of the file.

In one or more implementations, the present application includes that the step of encoding each segment includes encryption, wherein at least one segment is encrypted entirely with an individual encryption key.

In one or more implementations, the present application includes that the encryption key is generated as a function of data being encrypted.

In one or more implementations, the present application includes that each of a plurality of respective individual encryption keys is encrypted with a respective key encryption key and distributed over a respective storage node, wherein each respective key encryption key is generated using a password-based key derivation function.

In one or more implementations, the present application includes that the step of encoding each segment includes encryption, wherein at least one segment is partitioned into pieces, wherein each piece is separately encrypted, and further wherein a number of encryption keys per segment ranges from one to the number of pieces.

In one or more implementations, the present application includes that the step of encoding each segment comprises erasure coding of mixing degree S, wherein codeword chunks are produced from information chunks using a linear block error correction code, and mixing degree S requires at least S codeword chunks to reconstruct any information chunk.

In one or more implementations, the present application includes that respective erasure coding techniques are used for data segment encoding and metadata encoding, such that metadata is protected from at least storage node failure.

In one or more implementations, the present application includes that the step of assigning packages to remote storage nodes minimizes retrieval latency for a group of related segments.

In one or more implementations, the present application includes that the retrieval latency is minimized as a function of at least statistical data used to compute availability coefficients for storage nodes, wherein an availability coefficient characterizes predicted average download speed for a respective storage node.

In one or more implementations, the present application includes that retrieval latency is minimized as a function of at least availability coefficients for storage nodes and relevance coefficients for codeword positions.

In one or more implementations, the present application includes that a relevance coefficient is a function of information representing an employed erasure correction coding scheme and significance of the respective codeword position for data retrieval.

In one or more implementations, the present application includes that metadata for a file and metadata for related segments is divided into two parts, in which one part is individually packed in packages and another part is appended to packages containing respective encoded data segments.

In one or more implementations, the present application includes arranging temporary storage of file data within a local cache by: operating over compound blocks of data; dividing memory space into regions with compound blocks of equal size; employing a file structure to optimize file arrangement within the local cache; and performing garbage collection to arrange free compound blocks.

In one or more implementations, the present application includes that arranging temporary storage of file data within a local cache further includes cache optimization employing information representing a file structure.

In one or more implementations, the present application includes that cache optimization is simplified by classifying files based on respective a plurality of categories of access patterns, and employing respective cache management strategy for similarly categorized files.

In one or more implementations, the present application includes a system and method of data retrieval from remote storage nodes. This includes accessing, by at least one processor configured to execute code stored in non-transitory processor readable media, file metadata references within a local cache or within remote storage nodes. A plurality of packages are received, by the at least one processor, from remote storage nodes by metadata references, each of the packages contain file metadata. Moreover, a plurality of other packages containing encoded file segments are received, by the at least one processor, from storage nodes by data references, wherein the encoded file segments are obtained at least partly from file metadata. File data are reconstructed from the packages as a function of metadata representing parameters associated with an encoding scheme and file splitting scheme.

In one or more implementations, the present application includes that file retrieval speed is enhanced by caching metadata from a plurality of client side files.

In one or more implementations, the present application includes a system and method for erasure coding. This includes executing, by at least one processor configured to execute code stored in non-transitory processor readable media, data encoding with an error-correction code C to produce N codeword chunks. The error-correction code C of length N=tn is based on 2h component codes: h outer codes of lengths $b_i n$, $0 \le i < h$, and h inner codes of length t. The at least one processor distributes N codeword chunks over a set of storage nodes, wherein mapping of codeword chunks to storage nodes is optimized to balance network load. Further, the at least one processor reconstructs data chunks from codeword chunks requested from storage nodes, and repairs data from erased codeword chunks that are reconstructed from other codeword chunks.

In one or more implementations, the present application includes that dimensions of outer codes and length multipliers $b_i$ are selected to maximize a minimum distance of code C.

In one or more implementations, the present application includes that prior to encoding, data are partitioned into K information chunks and, further comprising encoding, by the at least one processor, metadata into at least one package, as multiplication of vectors having K elements of information chunks by K×N generator matrix of code C, wherein the generator matrix comprises a K×K sparse matrix, such that its inverse matrix is also sparse.

In one or more implementations, the present application includes that K×N generator matrix of code C comprises a matrix obtained by column and row permutations from the K×K block-diagonal matrix.

In one or more implementations, the present application includes that K×N generator matrix of code C comprises K×K block-diagonal matrix.

In one or more implementations, the present application includes that a codeword of code C comprises n groups of t elements, and further wherein any single erased codeword chunk within a group is repairable as a linear combination of other t−1 chunks of the same group.

In one or more implementations, the present application includes reconstructing erased codeword chunks by multi-stage decoding, wherein a decoding stage comprises decoding in one inner code and one outer code, and further where correction capability of employed inner codes increase with stage index and stages are terminated upon recovering of all erasures within the codeword.

In one or more implementations, the present application includes that an inner code in a subsequent stage has a higher minimum distance than an inner code employed in previous stage.

In one or more implementations, the present application includes that dimensions of outer codes $k_i$ divided by respective length multipliers $b_i$ constitute non-decreasing sequence, $k_0/b_0 \leq k_1/b_1 \leq \ldots \leq k_{h-1}/b_{h-1}$.

In one or more implementations, the present application includes that the outer codes are maximum distance separable codes.

In one or more implementations, the present application includes that the outer codes are Reed-Solomon codes.

In one or more implementations, the present application includes that inner codes are nested codes having a same length and maximized minimum distances.

In one or more implementations, the present application includes that inner codes are a maximum distance separable codes.

In one or more implementations, the present application includes that inner codes are binary linear block codes with maximum possible minimum distances $w_i$ and length multipliers $b_i$ are such that $w_0 < w_1 < \ldots < w_{h-1}$.

In one or more implementations, the present application includes that updating of several information chunks, corresponding to the same s×s submatrix of the block-diagonal matrix, results in no more than N−K+s updated codeword chunks, where N is the length and K is the dimension of employed error-correction code.

In one or more implementations, the present application includes retrieval of several information chunks, corresponding to the same s×s submatrix of the block-diagonal matrix requires s codeword chunks to be downloaded from storage nodes.

DETAILED DESCRIPTION OF EMBODIMENT

Figure 1:
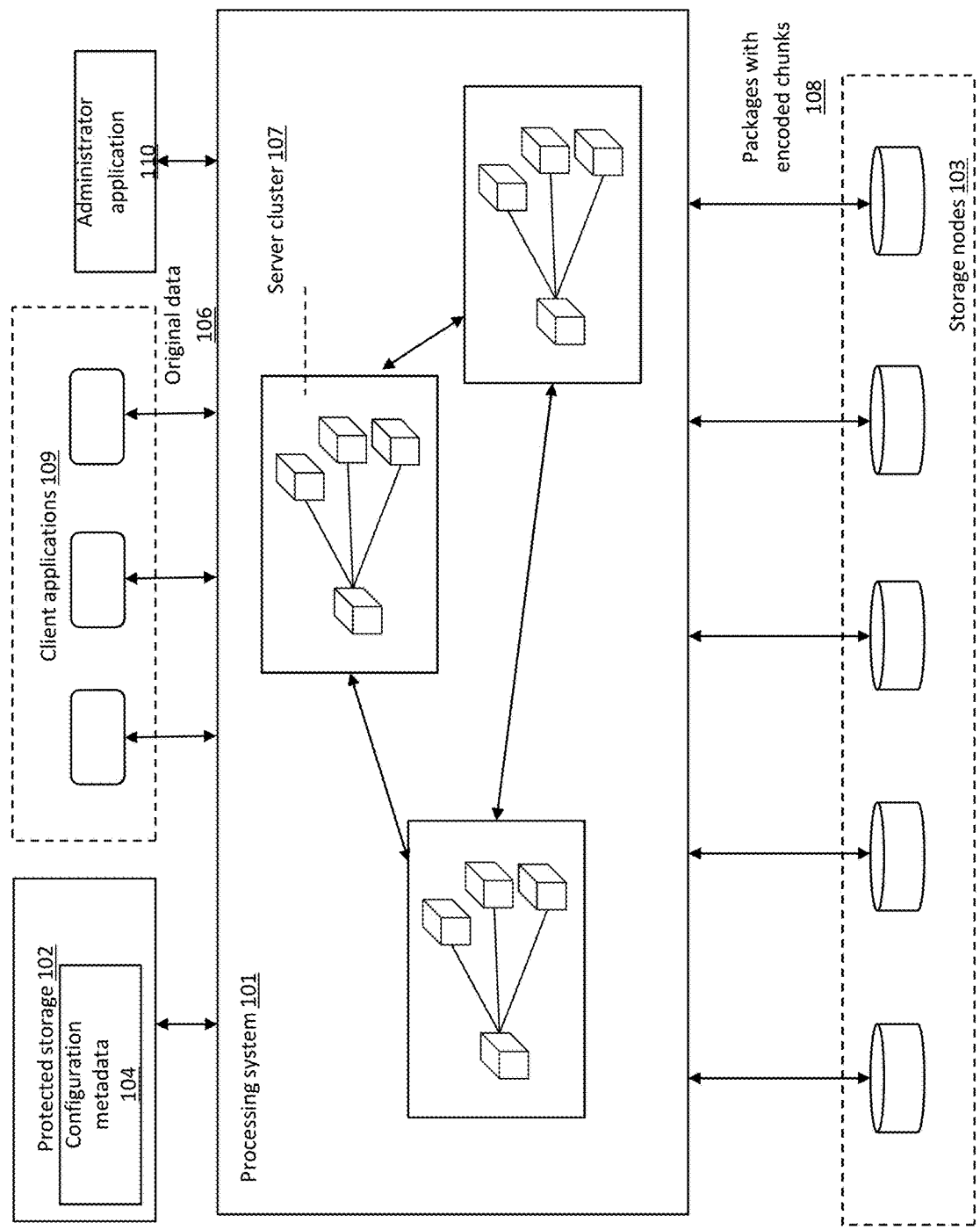
FIG. 1 is a schematic block diagram illustrating a distributed storage system interacting with client applications in accordance with an example implementation of the present application.

By way of overview and introduction, data security, system reliability and integrity are provided in a distributed storage system, such as in a cloud storage system, including for client data. Security can be provided by data encryption and secret sharing, and data segments can be encrypted as a function of individual encryption keys, which can be further encrypted with key encryption keys ("KEKs") that are distributed over storage nodes using secret sharing. KEKs can be generated using a password-based key derivation function, wherein in which a password for a vault is employed together with random data. In one or more implementations, KEKs are stored on the client side. In case of system failure, such as a client side crash, a copy of a KEK may be retrieved from storage nodes using a single password. Protection against data loss, caused by storage node failures (e.g., commodity hardware failures), is provided by erasure coding. Moreover, erasure coding helps to tolerate storage node outages, while high storage efficiency is provided by selected construction of error-correction code, such as shown and described in greater detail herein. Code parameters (e.g., length, dimension, minimum distance) can be determined as a function of a vault configuration of a respective client. Accordingly, code length should not exceed the number of storage nodes specified in the vault configuration, and a number of tolerated storage nodes failures is equal to the minimum distance decreased by one. Storage efficiency can be enhanced by flexible deduplication. Furthermore, deduplication can be performed for not just files, but also for small parts or pieces of files. The present application accounts for an appropriate tradeoff between deduplication complexity and storage efficiency, which can be selectable by a client. Further, optional compression can be applied to data, depending on respective client preferences. Latency for data retrieval and repair operations can be further minimized by network load balancing technique such as shown and described herein.

Accordingly, present disclosure relates to distributed secure data storage and transmission for use in various contexts including, for example, streaming and other applications. The dispersed storage of data, including in particular streaming media data, on cloud servers is one particularly useful application, while similarly applicable to configurations in which data may be stored on multiple storage devices which may be connected by any possible communications technology such as local area and/or wide area networks. In certain embodiments this includes storage of media content, including without limitation video or audio content, that can be made available for streaming through the Internet. The disclosed improvements in speed and security, and greater utilization of available storage resources can enable higher streaming rates. The vast amount of storage space required for storage of video, audio and other metadata can further benefit from increased availability and utilization of existing resources and infrastructure, in accordance with respective implementations embodiments disclosed herein.

In one or more implementations, data that are stored within a distributed storage system can be classified into several categories, and different coding techniques can be applied to different data categories. Thus, for example, erasure coding techniques maximizing storage efficiency can be applied to a plurality of files containing original data, and highly utilized metadata techniques can be selected and applied to minimize access latency. Further, high speed data retrieval is possible as a function of reconstructing data from different subsets of storage nodes. In case a number of available storage nodes is not less than a pre-defined threshold, data recovery is possible.

In one or more implementations, a distributed storage system of the present application is object-level one, in which files with corresponding metadata are abstracted as objects. Further, small files can be aggregated into one single object to reduce the number of objects to be transmitted to storage nodes, and to reduce amount of metadata. Objects can be partitioned into segments, and each segment can be further encoded. Thus, a number of encoded chunks are produced from each segment. Encoded chunks together with corresponding metadata are encapsulated in packages, which are transferred to storage nodes. Client data is securely stored within the encoded chunks by utilizing encryption and erasure coding with pre-defined degree of data mixing. In accordance with the present application, no amount of client data may be reconstructed from any set of encoded chunks, provided cardinality of the set is lower than the mixing degree. Further, sizes of segments and encoded chunks can be selected as a function of respective client statistics, including statistics on read and write requests. Thus, several data segment sizes are supported in accordance with the teachings herein. The size of a respective encoded chunk can be determined by the size of a related segment and the number of storage nodes and/or the length of selected error-correction code.

According to one or more implementations of the present application, a distributed storage system is provided that includes processing system devices configured to distribute and/or access client data quickly and efficiently over a set of storage nodes. Processing system devices can include one or several server clusters, in which each server cluster is configured with or as a file system server and a number of processing servers. A specially designed object-based file system can be included and deployed within each server cluster. File system servers of the server clusters can operate to maintain identical instances of the object-based file system. More particularly, a frequently used part of an object-based file system may be maintained within the processing system, while an entire object-based file system can be packed in a plurality of encoded chunks, encapsulated into packages and, thereafter, distributed over a set of storage nodes. Object search speed is, accordingly, enhanced as a result of selection of an appropriate tree data structure or a directed graph. An example object-based file system of the present application operates over large data blocks, referred as compound blocks. Compound blocks significantly reduce an amount of metadata, the number of operations performed by the object-based file system and the number of objects transmitted to storage nodes. In one or more implementations, a merging of NAS technology and object storage is provided, wherein files are also configured as objects, each having a unique ID. This provides the ability for files to be accessed from any application, from any geographic location and from any public or private storage provider, with simple HTTPS protocols, regardless of the same object being filed in a sub-folder on the NAS file system. This further provides enterprise applications with a multi-vendor storage solution that has all benefits of object storage.

Implementations of the present application allow for mixing of storage nodes from multiple vendors, and provide functionality for users to select any respective ones of storage providers, including on-site and off-site, and to switch between storage providers at will. Moreover, by providing key storage at the client level, block and file system storage is configured to meet the needs of an increasingly distributed and cloud-enabled computing ecosystem. With block-based storage, blocks on disks are accessed via low-level storage protocols, such as SCSI commands, with little overhead and/or no additional abstraction layers. This provides an extremely fast way to access data on disks, and various high-level tasks, such as multi-user access, sharing, locking and security, can be deferred to operating systems.

In one or more implementations of the present application, erasure codec has been developed for implementing secure cloud NAS storage with a relatively simple file system. The codec configures an erasure correcting code from component codes of smaller lengths. A library of component codes that includes optimal maximum distance separable (MDS) codes (such as Reed-Solomon) and codes with low encoding/decoding complexity (such as optimal binary linear codes) can be provided, and the structure of the erasure code can be optimized to the user's preferences. This structure provides erasure coding with flexible parameters, such as to enable users to manage storage efficiency, data protection against failures, network traffic and CPU utilization. To ensure low latency, the erasure codec of the present application distributes network traffic, in conjunction with load balancing.

Moreover, storage efficiency can be enhanced by using MDS component codes, and network traffic and computational complexity are reduced by using linear codes over small, finite fields. For example, the number of component codes within the configured erasure correcting code of the present application can depend on a number of available storage nodes, which can further be determined by a data vault's respective structure.

In accordance with the present application, erasure codec includes an improved performance algorithm for data processing by maximizing input/output operations per second ("IOPS") ratio by using concurrency and parallel processing. This can reduce latency and avoid operational limitations within datacenters. Moreover, configurations of the present application can obtain significantly high levels of security, such as to protect customer data within public or private cloud premises from unauthorized access and theft, by mixing and hiding data as a function of the erasure codec. In one or more implementations, a degree of data mixture can be selected according to user preference. The mixture degree can be the smallest number of storage nodes that need to be accessed in order to reconstruct a chosen amount of original user data. Higher mixture degrees can correspond to higher levels of data protection, such as to preclude unauthorized access, and to provide higher data retrieval complexity.

Referring now to the drawings, FIG. 1 is a schematic block diagram illustrating a distributed storage system interacting with client applications, in accordance with an example implementation of the present application. Original data 106, e.g., files, produced by client applications 109, are distributed over a set of storage nodes 103, and original data 106 is available to client applications 109 upon request. Any system producing and receiving data on the client side can be considered as an instance of a client application 109. Further, data processing and transmission control are arranged by processing system 101, located on the client side. According to the present application, processing system 101 can include one or several server clusters 107, in which original data 106 are transformed into encoded chunks 108, and vice-versa. As noted herein, generally, a server cluster 107 can include a file system server and one or more processing servers, although a server cluster may include just an individual server.

Client applications 109, processing system 101 and storage nodes 103 communicate via a data communication network, such as the Internet. Storage nodes 103 can operate independently from each other, and can be physically located in different areas. Processing system 101 ensures data integrity, security, protection against failures, compression and deduplication. In one or more implementation, configuration of processing system 101 is specified by configuration metadata 104 maintained within highly protected storage 102. System configuration may be adjusted via administrator application 110.

Figure 2:
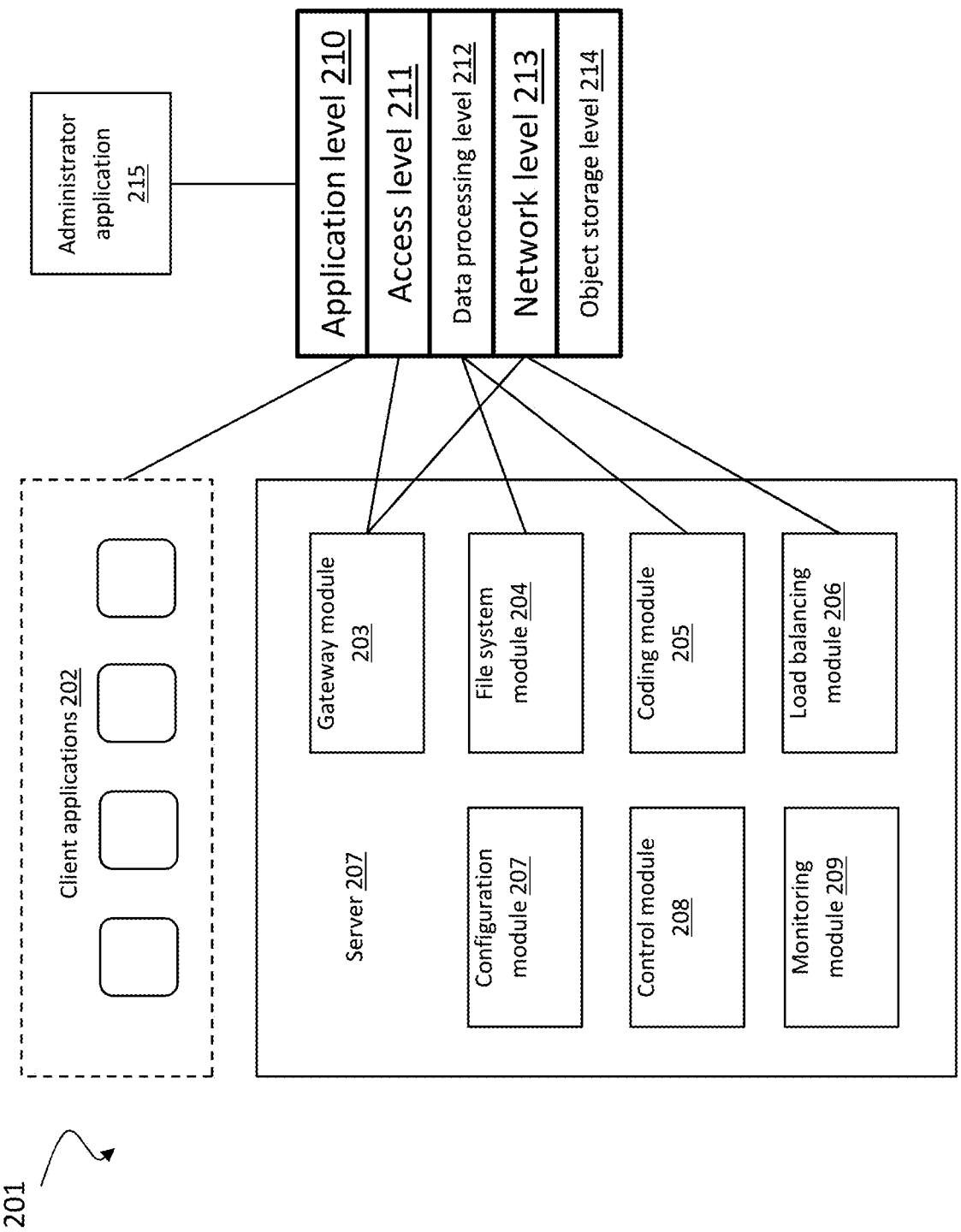
FIG. 2 is a schematic block diagram representing logical components of a processing system arranged to transform original data into encrypted data chunks, in accordance with an example implementation of the present application.

FIG. 2 is a schematic block diagram representing logical components of an example processing system, and arranged to transform original data into packages with encapsulated encoded chunks, and vice-versa, as well as to organize fast, reliable and secure data transmission. FIG. 2 illustrates an example logical architecture, as opposed to the example physical architecture illustrated by FIG. 1. In FIG. 2 processing system 201 includes a number of modules, wherein each module is responsible for a particular functionality.

Features and functionality shown and described herein is described in the general context of computer system executable instructions, such as program modules, being executed by one or more computer systems. Generally, program modules include routines, programs, objects, components, logic, data structures, and so on that perform particular tasks or implement particular abstract data types. In a distributed cloud computing environment, program modules can be located in both local and remote computer system storage media including memory storage devices. Accordingly, modules can be configured to communicate with and transfer data to each other.

In one or more implementations of the present application, one or more client applications 202 can operate on application level 210. From the view of a leveled architecture, modules can be divided into two categories. A first category can include modules operating on particular levels. For example, administrator module 215 operates on application level 210, and can be responsible for providing relevant information to a system administrator regarding tasks being performed, configuration information, monitoring information and statistics on the system more generally, as well as for receiving administrator's orders. Original data can be received by gateway module 203 operating within access level 211, where gateway module 203 supports different protocols, e.g., network file system (NFS) protocol, server message block (SMB) protocol, internet small computer system interface (iSCSI) protocol, representational state transfer (REST) or RESTful Web services. Gateway module 203 can provide opportunity for almost any arbitrary database or application on the client side to access the processing system 201. Moreover, gateway module 203 can enable communication between processing system 201 and storage nodes via the network (e.g., using hypertext transfer protocol secure (HTTPS)).

Thus, operation in network level 213 gateway module 203 provide for connectivity between data processing level 212 and object storage level 214. Transformation of original data into encoded chunks can be performed within data processing level 212. In one or more implementations, two modules operate in data processing level 212: file system module 204 and coding module 205. Coding module 205 can be configured to perform compression, encryption and erasure coding, while file system module 204 can be configured to keep track of correspondence between original data objects and packages with encoded chunks located on storage nodes. Load balancing module 206, while operating in network level 213, can be configured to minimize, for example, regulating traffic between processing system 201 and each storage node. Load balancing module 206 can perform bandwidth analysis and use results therefrom to optimize mapping between a set of encoded chunks and a set of storage nodes, i.e., to optimize distribution of packages over storage nodes.

A second category of modules can include modules that are configured to affect or arrange functioning of other modules. For example, configuration module 207 is operable to customize other modules according to configuration metadata. Control module 208 can include instructions that, when executed by one or more devices within processing system 101, to schedule tasks for other modules and to regulates resource consumption, e.g., memory and CPU. Monitoring module 209 can be configured to include instructions that, when executed by one or more devices within processing system 101, to activity track on activities being performed within the processing system 101 and its environment, as well as to generate event alerts, as appropriate.

Modules can be distributed over a server cluster, i.e., file system server and processing servers. Thus, file system module 204, configuration module 207 and gateway module 203 are deployed over file system server. Coding module 205 and load balancing module 206 are deployed over processing servers. Control module 208 and monitoring module 209 are deployed over both file system server and processing servers.

Figure 3:
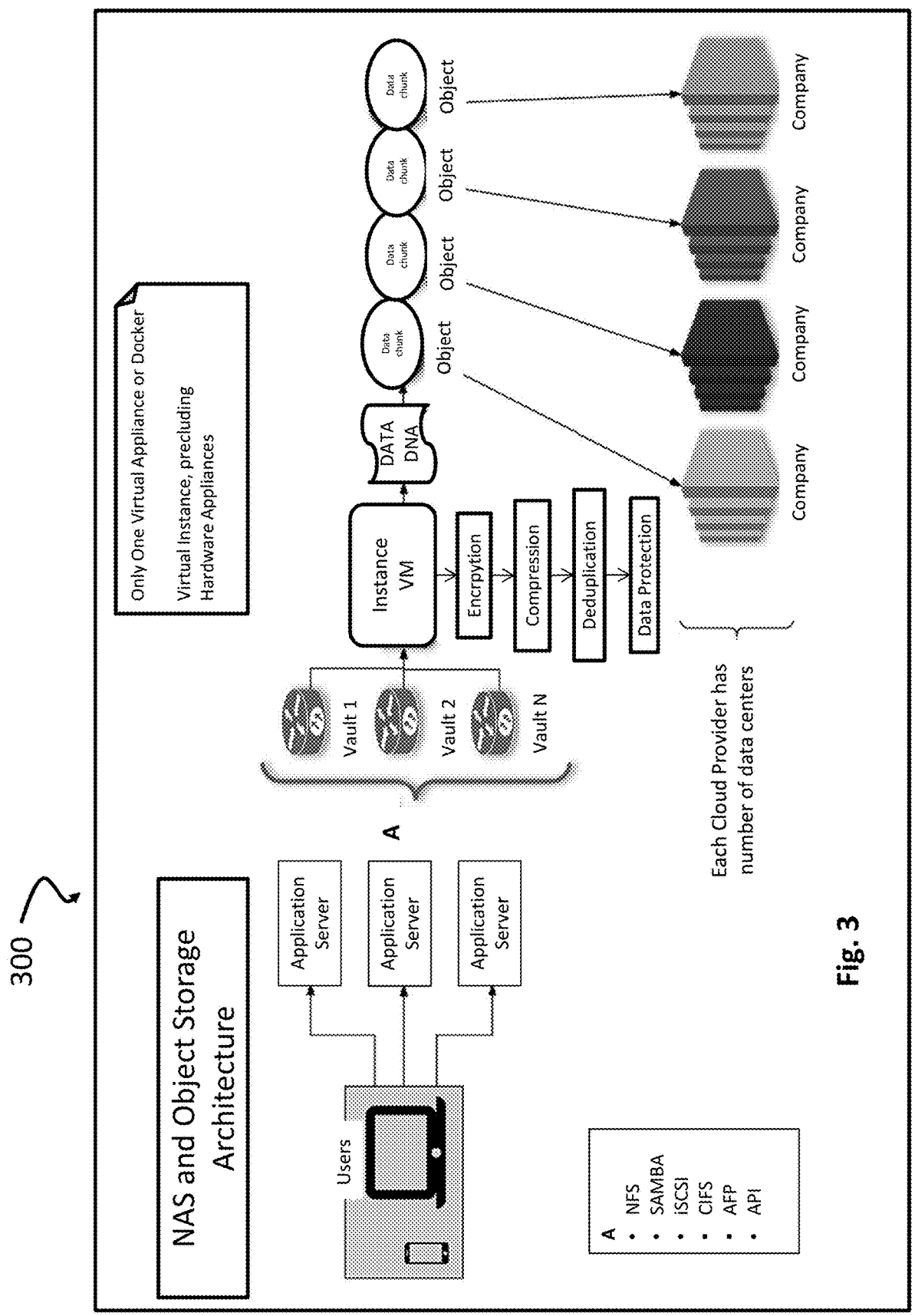
FIG. 3 illustrates an example system including a plurality of application servers, data vaults, and processes implemented in a virtual machine instance, in accordance with an example implementation of the present application.

As noted herein, the present application configures one or more processing devices to partition objects into segments, and each segment can be further encoded into a number of chunks, which can be transferred to storage nodes. This structure significantly simplifies storage implementation processes, without compromising data security, integrity, protection and storage performance. For example, and illustrated in the example implementation shown in FIG. 3, information about data is encrypted at the client and stored securely within packages with encapsulated encoded chunks that are dispersed across storage nodes. As illustrated in the example system 300 in FIG. 3, a plurality of application servers, data vaults, a process is implemented in a virtual machine instance that includes operations for, for example, encryption, compression, deduplication, and protection and, moreover, slicing the information into a respective chunks and objects. The erasure codec generates various types of encoded chunks, which are spread across all the storage nodes and deployed for a vault installation.

Figure 4:
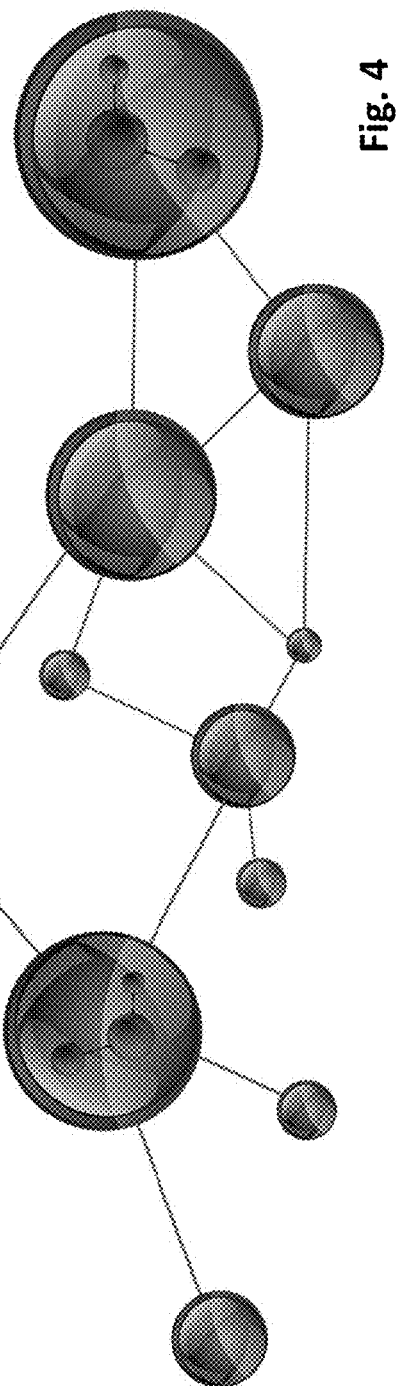
FIG. 4 is a simplified illustration of a package, in accordance with an example implementation of the present application.

Moreover and with reference to the example package with encoded chunk 400 shown in FIG. 4, metadata can be encoded in a way that is only visible and retrievable by the authorized data owner. This is implemented by abstracting erasure-coded metadata and NAS metadata, which is thereafter dispersed between different storage nodes. A package can be configured to contain encoded chunk together with related metadata: storage nodes configuration; a vault configuration; a link to active vault snapshot; and a current state of data blocks used for snapshot.

The result is a simple NAS solution with all advantages of erasure-coded object storage, such as security, unlimited scalability, speed and data resiliency and without a requirement for use of RAID systems to provide data resiliency, and write or replicate multiple copies to different geographical locations to ensure availability during component failures. The systems and method shown and described herein provide for data protection, while including a relatively modest overhead (e.g., such as 40%-60% overhead), as opposed to a significantly larger overhead (e.g., 300-600% overhead) in traditional NAS systems.

In one or more implementations, packages that are generated from original data are connected by shared base information, as well as by connectivity to one or more neighboring packages through metadata. The packages can be uploaded to geographically distributed storage nodes of the user's choosing, and contain links to a vault snapshots, as well as a current state of data blocks used for the snapshots. This provides significantly enhanced security and gives the vault a high tolerance for node failure. Moreover, the present application supports the ability to reconstruct all data, even in the event of data loss on the client side. Simply by creating a new vault with account details, all data will become instantly accessible. This can be further made possible as a function of the intelligent indexing and caching data prior to data uploading to remote storage nodes, as well as data pre-fetching prior to receiving read requests. Unlike traditional block storage behind NAS, which works in 4 KB blocks of data and requiring a large infrastructure to manage, the present application operates with increased block size, and combines the blocks into compound blocks that are independently managed and subject to self-healing methodologies. For example, a default size of a compound block can be 4 MB. These larger blocks ensure near Tier-1 performance on top of S3-type storage nodes.

Figure 5:
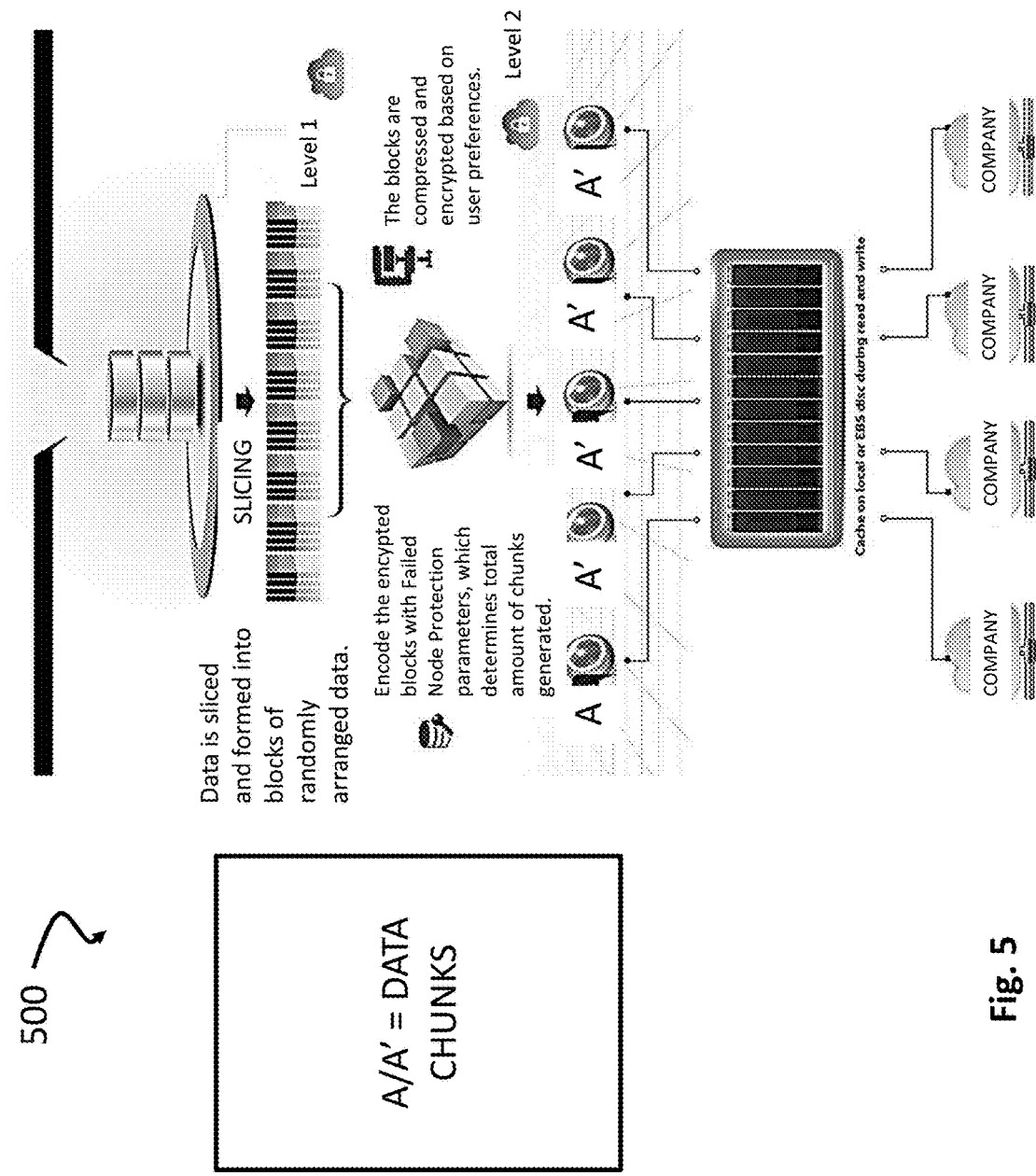
FIG. 5 illustrates data encoding and distribution, in accordance with an example implementation.

In one or more implementations, data blocks can be categorized such as "hot," "warm" and "cold." Rating indexes can be managed for NAS blocks, and these rating indexes can be further employed to identify a category of a corresponding compound block. In this way, frequently used warm and hot categories of data can be handled locally (in memory and stored in locally attached SSD), while also being dispersed in the cloud. Furthermore, the cached part of file system is regularly snapshotted, sliced, turned into packages with encoded chunks, and then distributed over storage nodes. If a cache includes several independent storage devices, e.g., several SSD, then replication or erasure coding can be employed within cache to enhance data protection. An example process 500 is illustrated in FIG. 5.

Figure 6:
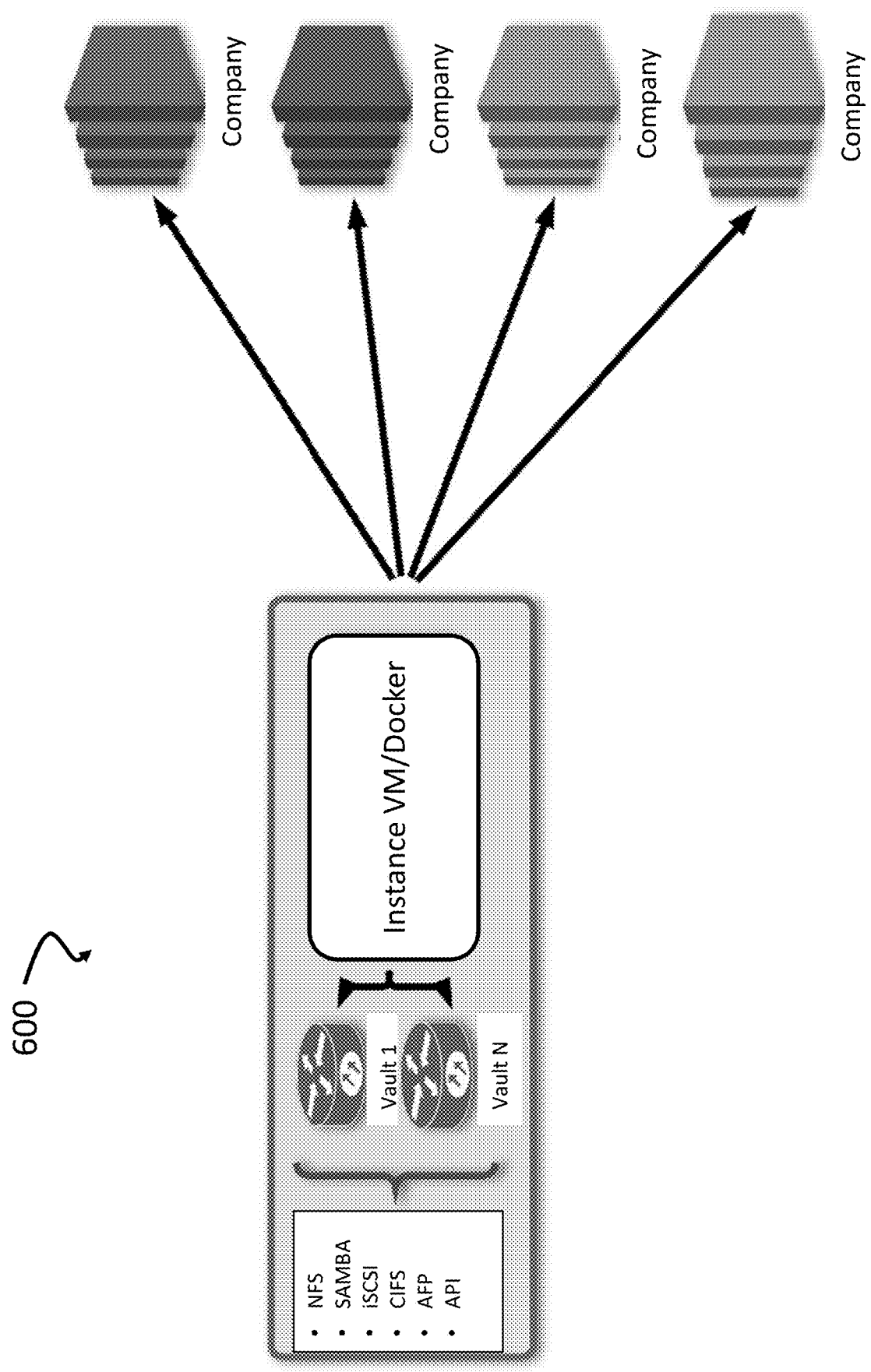
FIG. 6 illustrates communications methodologies, in accordance with an example implementation of the present application.

With reference to the example communication methodology and distributed application shown in FIG. 6, a virtual appliance provides a distributed, scalable, fault-tolerant and highly available storage system, which allows organizations to combine geographically distributed storage resources of different providers into a single namespace that is transparent, for example, on UNIX and WINDOWS operating systems. In operation an instance can be provisioned as a virtual appliance or docker container, which can run under a virtualization framework, such as VMware, Xen or OpenStack. Alternatively, it can be easily packaged on a hardware appliance.

Figure 7:
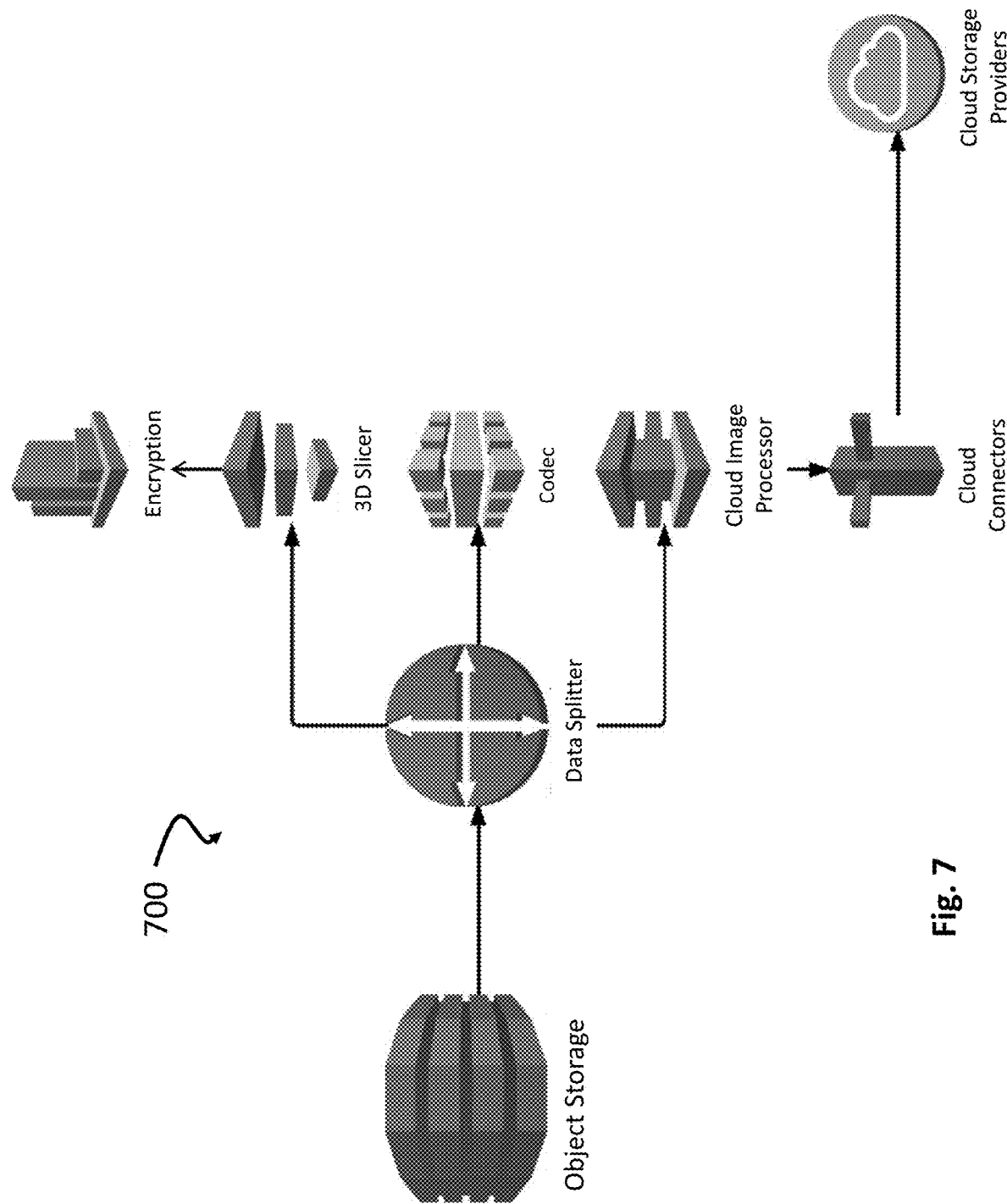
FIG. 7 shows processes and components in accordance with an example implementation of the present application.

Example processes and components 700 are illustrated in FIG. 7, and include an object storage layer, splitter, iSCSI, network file system (e.g., NFS), common internet file system ("CIFS"), mounted file system (for example, ext4 or btrfs), block storage, cache, and public and private cloud connectors. In one or more implementations, an object storage layer ensures consistent integration with public and private storage nodes. The object storage of the present application is significantly more scalable than traditional file system storage, at least in part because it is significantly simpler. For example, instead of organizing files in a directory hierarchy, object storage systems store files in a flat organization of containers, and unique identifiers are employed to retrieve them.

Data splitting can be configured to perform three major operations on a stored data object: data slicing and mixing; high level encryption (for example, using AES-128, AES-196 or AES-256); and data encoding against failures with an efficient and flexible algorithm. Data encoding can be configured to work in such a way that the produced encoded chunks do not contain any sequence of bytes from the original data object, even with the encryption option, for example, in the administrator application 110, being set to disabled.

Figure 8:
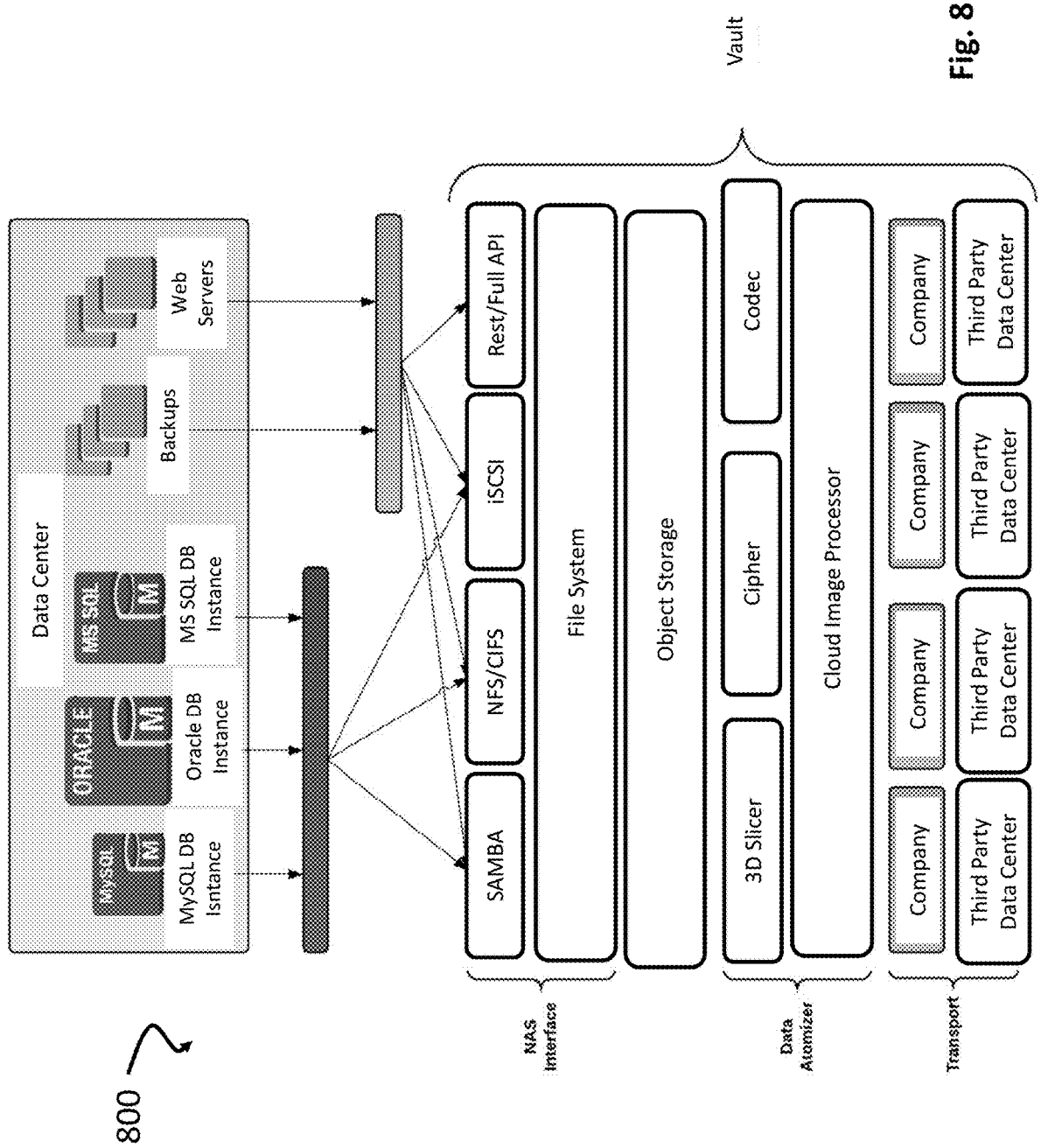
FIG. 8 illustrates an example architecture identifying pages anonymously stored within a set of storage nodes, in accordance with an example implementation.
Figure 9:
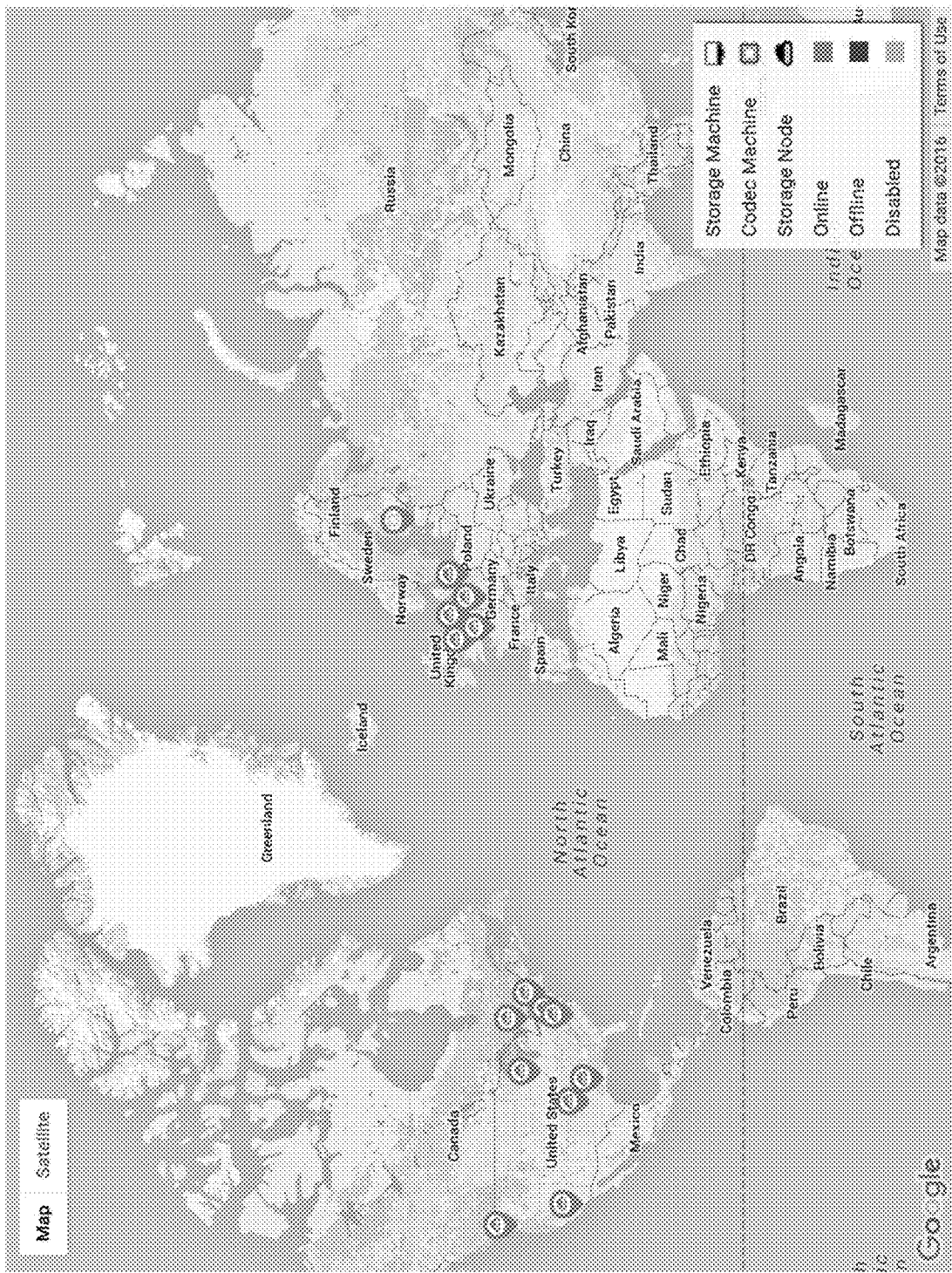
FIG. 9 illustrates an example map showing storage nodes located around the world.

With reference now to the example architecture 800 illustrated in FIG. 8, packages with encoded chunks can be anonymously stored within a set of storage nodes. In one or more implementations, transformed data blocks are transmitted to different storage nodes in parallel, ensuring efficient utilization of available network bandwidth, which results in high data transfer speed. This strategy makes data interception virtually impossible. Moreover, vault snapshots, data blocks and packages with encoded chunks, described in greater herein, form a graph of related data objects. An example map 900 showing storage nodes located around the world is illustrated in FIG. 9.

In one or more implementations, a fast, key-value pair-based, graph database is used to access various information about the state of the system. These include, for example finding the latest valid vault snapshot, the closest snapshot for rollback, and data blocks that may need repair.

In one or more implementations, a full system configuration can be replicated to a subset of storage nodes on a regular basis. This ensures that data can survive an underlying virtual machine (VM) server outage, and that the system state can also be restored if the VM data is destroyed. Vault snapshots can include the following metadata: a list of the data blocks used; checksums for verifying data blocks integrity; a base snapshot image; blocks delta overlaid over base vault snapshot; and a link to previous vault snapshot used.

With regard to NFS File Sharing Services, in one or more implementations of the present application, the full range of NFS security can be supported. With regard to vault options, a range of vault types can be configured to support different application configurations. For example, vaults can be created and configured for file storage, archiving and/or deep archiving. Vaults can further be optimized for running block-based databases, imaging (e.g., video) and image storage applications.

In one or more implementations, a primary storage vault is provided for a high performance file system. With vault content cached locally, this option is ideal for database applications. Files can be stored in a virtual folder, and managed in the background. The primary storage vault supports automatic snapshot management, wherein snapshots are created much faster than backups, and each snapshot is consistent with the source content at the moment of its creation. The frequency of snapshots can be defined, and snapshots can be split and dispersed to different datacenters in the cloud, such as shown and described herein. Thus, data are protected and backed up frequently, without the performance of applications being negatively affected.

With reference to vault management, a high performance cloud storage file system is provided with virtually unlimited storage capacity. This option is ideal for web servers requiring large storage capacity for images and videos, and fast performance. Data can be stored across multiple cloud centers, and be managed by a single file system that can be accessed almost instantaneously from other members of the cluster located in other geographical regions. For example, data can be stored in multiple vault clusters, using a MICROSOFT AZURE data center in Ireland, an AWS data center in Virginia and an on-premises data center in Singapore.

In one or more implementations, an archive vault option provides long term storage of data that is compressed and deduplicated. The data can be compressed automatically, which is useful in cases when low storage costs are desired and moderate retrieval speeds are tolerable.

In one or more implementations, another archive vault offers lower storage cost compared to other archive vault options. This option may be ideal for data that are rarely retrieved, and data retrieval times are less important. Such an option may be implemented using AMAZON GLACIER cloud storage, and provides long term storage of data that is compressed and deduplicated. Alternatively, WINDOWS file sharing via CIFS protocol provides file sharing with WINDOWS servers and WINDOWS clients, including WINDOWS 7, WINDOWS 8, WINDOWS XP and other WINDOWS-compatible devices. Virtually an unlimited number of file shares are supported.

Performance of the system can scale linearly with a number of storage nodes in the system. Accordingly, adding a new storage node will increase the available capacity and improve the overall performance of the system. The system will automatically move some data to the newly added storage node, because it balances space usage across all connected nodes. Removing a storage node is as straightforward as adding a node. The use of multi-vendor storage nodes allows the system to parallelize operations across vendors, which further contributes to its throughput.

Moreover, the teachings herein provide benefits of secret sharing schemes to storage by combining information dispersal with high level encryption. This preserves data confidentiality and integrity in the event of any of the packages with encoded chunks being compromised. The methods of data coding ensure that information can only be deciphered if all the information is known. This eliminates the need for key management while ensuring high levels of key security and reliability. Data can be packaged with AES-256/SHA-256 encryption which is validated for use in the most security conscious environments.

As noted herein, the present invention is directed to object-based distributed storage systems. According to one or more implementations of the present application, files with corresponding metadata can be abstracted as objects. Object metadata can include original data metadata and system metadata, in which original data metadata is provided by client applications together with related files, and system metadata can be generated by object-based distributed storage system application(s). Thus, original data metadata does not have to depend on object-based distributed storage system in general (i.e., processing system or cloud storage). Further, original data metadata can include file attributes such as file type, time of last change, file ownership and access mode, e.g., read, write, execute permissions, as well as other metadata provided by client application together with the file containing original data. Original data metadata can be encoded and encapsulated into packages, together with original data.

In one or more implementations, system metadata of an object is usable to manage an object within the distributed storage system, so it is particularly relevant from within the system. System metadata can include identifiers, cloud location information, erasure coding scheme, encryption keys, internal flags and timestamps. Additional system metadata can be specified depending on the requirements to the distributed storage system. Here, identifiers, e.g., numeric IDs and HASH values, are usable to identify objects and their versions. Cloud location information can be represented by an ordered list of data segments, in which each segment is given by a list of packages with encoded chunks (e.g., indices and locations). An index of a package can depend on a load balancing scheme. Further, a location of a package can be provided by a reference, thereby providing an opportunity to download a package with encoded chunks from cloud storage. Information regarding a respective erasure coding scheme is usable to reconstruct data segments from encoded chunks. Moreover, secure storage of encryption keys can be provided by using key encryption keys (KEKs), in which KEKs depend on password or, alternatively, by distribution over storage nodes using secret sharing. Internal flags show various options that are enabled for an object, e.g., encryption, compression, access type, and caching policy. Further, timestamps identify a time of object creation, modification and deletion. Timestamps are useful to track a relevant version of an object. Of course, this list of metadata is exemplary, and can be supplemented or detailed.

In accordance with one or more implementations, a distributed storage system for a particular client can be specified by configuration metadata that include: vault configuration; erasure encoding scheme; encryption scheme; compression scheme; deduplication scheme; access control information; flags showing enabled options; and reference for file system root. In operation, a client has access to his/her storage space configured in a vault or a number of independent vaults. Respective coding techniques, i.e., encryption, erasure coding, compression, and namespace can be specified for respective vaults. Each vault can be logically divided into volumes, and each volume may be created to store a particular type of data or for a particular user/group of users. Furthermore, access rights and data segments sizes can be specified for a volume.

Figure 10:
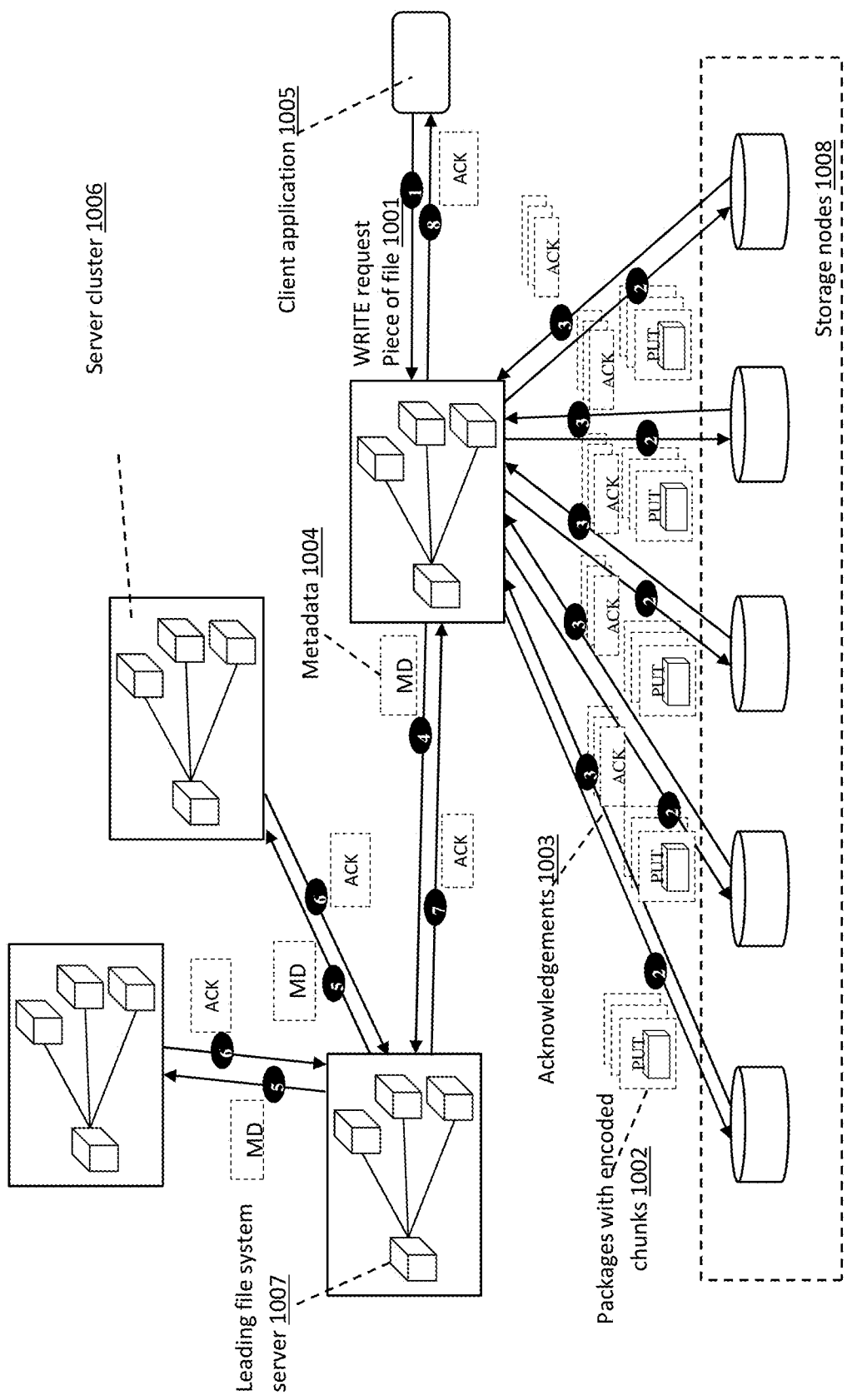
FIG. 10 is a schematic data management illustration of data and metadata transferring upon receiving write request from client application, in accordance with an example implementation of the present application.

FIG. 10 is a schematic illustrating of example data and metadata transferring upon receiving WRITE request from client application. A client request is received by one of server clusters 1006, more particularly, by the gateway module. As noted herein, each server cluster 1006 can include a file system server and a number of processing servers. Typically, a gateway module is located within file system server. At step 1, a WRITE request with a piece of file 1001 is transferred via communication network to gateway module. A network protocol employed for data transferring can depend on a client application, e.g., protocols SMB, NFS, CIFS, iSCSI and RESTful API. In one or more implementations, only one client application is permitted to write to a particular file at one time, which may be implemented using lock/unlock in file system servers, managed by the leading file system server 1007. Upon receiving WRITE request 1001, server cluster 1006 performs coding of file segments into encoded chunks 1002 and generates object metadata. Then at step 2 server cluster 1006 initiates a PUT request for each package with encoded chunk, produced from the piece of file. At step 3, a wait occurs for acknowledgements 1003 upon successful placement of packages. Object metadata, utilized by the object-based distributed storage system, can be distributed over storage nodes 1008 and partially cached within file system servers. In order to maintain identical partial copies of the object-based file system within each server cluster, the leading server cluster with the leading file system server 1007 is selected. Leading server cluster is temporary assigned using some consensus algorithm, e.g., Raft. At step 4, metadata 1004 is transmitted to the leading file system server 1007, which retransmits it to other file system servers at step 5. Thus, metadata 1004 is distributed over the set of server clusters. At step 6 the leading file system server 1007 is waiting for acknowledgements, in order to guarantee data integrity. If some server cluster is unavailable at a given moment, then the leading server cluster monitors status of this server cluster and arranges metadata 1004 transferring, as soon as possible. In case the leading server cluster is unavailable, another server cluster can be assigned as a leading one, for example, according to an employed consensus algorithm. At step 7 server cluster, connected with the client application 1005, receives acknowledgement from the leading server cluster. Then at step 8, acknowledgement on successfully performed WRITE operation is sent to the client application 1005.

Figure 11:
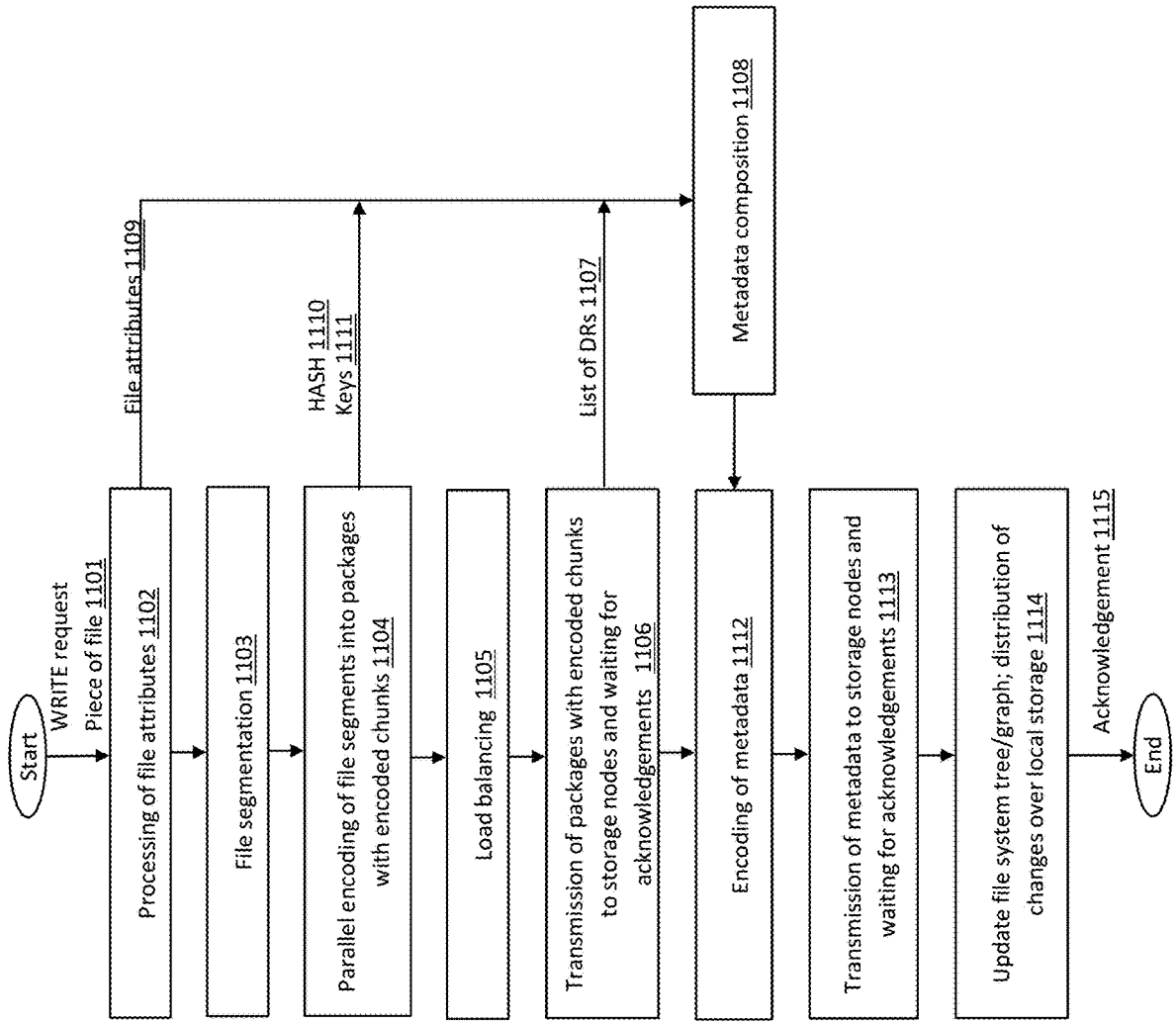
FIG. 11 is a schematic block diagram illustrating data processing and metadata generation in the case of WRITE request, in accordance with an example implementation of the present application.

FIG. 11 is a schematic block diagram illustrating example data processing and metadata generation in the case of a WRITE request. Gateway module of the processing system receives a WRITE request with a piece of file 1101, in which the file is specified by a unique identifier (ID), while an original data piece within the file is specified by offset indicating beginning of the piece and length of the piece. File attributes can be treated as original data metadata and encapsulated into packages together with data segment. Thus, relevant for the distributed storage system, file attributes 1109 are copied at step 1102. Segmentation of the file piece is performed at step 1103 (illustrated in additional detail in FIG. 12). Obtained parts of a file are employed to update an existing data segment or stored as new data segments. At step 1104 (illustrated in additional detail in FIG. 16), each new/updated data segment is encoded into a set of data chunks, in which encoding procedure includes deduplication, compression, encryption and erasure coding. In one or more implementations, compression and deduplication can be optional.

Further, in one or more implementations, encryption can be optional for low important data. Prior to actual encoding, HASH value 1110 is computed for each data segment, wherein a cryptographic hash function is employed, e.g., BLAKE2, BLAKE, SHA-3, SHA-2, SHA-1, MD5. Encryption keys 1111 may be based on HASH values 1110 or generated independently from content using random data. HASH values 1110 and encryption keys 1111 are considered to be a part of system metadata, since knowledge thereof is required to reconstruct original data. Packages are assigned to storage nodes at step 1105, in which network load is jointly balanced for packages with encoded chunks, produced from several related data segments (illustrated in additional detail in FIG. 17). At step 1106 packages are transferred from the processing center to storage nodes, where storage nodes send back to the processing center acknowledgments upon saving of packages. A data reference (DR) can be generated for each transferred package, in which the DR is an address of package within a storage node. Given DR for a package and permission, the package may be accessed within a storage node. In one or more implementations, a list of DRs 1107 is appended to system metadata of file piece, thereby providing complete object metadata that is obtainable at step 1108. At step 1112 object metadata is encoded to guarantee security and reliability. For example, object metadata can be encoded in the same way as a data segment, as well as just encrypted and protected against failures using erasure coding or replication. At step 1113, object metadata is transferred to storage nodes, and acknowledgements are received by the processing system 101 thereafter. Access to metadata, distributed over storage nodes, can be provided using generated metadata references (MDRs). As used herein, an MDR has the same general meaning for metadata as DR for data. At step 1114 and relevant for a system object, metadata is spread over server clusters and tree/graph structure of the object-based file system is updated. Upon completion of operations, an acknowledgement 1115 is sent to the client application.

Figure 12:
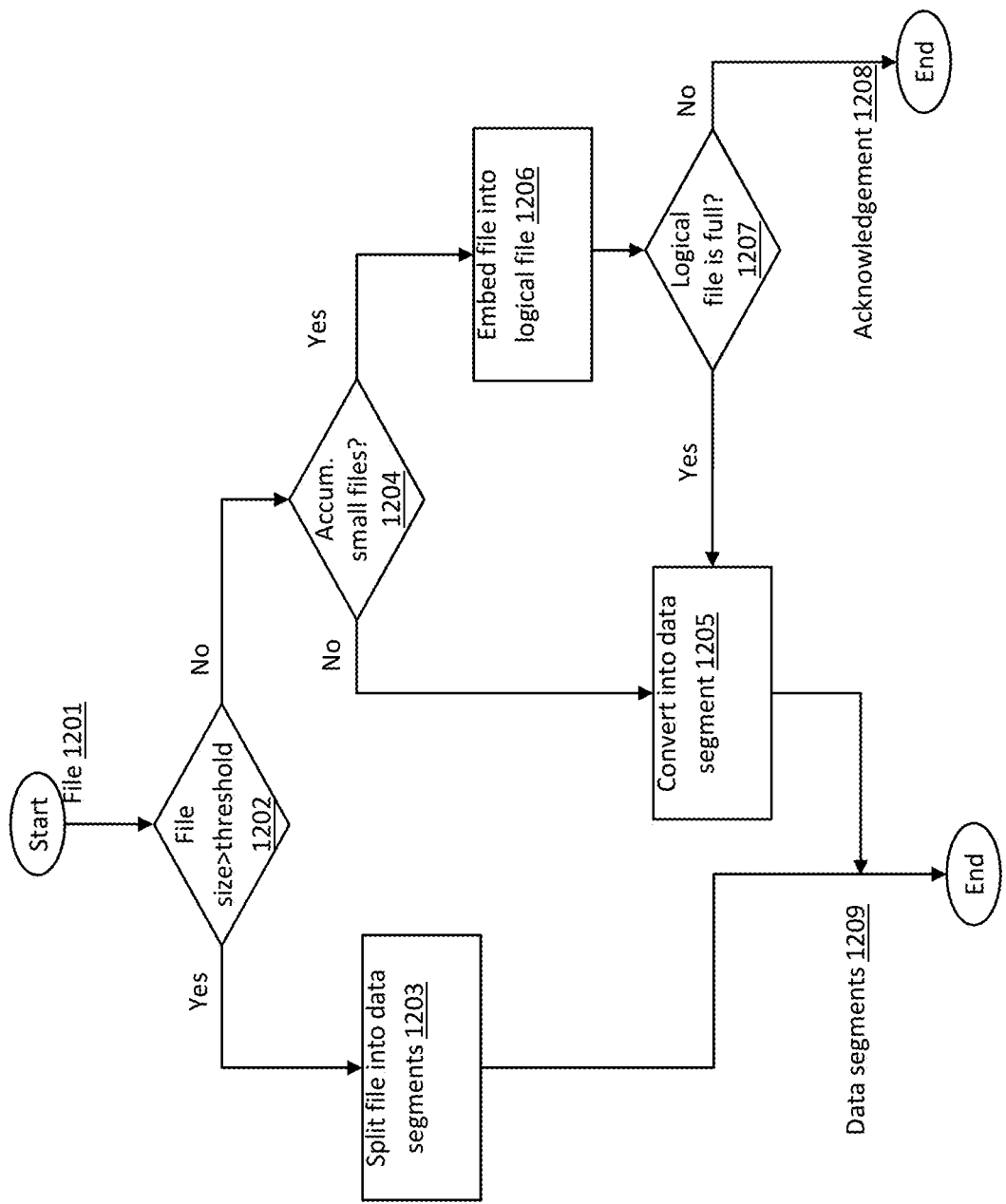
FIG. 12 is a schematic block diagram illustrating building of data segments from an individual file or from a group of files combined into logical file, in accordance with an example implementation of the present application.

FIG. 12 is a schematic block diagram illustrating example building of data segments from an individual file or from a group of files combined into a logical file. Segmentation of a file 1201 can be performed depending on the file size. More particularly, if a file size is above a pre-defined threshold 1202, then it can be individually packed into a number of encoded chunks. Such files are referred to herein, generally, as large file, while files with a size lower than the threshold are referred to as small files. For example, a value of such threshold may be less than the segment size. If a file 1201 is the large file then, at step 1203, the file 1201 is partitioned in the number of data segments of specified size. For a small file, an attempt to pack several files into one data segment is made. Thus, at step 1204 the system checks whether the present file 1201 may be combined with already accumulated files or with the next small files. In the latter case, the file 1201 is converted into a data segment at step 1205. In the former case, the file 1201 is embedded into a current logical file, where the logical file is a container for small files. The size of a logical file is defined in one or more implementations, to be equal to the size of a respective data segment. In some scenarios, a logical file can be treated as a large file, while in other scenarios it is treated as a set of small files. Logical files are built at step 1206 using two principles: pack related (dependent) small files together and to decrease wasted storage space. For example, it is preferable to pack together files that are located in the same folder. Here wasted storage space represents by the sum of differences between data segment sizes and logical file sizes. Accordingly, it can be desirable to produce logical files of a size that is as near to a data segment size as possible. At step 1207, a determination is made whether a current logical file is complete, i.e., no more small files are to be embedded. In the case of completeness, the system can convert the logical file into data segment at step 1205 and create a new current logical file. Obtained data segments 1209 can be further transferred. Observe that if several small files are embedded into the same logical file, then IDs of these files are associated with the same logical file root MDR, where file root MDR is MDR, which is unique for the file and which provides access to all file data and metadata.

Figure 13:
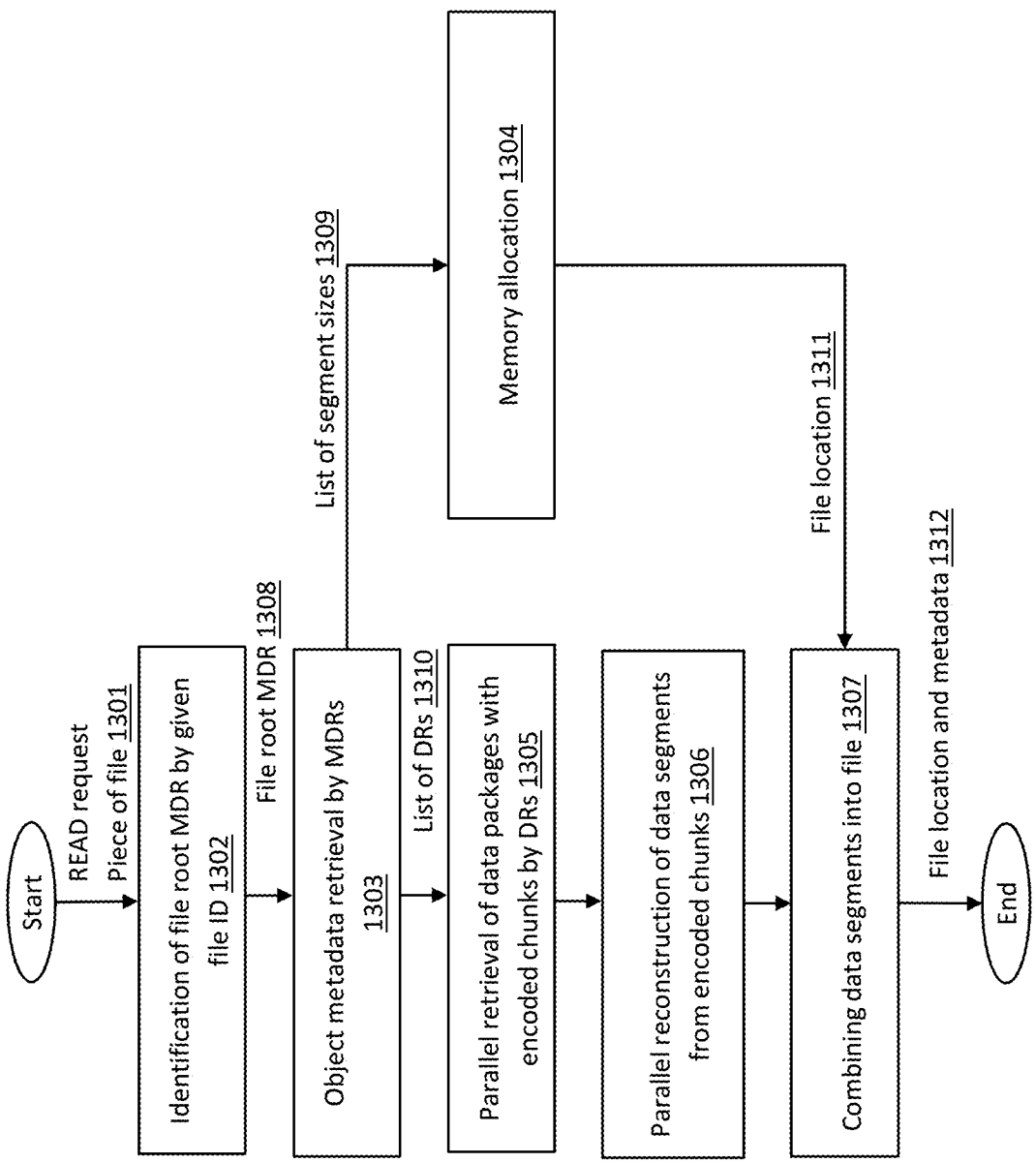
FIG. 13 is a schematic block diagram illustrating metadata processing and data reconstruction in the case of READ request, in accordance with an example implementation of the present application.

FIG. 13 is a schematic block diagram illustrating example metadata processing and data reconstruction, in the case of READ request. The processing system receives READ request for a piece of file 1301, in which a file is specified by file ID, a piece within the file is specified by offset, indicating beginning and length of the piece, as in the case of WRITE request illustrated in FIG. 11. At step 1302, the file root MDR is identified by given the file ID in a tree/graph structure of the object-based file system, in which a file is represented by a node containing a file root MDR. The tree/graph structure of the object-based file system can be partially cached within the processing system. If a required node is not found in the processing system cache, then a part of the tree/graph structure containing this node can be retrieved from storage nodes and stored in the cache. An obtained file root MDR 1308 can be employed to retrieve object metadata using other MDRs related to the file, at step 1303. In one or more implementations, object metadata includes information regarding an object location, such as a list of data segments produced from the object (file) and an ordered list of DRs 1310 for each data segment. At step 1305 packages with encoded chunks, related to the required file piece 1301 are independently retrieved from the set of storage nodes. These packages may be retrieved in any order. At step 1306 original data segments are recovered by coding module from encoded chunks. Data segments, combined into file piece in location 1311 at step 1307, where memory is provided within the processing system cache and allocated at step 1304 using a list of segment sizes 1309. As result, acknowledgement with specified file location and metadata 1312 is transferred to the client application, from which the read request was initiated. Thus, access to the requested file piece is provided by the location within the processing system cache.

Figure 14:
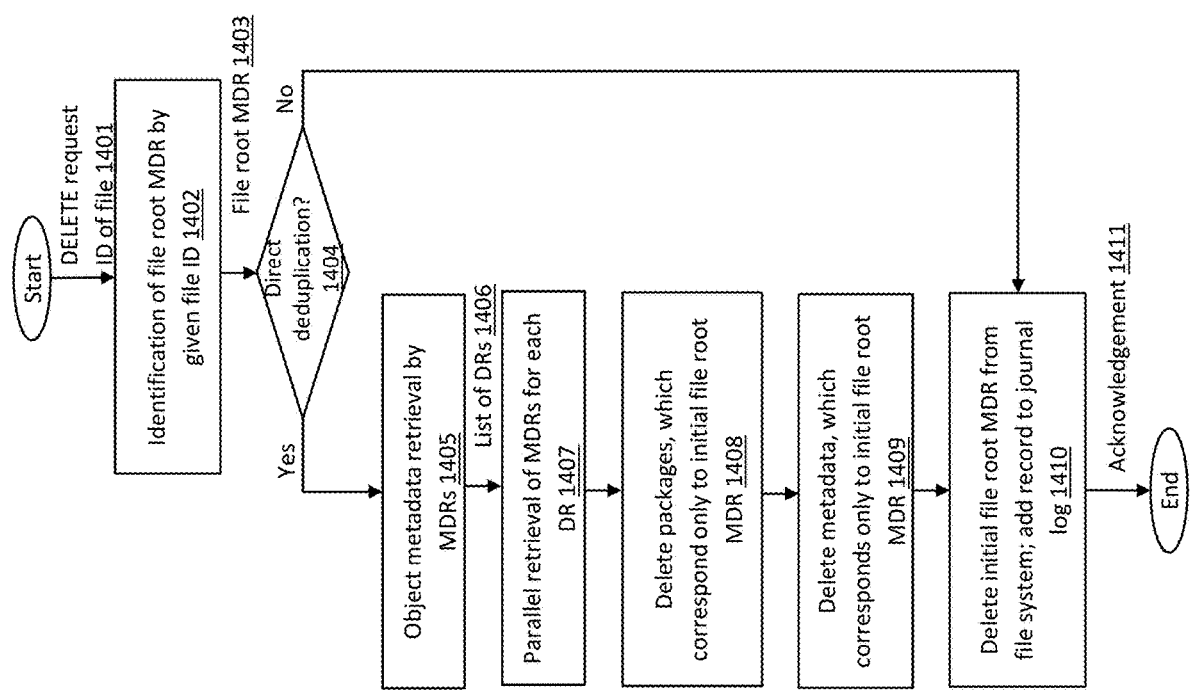
FIG. 14 is a schematic block diagram illustrating data and metadata removal in the case of DELETE request, in accordance with an example implementation of the present application.

FIG. 14 is a schematic block diagram illustrating example data and metadata removal in the case of a DELETE request. This diagram corresponds to an example case when an option for deduplication is enabled. In such case, several links to the same object are possible within the object based file system, e.g., as induced by existence of logical files. Upon a DELETE request with specified file ID 1401, a file system server identifies the file root MDR, at step 1402. Observe that only one file root MDR preferably corresponds to a file ID. Two implementations of deduplication are considered herein. In case of direct deduplication, all unreferenced objects are deleted instantly, while according to the second approach periodical garbage collection is employed as a background process in order to delete all unreferenced objects. In the latter case, only obtained file root MDR 1403 is removed upon a DELETE request, at step 1410, since each package with encoded chunk is referenced only once. If direct deduplication 1404 is enabled, then MDRs with a list of DRs 1406, related to the file root MDR 1403, are recovered as a part of object metadata at the step 1405. The list of DRs 1406 is further employed at step 1407 in order to find MDRs of all objects, which use the same packages with encoded chunks as the file to be deleted. At step 1408, packages, utilized only by the file with ID 1401 are deleted. Further, metadata corresponding to deleted files is removed at step 1409. Finally, file root MDR for the file with ID 1401 is also deleted from the object-based file system, at step 1410. Thus, all information about the file with ID 1401 is removed from the distributed storage system, with the exception of journal logs. A list of deleted objects can be maintained within journal logs for possible subsequent garbage collection and for statistics needs.

In the event that an option for deduplication is disabled, then MDR, DRs and packages with encoded chunks related to the file are simply removed upon DELETE request. This corresponds to file deletion operation given by steps: 1402, 1405, 1408, 1409 and 1410.

Figure 15:
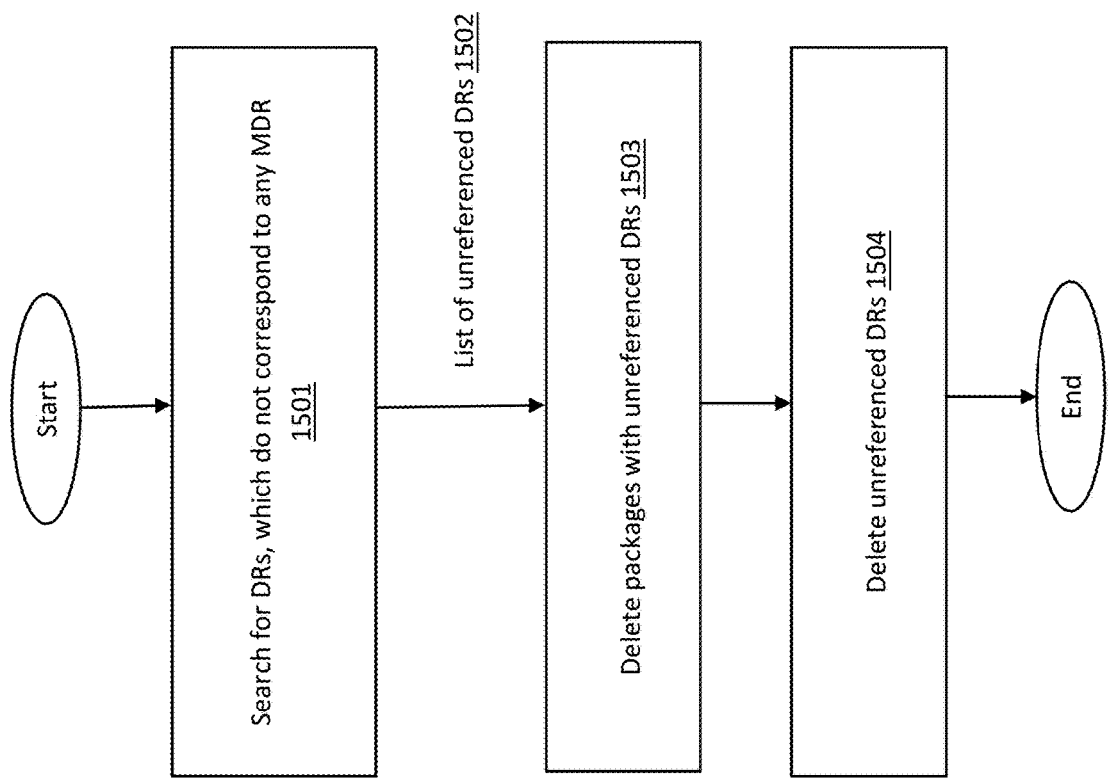
FIG. 15 is a schematic block diagram illustrating removal of unreferenced objects from the system in background regime, in accordance with the an example implementation of present application.

FIG. 15 is a schematic block diagram illustrating example removal of unreferenced objects from the system in background regime. This process may be considered as garbage collection, in which garbage is represented by unreferenced objects stored in the processing system 101 and the set of storage nodes. Garbage collection can be implemented as a background process, i.e., periodical search for unreferenced objects with their subsequent removal is performed without termination of request processing. Thus, in the case of deduplication with garbage collection, a DELETE request can be executed with much smaller latency than in the case of direct deduplication. An example garbage collection process occurs as follows. At step 1501 a search for unreferenced DRs is performed, where an unreferenced DR is a DR, which does not listed in metadata of any object. At step 1503 packages with DRs, specified by the obtained list of unreferenced DRs 1502, are deleted from storage nodes. Finally, unreferenced DRs 1502 are deleted at step 1504.

Garbage collection activities can be scheduled depending on system workload. Thus, network resources, memory resources and computational resources are utilized for garbage collection in periods of low workload.

Figure 16:
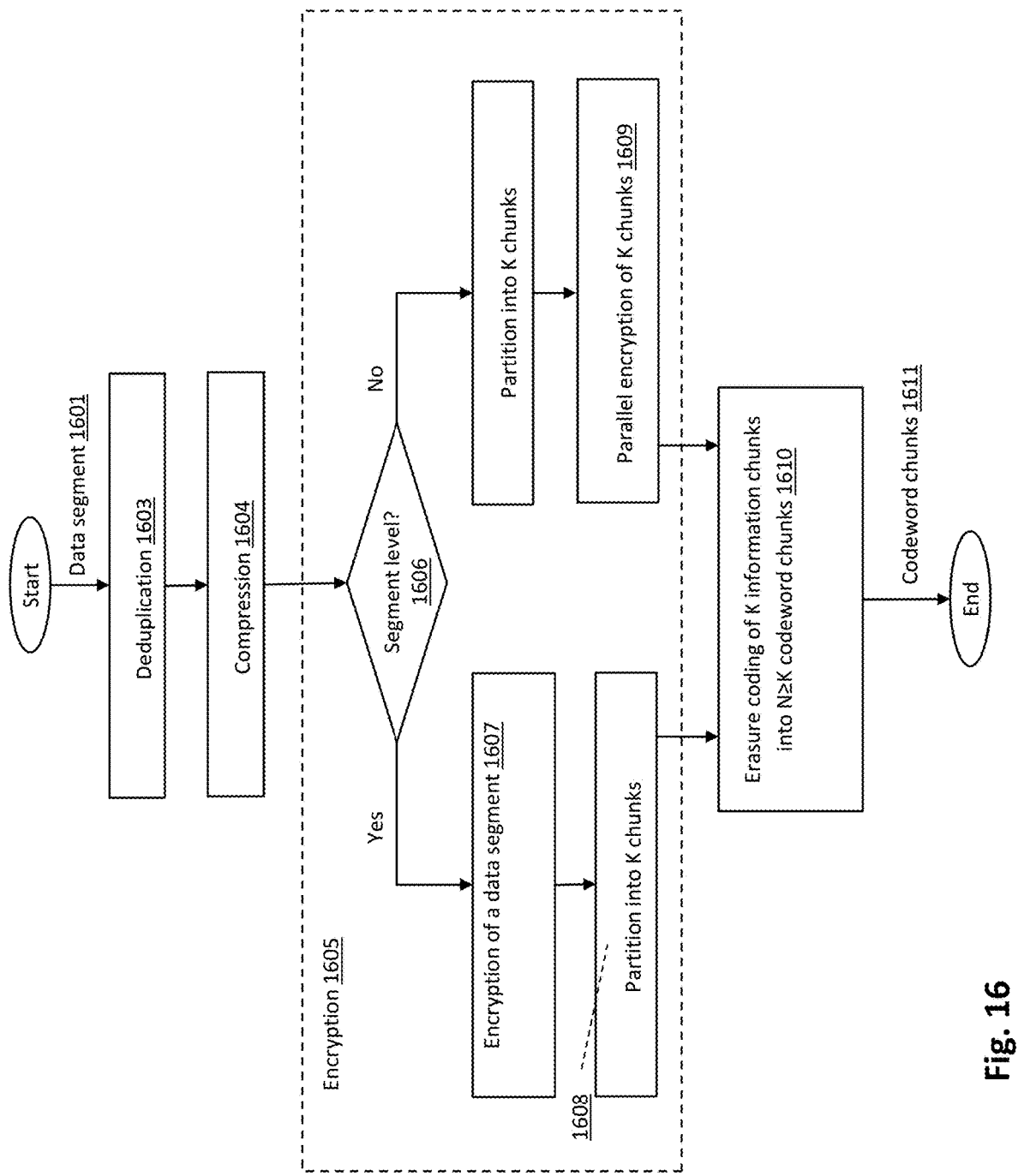
FIG. 16 is a schematic block diagram illustrating encoding of a data segment into a number of encoded chunks, in accordance with an example implementation of the present application.

FIG. 16 is a schematic block diagram illustrating example encoding of a data segment into a number of chunks. Steps shown at FIG. 16 are executed by a coding module, which is responsible for data encoding and decoding. Data segment 1601 of pre-defined size is received as input argument. Data segment 1601 is treated by the coding module as unstructured data, so only size of the data segment 1601 is relevant and no assumptions about content of the data segment 1601 are made. Integrity check is made upon data segment retrieval. Optional deduplication may be performed at step 1603. Different levels of deduplication are possible, e.g., segment-level deduplication, which is performed by comparison of HASH values for data segments of the same size, stored within the distributed storage system. Optional compression may be performed at step 1604. If a compression option is enabled, then total or selective compression is performed. A compression transformation is applied to each data segment in the case of total compression. In the case of selective compression the compression transformation is applied at first to a piece of data segment. If a reasonable degree of compression is achieved for the piece, then the compression transformation is applied to the whole data segment. A flag showing whether compression was actually applied is stored within packages with encoded chunks. Compression can be performed prior to encryption, to obtain a fair degree of compression.

In one or more implementations, an encryption step 1605 is mandatory for data segments with high secrecy degree, while optional in others. By enabling/disabling encryption for different secrecy degrees, tradeoff between security and computational complexity may be arranged. If encryption 1605 is enabled, then a segment can be encrypted as a whole, or it can be divided into several parts and each part is separately encrypted. The former strategy is referred to herein, generally, as segment level encryption, while the latter strategy is referred as chunk level encryption. Segment level encryption strategy can allow only full segment READ/WRITE requests, so in case partial READ/WRITE requests are required by the processing system 101, then chunk level strategy is selected. A strategy is identified at step 1606. In case the segment level encryption strategy is employed, the following steps can be performed: encryption of the full (optionally compressed) data segment 1607 and partition of encrypted data segment into K chunks of equal size 1608, where value of K depends on selected erasure coding scheme. In the case of chunk level encryption strategy, at first (optionally compressed) data segment is partitioned into K chunks 1608, then chunks are separately encrypted at step 1609, where each chunk is encrypted with the same key, i.e., a key per segment, or with an individual key, i.e., K keys per segment. Thus, each segment has one or several individual encryption keys, so possibility of a malicious adversary accessing all data using one stolen key is eliminated.

Erasure coding can be applied to protect data against storage node failures and provide fast data retrieval even if some storage nodes are unavailable, e.g., due to outage. Observe that erasure coding provides higher storage efficiency compared to replication. For example, in the case of triple replication two faults can be tolerated and storage efficiency is 33%. The same fault tolerance can be easily achieved with Reed-Solomon code of length 10 and dimension 8, providing storage efficiency 80%.

Moreover, erasure coding of obtained K chunks into N codeword chunks is applied at step 1610, in which an error-correction code of dimension K and length N≥K is used. A relative size of codeword chunks can be the same as the size of information chunks. During erasure coding each chunk is considered as a vector of symbols and i'th symbols of K information chunks are erasure coded into i'th symbols of N codeword chunks, in which symbol size is defined by error-correction code parameters. Thus, computations for symbols with different indices are performed in parallel, e.g., using vectorization.

According to one or more implementations, advanced encryption standard (AES) is utilized for encryption. Individual encryption keys for segments that are encrypted with KEK, generated using password-based key derivation function (PB KDF2), in which the password for the corresponding vault is employed and salt (random data), e.g., 32 bytes. The length of encryption key may be different, e.g., 128, 192 or 256 bits. Moreover, encryption is performed iteratively, where the number of rounds is set sufficiently high in order to provide desirable level of security. The number of rounds is also encoded within a package.

Selection of encryption strategy can depend on a client's preferences. In the case of segment level encryption strategy, the smallest amount of redundancy is introduced. However, this strategy allows only full segment READ and WRITE requests, since data may by encrypted and decrypted only by segments. If partial READ and WRITE requests are needed, then chunk level encryption strategy can be employed. Observe that the last strategy allows to read and write data by chunks. Chunk level strategy with K individual keys provides higher security level, however, it also introduces the highest redundancy.

Upon execution of all steps, represented at FIG. 16, one obtains an ordered list of encoded chunks 1611, where a local index of a package with encoded chunk corresponds to a chunk position within codeword of employed error-correction code.

Moreover, information about encoding methods, e.g., the number of encryption rounds and erasure coding scheme, can be applied to the data segment, which is included within related packages.

In storage systems erasure coding module operates with chunks of data. Each chunk can include a number of elements; this number is the same for all chunks. Operations performed on chunks can be parallelized, since the same computations should be performed for all elements of a chunk.

An erasure coding scheme can be specified by a generator matrix G of the selected (N, K, D) error-correction code, where N is code length, K is code dimension and D is minimum distance. Thus, N codeword chunks can be obtained as result of multiplication of K information chunks by generator matrix G. Observe that K information chunks may be reconstructed from any subset of codeword chunks of cardinality at least N−D+1. If a maximum distance separable (MDS) code, e.g., Reed-Solomon code, is employed, then only K codeword chunks are required for reconstruction of K information chunks. In one or more implementations, such generator matrix G can be selected such that any information chunk can be reconstructed only from at least s codeword chunks. Parameter s is further referred as a mixing degree. Further, codeword chunks can be divided into two groups: K mainstream chunks and N−K standby chunks. Here mainstream chunks are given by K codeword chunks, which provide low-complexity recovering of K information chunks.

Figure 17:
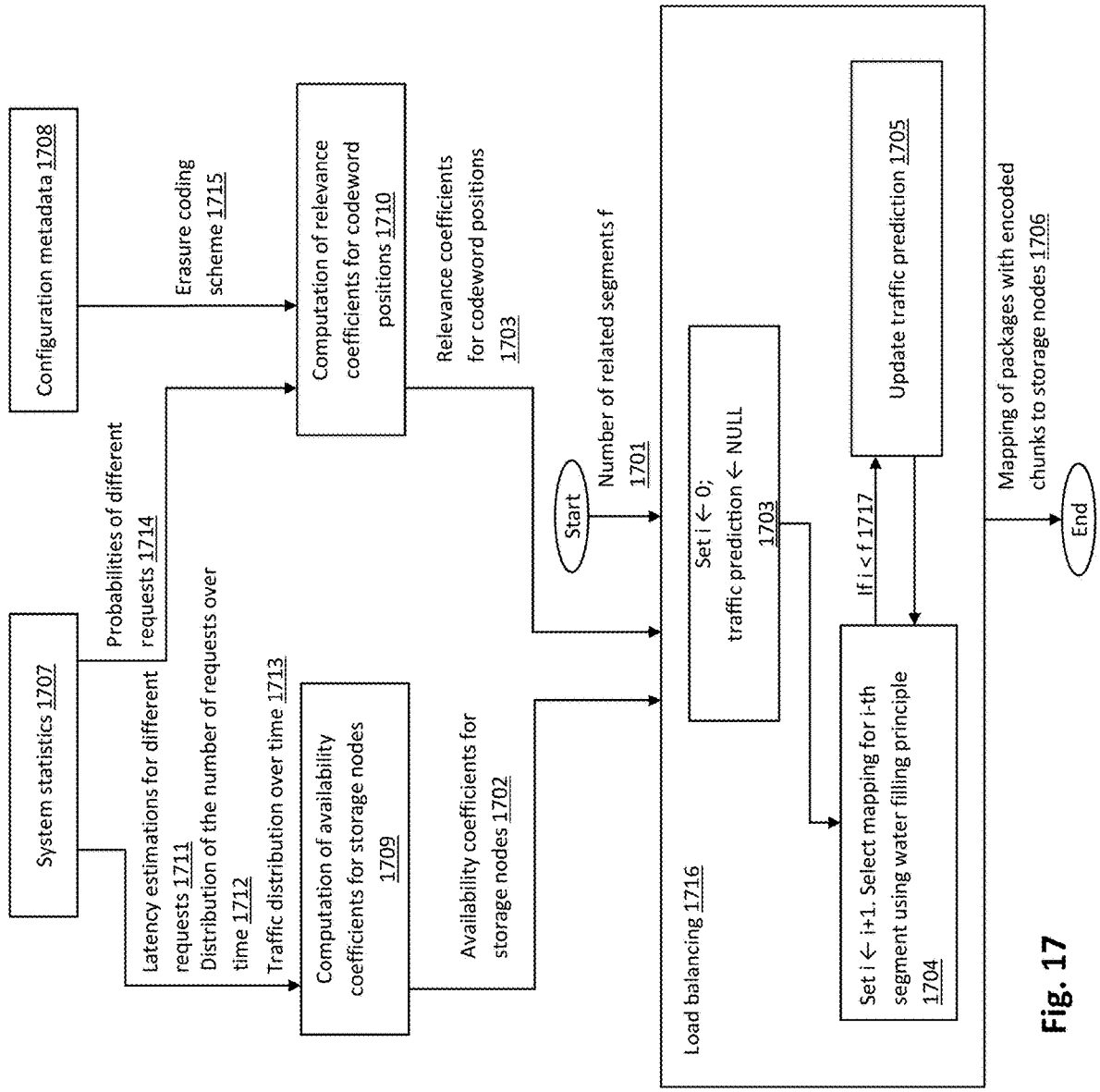
FIG. 17 is a schematic block diagram illustrating network load balancing for transmission of a group of encoded chunks produced from related segments, in accordance with an example implementation of the present application.

FIG. 17 is a schematic block diagram illustrating example network load balancing for transmission of a group of packages with encoded chunks produced from related segments. Network load balancing is optimized to reduce latency for READ and WRITE operations. For a specified number of related data segments f 1701, load balancing module 1716 constructs a mapping of packages with encoded chunks, produced from f segments, to storage nodes 1706. More particularly, a set of packages with encoded chunks produced from i'th data segment is mapped to a set of storage nodes, in which 1≤i≤f. Data segments are referred as related if simultaneous READ requests for them are predicted. For example, related data segments can be data segments produced from the same file (for large files) or from files located in the same folder (for small files). At initialization step 1703, index of data segment i is set to zero and an amount of data being transferred, referred as traffic prediction, is also set to zero. Then, steps 1704 and 1705 are alternately performed, while i≤f 1717, i.e., until all of the segments are processed. At step 1704, a mapping for i'th data segment is selected in such a way that weighted load is approximately the same for all storage nodes. Here, load for g'th storage node is estimated as $L_g = p_g + r[M_{i,g}]$, where $p_g$ is actual traffic prediction for g'th storage node, r[j] is relevance coefficient for j'th codeword position and M is a mapping matrix, such that $M_{i,g}$ is codeword position of encoded chunk, produced from i'th data segment and being transmitted to g'th storage node. In order to guarantee specified level of data protection, for any fixed i elements, $M_{i,g}$ is different. A weighted load for the g'th storage node is given by $L_g/a[g]$, where a[g] is availability coefficient for g'th storage node. Availability coefficients for storage nodes 1702 and relevance coefficients for codeword positions 1703 are provided by monitoring module and configuration module, these coefficients are periodically updated. At step 1705 traffic prediction is updated according to the mapping for i'th data segment, i.e., counters of packages for storage nodes are increased.

So, after processing of f segments load for g'th storage node is equal to $L_g = \Sigma_{i=1}^{f} r[M_{i,g}]$ and it is proposed to select mapping M in such a way that weighted load $L_g/a[g]$ is approximately the same for all storage nodes. Observe that load balancing 1716 can be considered as a greedy method, since for i=1, . . . f local optimum is found at step 1704. More complex global optimization of matrix M may be performed simultaneously for all data segments.

Computation of availability coefficients for storage nodes 1709 is based on system statistics 1707. System statistics is accumulated by monitoring module, which is distributed across the whole processing system. For example, average time between READ request sending moment (to a storage node) and package receiving moment is estimated. Similarly, for WRITE request average time between package sending moment (to a storage node) and acknowledge receiving moment is estimated. These time estimations are referred to herein, generally, as latency estimations for different requests 1711. Distribution of the number of requests over time 1712 is employed to identify groups of almost simultaneous requests for which network load should be optimized in the first place. Amount of transmitted data is measured in the case of traffic distribution 1713 analysis. The list of statistics, utilized for computation of availability coefficients, is not limited by 1711, 1712 and 1713, i.e., other available statistics may be also utilized.

Computation of relevance coefficients for codeword positions 1710 is based on system statistics 1707 and configuration metadata 1708, provided by monitoring module and configuration module, respectively. Configuration metadata 1708 can be represented by erasure coding scheme 1715. This is usable to identify codeword positions, which are accessed in the first place upon a READ request. Relevance coefficients 1703 can be jointly optimized for different request types using probabilities of different requests 1714. More particularly, probabilities of different requests 1714 are employed as weighted coefficients in linear combination of relevance coefficients optimized for different requests.

In order to minimize latency for READ and WRITE operations, the network load can be balanced. However, there is also a reliability requirement, such that none of storage nodes may receive more than one element of each codeword.

Initialization of load balancer can include computation of relevance coefficients for codeword elements, in which codewords belong to a pre-selected code and computations are based on the analysis of pre-selected encoding scheme.

Figure 18:
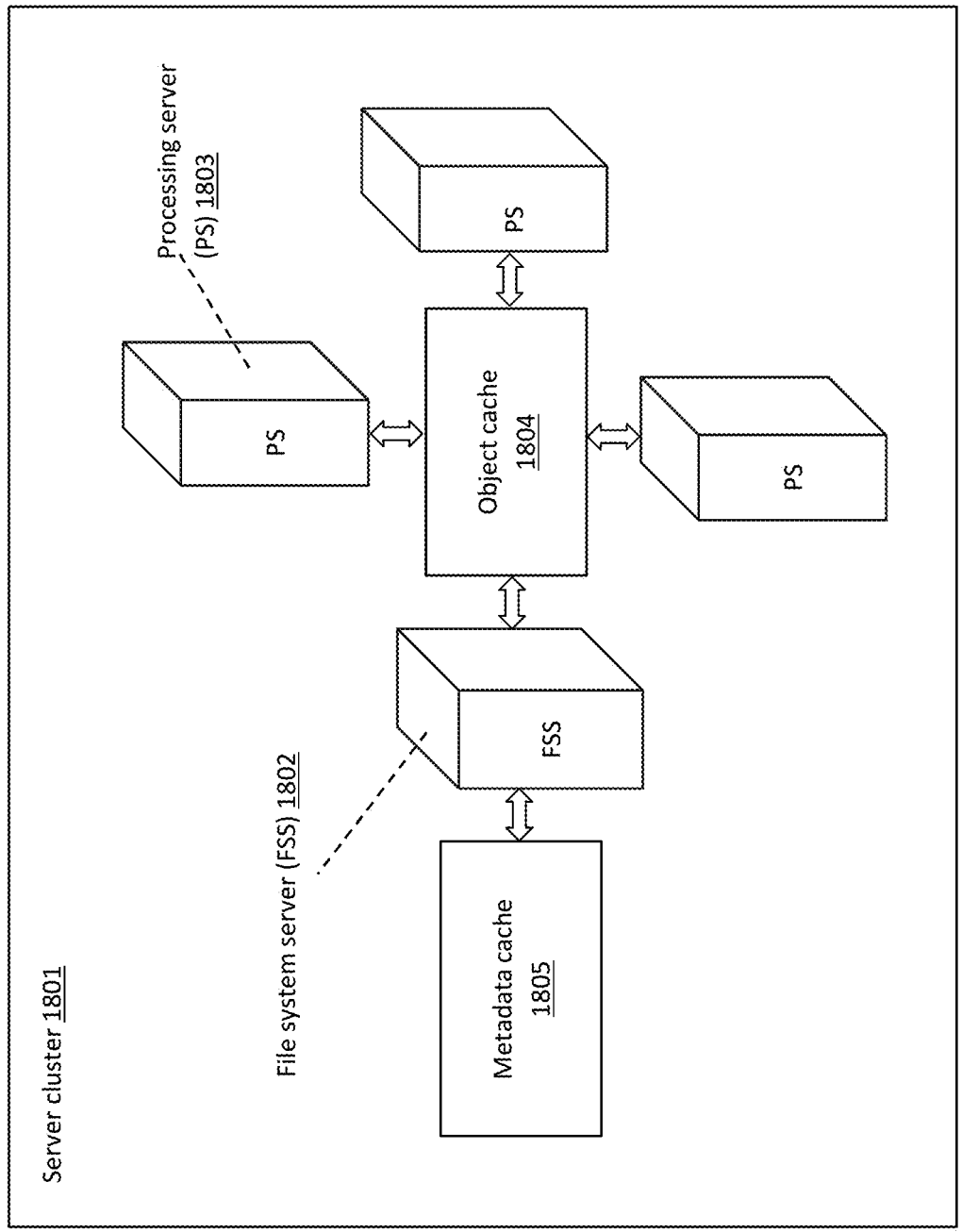
FIG. 18 is a schematic illustration of server cluster cache and its environment, in accordance with an example implementation of the present application.

FIG. 18 is a schematic illustration of an example server cluster cache and its respective environment. As noted herein, a server cluster 1801 can include a file system server (FSS) 1802 and a number of processing servers (PS) 1803. A cache located within the server cluster 1801 is considered as intermediate storage between a set of storage nodes and client applications. A server cluster cache is further referred as a cache. A cache can be divided into a metadata cache 1805 and an object cache 1804, in which a metadata cache 1805 is usable to store file system metadata and an object cache 1804 is used to store objects, e.g., data segments. In the case of a WRITE request, data from client application is kept in an object cache 1804 prior to transferring to storage nodes, while in the case of a READ request, data are transferred from storage nodes to object cache 1804 and then to the client application. Metadata cache 1805 contains the latest version of a part of file system metadata. A full version of file system metadata is stored within storage nodes, and this full version is periodically updated using partial version from the metadata cache 1805. Different parts of file system metadata are transferred from storage nodes to metadata cache 1805 on demand.

Figure 19:
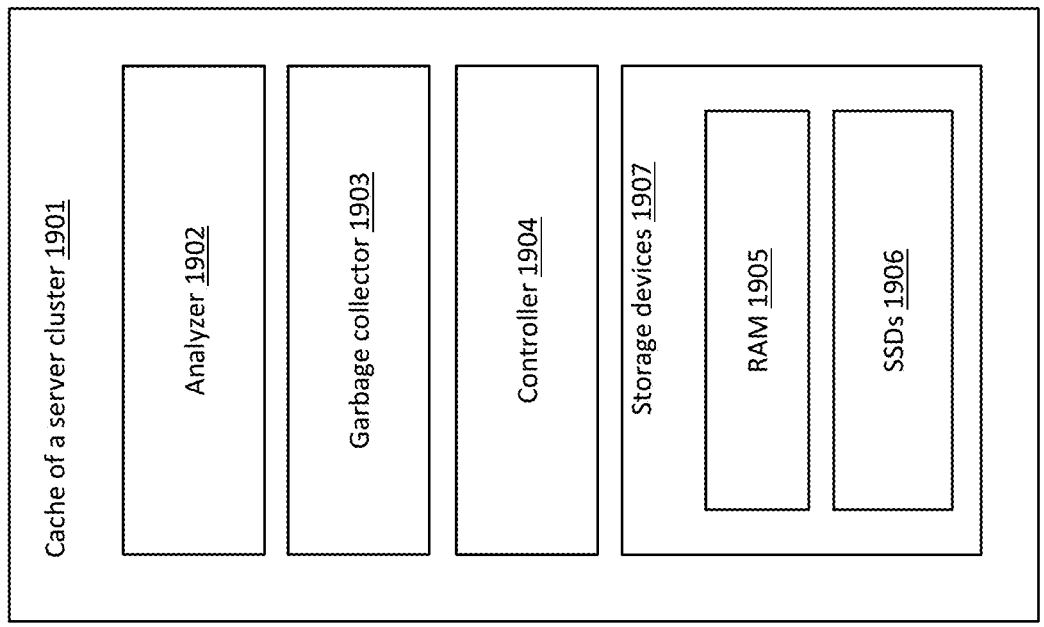
FIG. 19 illustrates components of cache located within each server cluster, in accordance with the an example implementation of present application.

FIG. 19 illustrates components of an example cache located within each server cluster. A cache of a server cluster 1901 may comprise several storage devices 1907 and, more particularly, random-access memory (RAM) 1905 and a number of solid-state drives (SSD) 1906. Storage devices 1907 can be managed by a controller 1904. Cache controller 1904 can provide the following functionality: memory allocation, reading and writing by data blocks, block status management, free space management, garbage collection initiation. Request analysis and statistical data processing can be performed by analyzer 1902. Garbage collector 1903 uses information provided by analyzer to select blocks to be deleted, thereby organizing free space for new blocks.

Cache for objects and cache for file system metadata are described separately, due to differing logical structures and functionality.

An object cache can be employed as a data buffer. Data can be transferred by portions, by segments between storage nodes and cache, and by sequences of small blocks between cache and client applications. These small blocks are further referred as r/w blocks, and their size depends on client applications. Typically r/w blocks are produced by a file system, designed for block-level storage, so r/w block size is 4 KB-512 KB. The segment size corresponds to the block size for object-level storage. In the case of object-level storage large blocks are desired, such as 1 MB-128 MB. Large blocks can be referred to herein as compound blocks, since they are obtained from contiguous r/w blocks. Observe that file systems designed for block-level storage are referred as block-based file systems, while file systems designed for object-level storage are referred as object-based file systems. Thus, data within a cache may be modified by small r/w blocks, while data stored in the cloud (i.e., distributed over storage nodes) may be modified by compound blocks. Maximum access speed can be achieved if objects are kept in a cache as single pieces. In this case, throughput also increases because of reduced amount of metadata, and the size of other file system data structures decreases.

In accordance with one or more implementations of the present application, the system operates with compound blocks, and a number of different sizes for compound blocks may be specified. A compound block size for an object can be selected depending on an object size and an object access pattern. In the case of dominating linear access pattern, large compound blocks may be more efficient, while in the case of dominating random access pattern, smaller compound blocks may be more practical. In order to identify parameters for compound block size selection, analysis of operations over files, produced by client applications, can be performed. For example, file extensions are clustered into a number of categories, depending of dominating access pattern as result of the analysis. Observe that access pattern is also useful for selection of prefetching strategy for a file, where access pattern is utilized to predict a set of compound blocks to be accessed with high probability in the near future. Moreover, analysis of file sizes is performed. For example, distribution of the number of files with different sizes may be analyzed, as well as distribution of the total number of bytes within files with different sizes. The number of categories can be specified by a client or selected by the system automatically. In a simple case, only one compound block size is selected, so that all objects are divided into compound blocks of the same size. An obtained table of file extensions with associated compound block sizes can be kept as a part of system configuration metadata, and may be reconfigured upon administrator's request. The choice of compound block size depends not only on file extension, but also on other files attributes, such as size.

Figure 20:
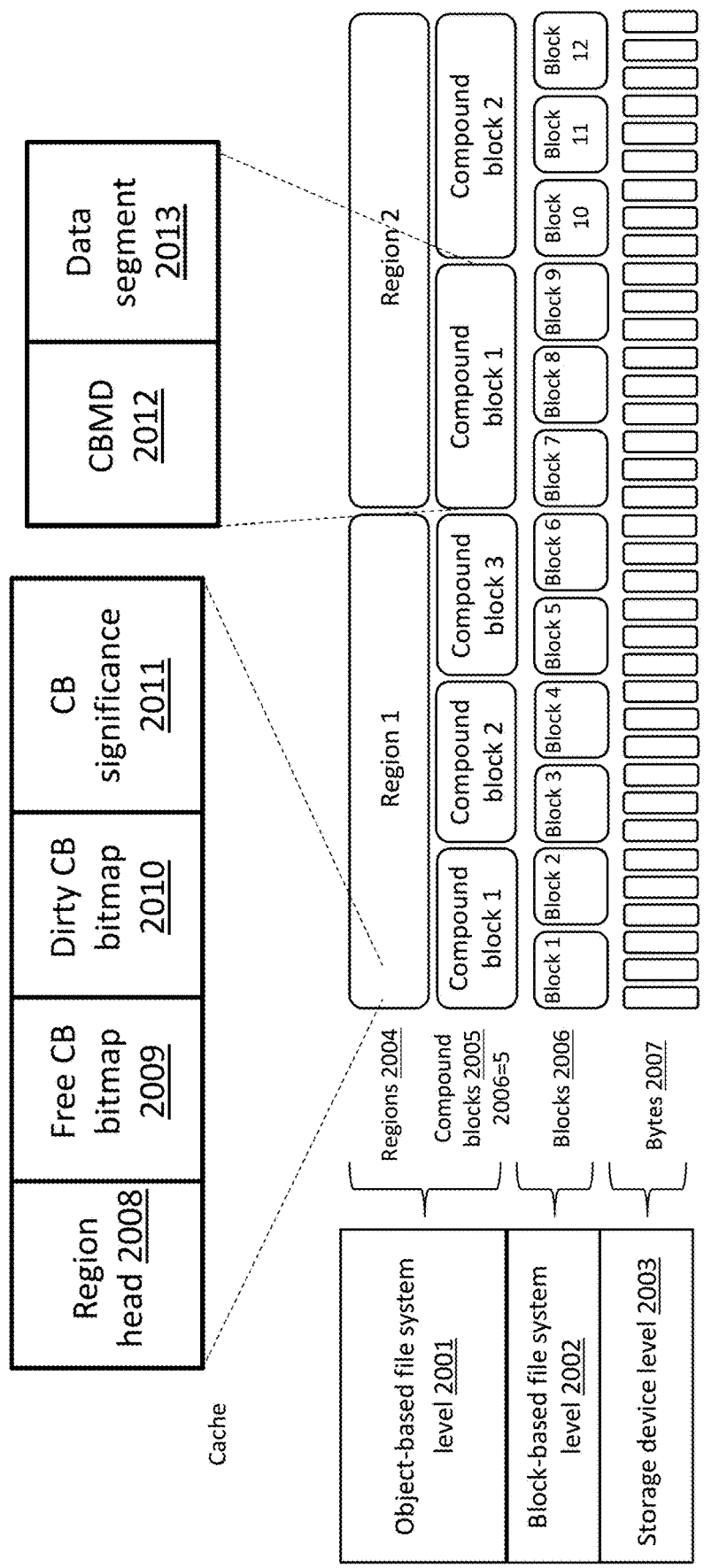
FIG. 20 shows logical structure of server cluster cache for objects, in accordance with an example implementation of the present application.

FIG. 20 shows an example logical structure of server cluster cache for objects according to the present invention. Cache logical structure comprises three levels: storage device level 2003 operating over bytes 2007, block-based file system level 2002 operating over r/w blocks 2006, e.g., 4 KB-512 KB, and object-based file system level 2001 operating over compound blocks 2005, e.g., 1 MB-128 MB, and regions 2004. Memory space is divided into regions 2004. Each region 2004 comprises compound blocks 2005 of selected size, where all compound blocks 2005 within a region 2004 have the same size. Observe that segment size for an object, is limited by the largest compound block size. Variety of compound block sizes provides opportunity to keep big objects in contiguous space, while preventing small objects from consuming too much space.

Each compound block has a unique identifier consisting of region identifier and local identifier, where local identifier specifies compound block inside region. Local identifiers are used to track statuses of compound blocks within region, as well as to access data. Thus, there can be two bitmaps: free compound blocks bitmap 2009, which shows whether a particular compound block is free or not, and dirty compound block bitmap 2010, which shows whether a particular compound block is dirty or not. Furthermore, each region has significance map 2011, where significance of a compound block depends on the last access time and statistics on files stored within the system. Compound blocks of high significance are treated as hot blocks, while blocks of low significance are treated as cold blocks. Map 2011 may be implemented together with bitmaps 2009 and 2010 as a status map, or separately from bitmaps.

Each region 2004 has region head 2008 containing region parameters together with region summary, where region summary shows the number of free compound blocks within the region, the number of dirty blocks within the region and other statistics on the region.

A file is stored within one region. A region may contain one file or several files. Region size is selected in order to provide fast memory access, easy memory management and minimize the total amount of metadata, while avoiding excessive segmentation of memory space. A new region with specified compound block size is initialized when required. Files are assigned to regions to provide compact data placement, i.e., to minimize the number of regions being employed. If region contains only free blocks, then this region is marked as free one, and it may be initialized for another compound block size.

Data in compound blocks are stored together with corresponding metadata, referred as compound block metadata (CBMD) 2012. CBMD concept is similar to encode data structure in UNIX-style file systems. CBMD contains attributes of related file segment. File segment data 2013 is stored next to CBMD, so there is no need to store compound block location explicitly. If all file data segments are stored in a region, then this region also contains all necessary metadata to reconstruct the file. Thus, file may be retrieved even if file system metadata is unavailable. File identifier is also stored as a part CBMD. CBMD may also contain free bit, dirty bit and status value, being updated each time when compound block is accessed.

Compound block size can be selected to balance the following requirements: minimization of wasted memory space, minimization of the number of compound blocks to be transmitted, implementation simplicity.

It can be seen that these requirements may not be fully satisfied simultaneously. Accordingly, a selection of the smallest compound block size, i.e., block size used by block-based file system, can be made. However, in this case the number of transmitted blocks appears to be prohibitively high. On the other hand, the number of transmitted blocks may be minimized by selection of large compound block size, which leads to transmission of blocks with small amount of relevant data in the case of small objects. Alternatively, the first and the second requirements can be satisfied by using diversity of compound block sizes. However, it may be difficult to predict how many blocks of each size is required to identify optimal region distribution. Moreover, this approach with diversity of sizes can hardly be efficiently implemented, and the probability of block selection mismatch increases (in the case of sequential READ requests). Thus, typical number of different compound block sizes recommended by the system is 1-4.

Observe that a workload may change during lifetime of the system and if later gathered statistics will show that current division by regions is not optimal, then parameters of compound block size selection method may be reconfigured.

Let us consider several scenarios related to creation of a new file, modification of existing one, i.e., downloaded from the cloud (i.e., storage nodes), and reading of a part of a file.

First we consider a new file creation with subsequent write request. File creation includes generation of corresponding metadata and metadata spreading over server clusters, more particularly, file system servers. File metadata includes file attributes, identifiers (e.g., file version), cloud location information (e.g., list of segments), file coding settings (compression settings, encryption settings, erasure coding scheme and etc.), file storage settings (e.g., flags for partial updates, intermediate storage settings) and file statistics (e.g., timestamps).

Memory allocation policy for a file stored within the processing system cache is further described. File caching parameters include maximum number of compound blocks allocated for a file and a parallel transferring threshold. R/w block size may be also considered as a parameter, where r/w block size indicates granularity of data writes and reads. Further, parallel transferring threshold is equal to the number of recently updated (hot) compound blocks which must be sent only sequentially, other compound blocks of a given file may be sent in parallel. In the case of file opening event a fixed number of compound blocks is allocated. Compound blocks may be transferred to storage nodes by request or by timeout.

Figure 21:
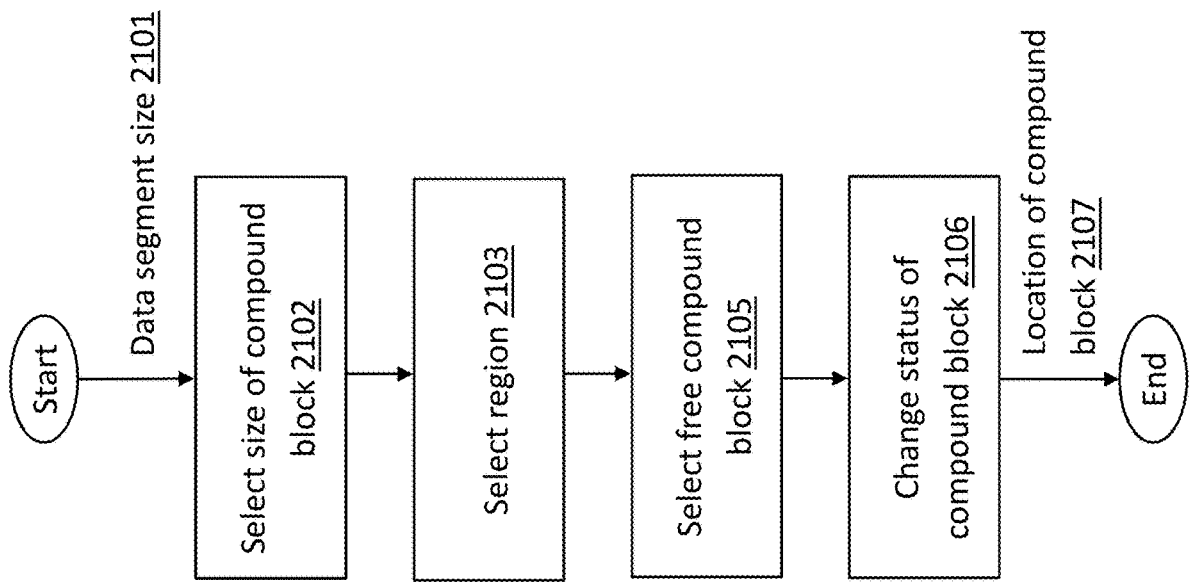
FIG. 21 is a schematic block diagram illustrating memory allocation for an object, in accordance with an example implementation of the present application.

FIG. 21 is a schematic block diagram illustrating example memory allocation for an object. The amount of allocated memory is given by data segment size 2101 supplemented by metadata. At step 2102 size of compound block is selected from a pre-defined set. At step 2102 compound block size equal to specified data segment size 2101 is selected. At step 2103 the nearest (fast accessible) region with free compound blocks of required size is selected. Recall that information on free blocks in a region is a part of region summary located in region head. So, there is no need to scan free CB bitmap. Then a free compound block within selected region is occupied at step 2105 and its status is changed at step 2106. Location of compound block 2107 is given by the address of selected region and address of the compound block within region.

If there is no free compound blocks of the size equal to data segment size 2101, then one of the following two strategies is employed. The first strategy consists in a selection of compound block size t-times smaller than the data segment size 2101, where t is as small as possible and t such blocks are available. The second strategy consists in one using garbage collector to arrange free compound blocks of data segment size 2101. However, probability of free compound block absence is very low, since the processing system performs monitoring of free blocks and garbage collection on a regular basis.

Figure 22:
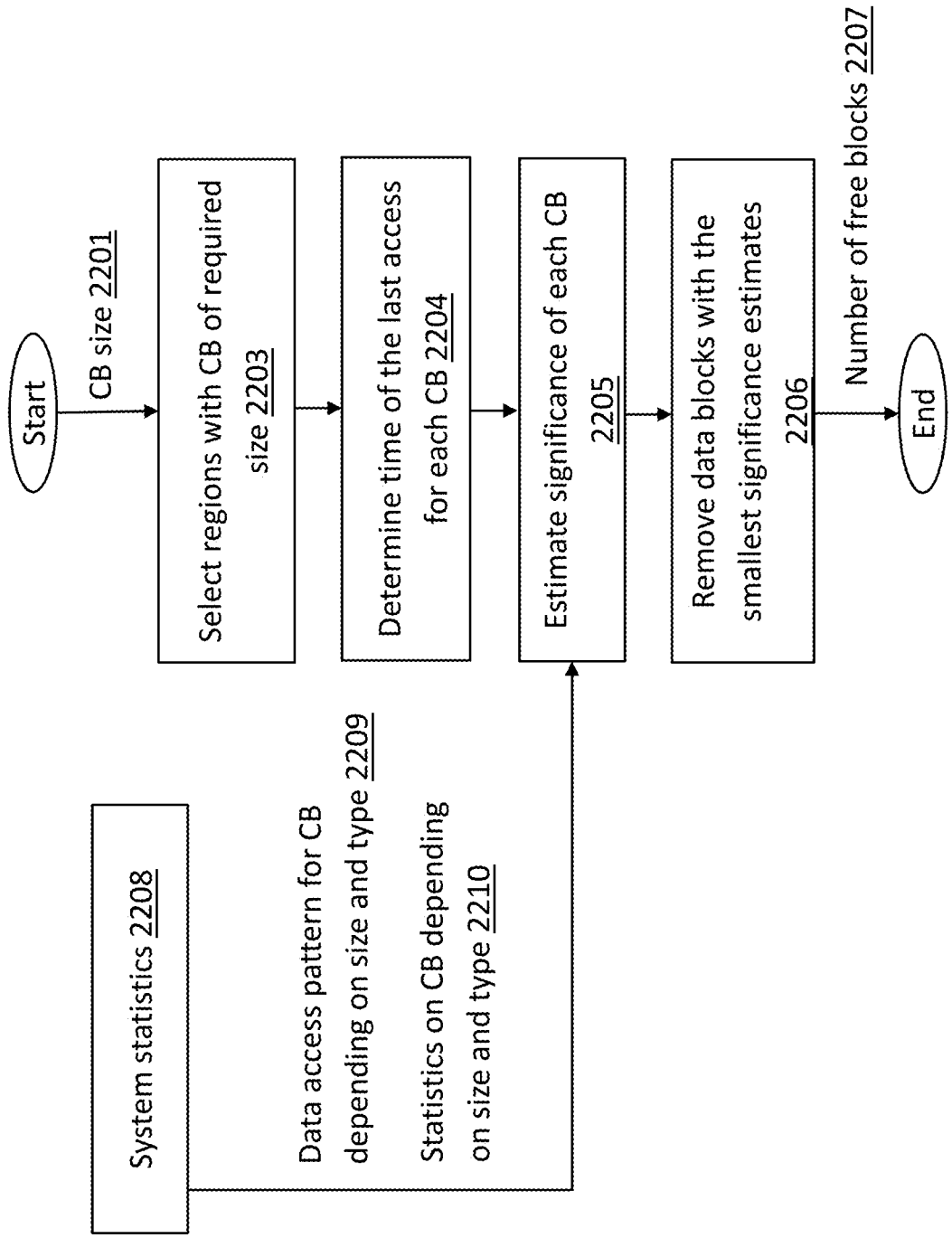
FIG. 22 is a schematic block diagram illustrating removal of obsolete objects from a server cluster cache for objects in order to arrange free space for new objects, in accordance with an example implementation of the present application.

FIG. 22 is a schematic block diagram illustrating an example removal of obsolete objects from server cluster cache for objects in order to arrange free space for new objects, this procedure is referred as garbage collection. Garbage collection comprises three processes: free space monitoring, relocation process and removal process. The problem of garbage identification reduces to estimating probability for each compound block to be accessed. Compound blocks marked as garbage are later deleted. Free space monitoring process, arranged as background process, estimates the number of free compound blocks within each region and analyses segmentation level. Segmentation level of a region depends on location of free compound blocks. More particularly, if free compound blocks are located in contiguous manner, then segmentation level is low; if almost all free compound blocks are separated by utilized compound blocks, then segmentation level is high. Depending on segmentation level estimates, relocation processes may be started.

In order to estimate the number of free compound blocks for a region free space monitoring process utilizes region summary, located within region head, or scans free compound block bitmap and updates region summary. Region summary information is utilized if it was recently updated, otherwise free compound block bitmap is used. The number of free compound blocks in all regions is analyzed depending on compound block size. If the number of free compound blocks of a particular size in initialized regions is lower than a pre-defined threshold, and there is no memory space to arrange new region, then the removal process is started for regions with compound blocks of specified size.

Removal process for a specified compound block size 2201 proceeds as follows. At first regions with compound blocks of size 2201 are identified at step 2203. Further steps correspond to separate processing of these regions. Thus, these regions may be processed sequentially or in parallel. In step 2204 information on the last access time for each utilized compound block within region is accessed. At step 2205 significance of each compound block is estimated. In general case significances of related compound blocks are jointly computed, since these significances depend on distribution of the last access time (for these related compound blocks) and system statistics 2208. Typically related compound blocks are given by compound blocks produced from the same file. Significance computation method is employed with different parameters for files of different types. Choice of parameters for a file type mostly depends on data access pattern 2209 dominating for this file type. Other statistics 2210 may be also utilized. Compound blocks, produced from adjacent data segments of a file, have similar significances in the case of dominating linear access pattern, while these significances are almost independent in the case of dominating random access pattern. In a simple case, such parameters for significance computation method are selected, that joint computations for related compound blocks may be reduced to independent computations for each compound block. Computed significances are written into compound block significance map. Steps 2204 and 2205 may be skipped if compound blocks significance map was recently updated. At step 2206 less significant compound blocks are removed from server cluster cache for objects. Observe that compound blocks marked as dirty may not be deleted.

Metadata can be cached within server clusters. According to one or more implementations of the present application, distributed storage system may comprise one or several server clusters. There is one file system server containing metadata per each server cluster. File system servers store identical copies of metadata.

Figure 23:
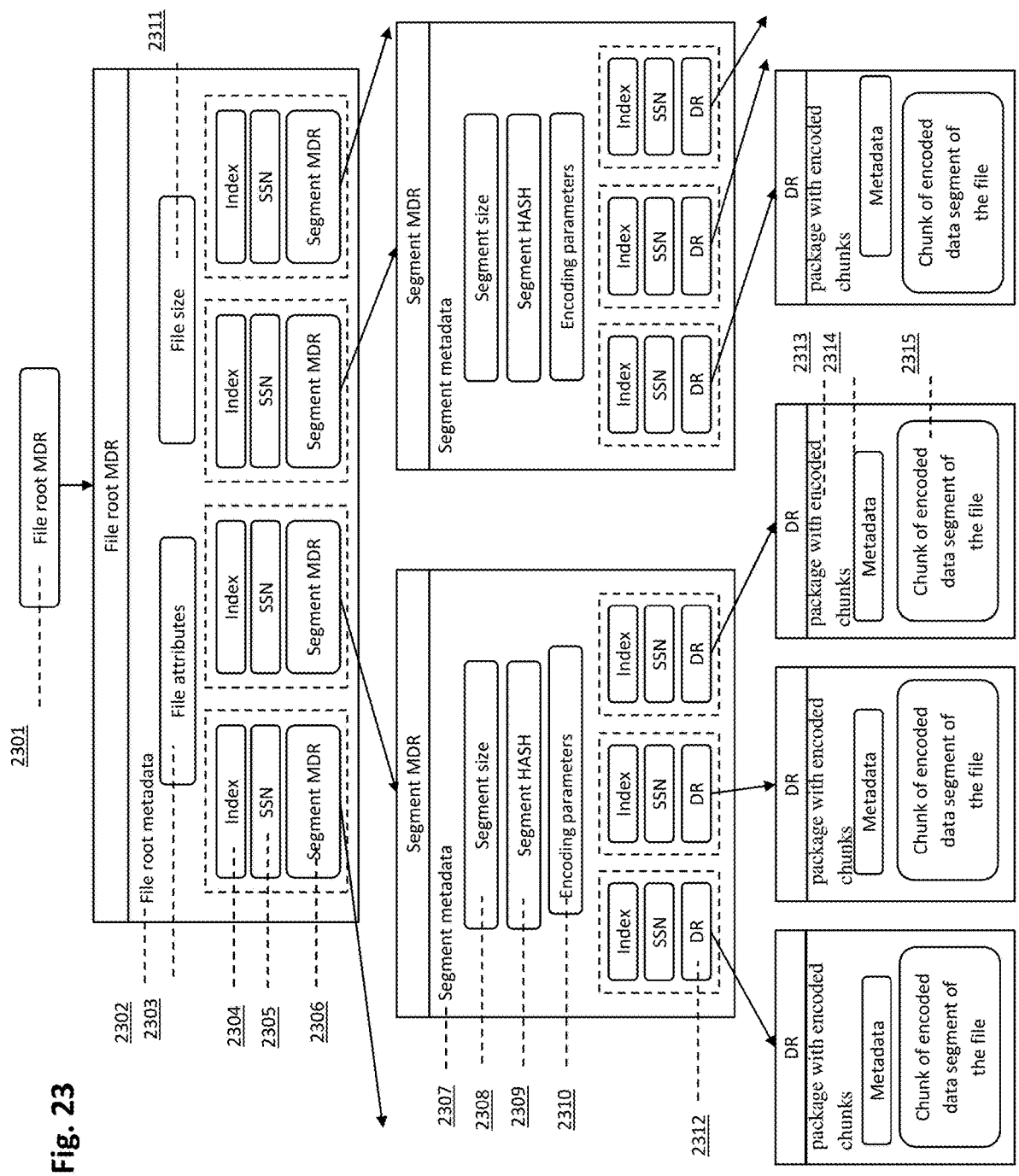
FIG. 23 shows an example of file representation within the distributed storage system, in accordance with an example implementation of the present application.

FIG. 23 illustrates an example of file representation within the distributed storage system. Here, only several entities contain original file data and metadata, provided by client application. Original file data is represented by chunks of encoded data segment of the file 2315, while original file metadata is given by file attributes 2303 and it is also partially kept within package metadata 2314. Other entities are classified as system metadata, which is relevant only within the object-based distributed storage system.

File data and metadata are distributed over storage nodes and may be requested using references. A reference can include prefix, type, HASH and identifier. The first part of reference, i.e., prefix, identify a particular instance of distributed storage system, vault within the system and volume within the vault. The second part of reference is type of the content stored by this reference. Thus, type shows whether content is represented by data or metadata, e.g., file root metadata or segment metadata. Type also shows whether content is related to a logical file, comprising a number of small files, or to a typical file. The third part of reference is HASH of the content stored by this reference. The fourth part of reference is any identifier, which is able to guarantee reference uniqueness. This identifier may be randomly generated. HASH value is employed for deduplication and for integrity check. Thus, if some content is duplicated in the system, then corresponding references contain the same HASH and almost certainly the same prefix and type. Upon identification of two references, which are different only in the fourth part, content comparison is performed, and in the case of coincidence, one reference is replaced by the second one and content, related to the first reference, is removed from the system. Observe that it is assumed that there is almost no intersection between data stored within different volumes, so deduplication is performed separately for each volume. For each file there is a special file root metadata reference, which does not depend on file content, i.e., it does not contain HASH.

Hereinabove a reference is classified as data reference (DR) or metadata reference (MDR). DR is a reference to encoded original data, while MDR is a reference to metadata containing DRs and/or MDRs. MDRs and DRs of a file are arranged into tree, referred as file reference tree. In this particular example file reference tree contains three levels, where the first level is represented by file root MDR 2301, the second level is represented by segment MDRs 2306 and the third level is represented by DRs 2312. In general case the number of levels may be different, while leaves are always given by DRs. In the case of large files the number of levels may be increased, while decreased in the case of small files. File root MDR is a special MDR, providing opportunity to iteratively retrieve all file data and metadata from storage nodes. File root MDR is unique for each file.

File root metadata 2302, accessible by file root MDR 2301, includes file attributes 2303, file size 2311 and a list of segments, where each segment within the list is specified by its index 2304, i.e., position within the file, subset of storage nodes (SSN) 2305 and segment MDR 2306. Here indices 2304 are required to recover a file from data segments. Segment metadata 2307 may be transferred using corresponding segment MDR 2306 from any storage node belonging to SSN 2305. If segment metadata 2307 is t-times replicated, then corresponding SSN 2305 includes t storage nodes. Segment metadata 2307 can include segment size 2308, segment HASH 2309, codes parameters 2310 and list of packages with encoded chunks, produced from the segment. A location of a package is specified by DR 2312 and SSN, as in the case of segment metadata location. SSN for a package typically consists of one storage node, since data segment is erasure coded and no additional replication is required. Index shows a local position of a package with encoded chunk, i.e., the position of encoded chunk within codeword of employed error-correcting code. Erasure coding scheme, e.g., error-correcting code, encryption method and compression method are specified in encoding parameters 2310. Package 2313, accessible by corresponding DR 2312, includes metadata 2314 and a chunk of encoded data segment of the file 2315. Here metadata 2314 may include metadata for the related chunk 2315, as well as metadata for the file in general.

Figure 24:
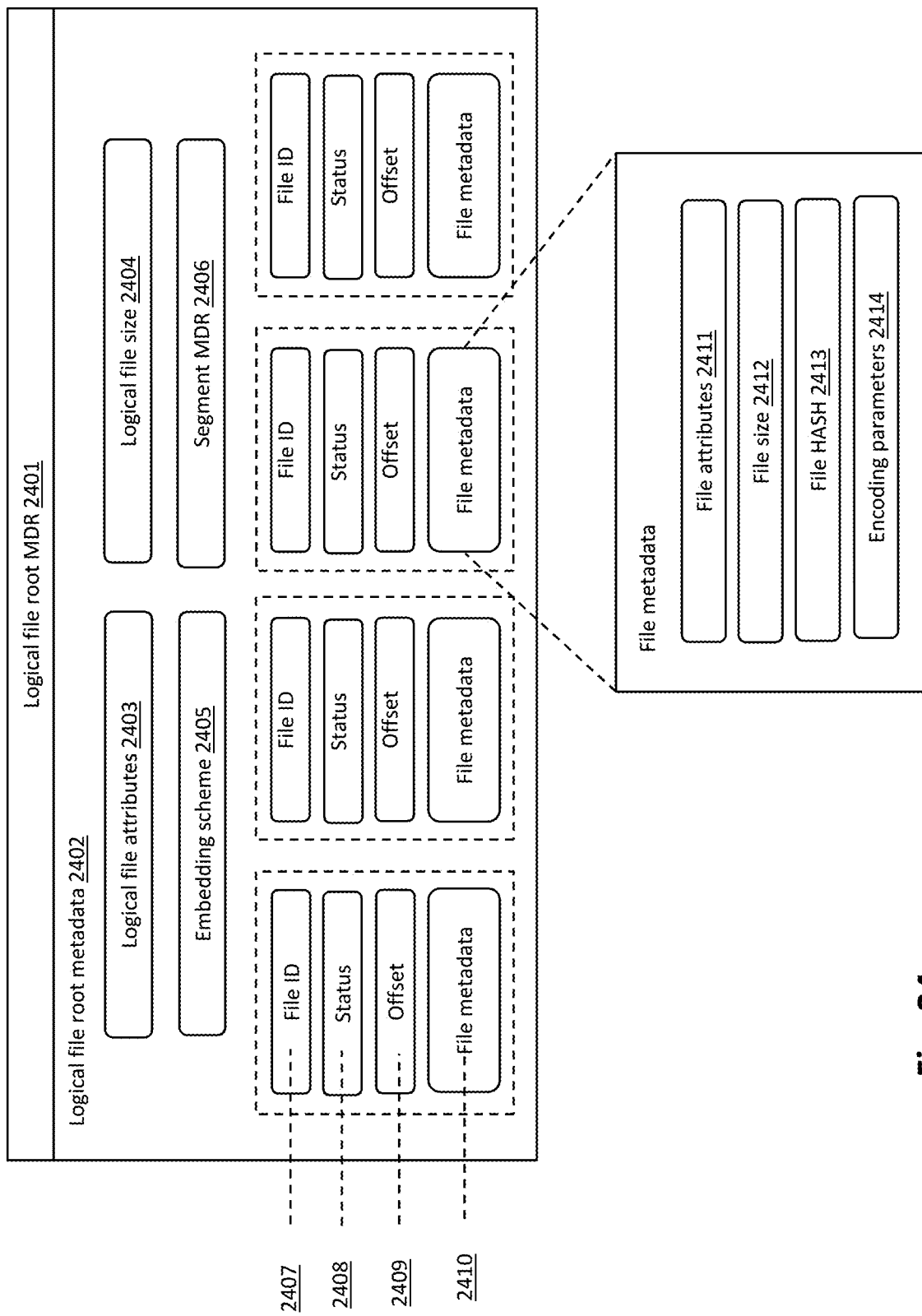
FIG. 24 shows an example of logical file metadata, in accordance with an example implementation.

FIG. 24 shows an example of logical file metadata. Logical file root MDR 2401 is needed for iterative retrieval of logical file together with corresponding metadata and references from storage nodes. Distributed storage system operates with logical file root metadata 2402 in the same way as with file root metadata, represented at FIG. 23. Logical file root metadata 2402, stored under reference 2401, can include common metadata and separate metadata for each embedded file. Common metadata comprises attributes of the logical file 2403, being similar to attributes of a typical file, size of the logical file 2404, small files embedding scheme 2405 and segment MDR 2406. Structure of segment metadata, stored under segment MDR 2406, is represented at FIG. 16. Logical file is always packed within one segment, so 2402 contains only one segment MDR. Observe that distributed storage system may operate with segments of different sizes. Size of logical file 2404 should not exceed size of corresponding segment. If such data piece is appended to one of embedded files, that logical file does not fit in the data segment anymore, then initial logical file may be rearranged into two logical/typical files.

Each embedded file is represented within logical file root metadata 2402 by file ID 2407, file status 2408, file offset 2409 and file metadata 2410. File ID 2407 helps to retrieve data for a particular embedded file. File status 2408 shows whether an embedded file is active or deleted. File offset 2409 shows location of embedded file data within data segment. File metadata 2410 is metadata of a particular embedded file, this metadata is independent of the scheme. If logical file is rearranged, then file metadata 2410 is just copied into a new logical file. There are two main reasons for logical file rearrangement: garbage collection (for embedded files with status "deleted") and logical file size exceeding segment size. File metadata 2410 can include file attributes 2411, file size 2412, file HASH 2413 and encoding parameters 2414. Embedded file may be compressed and/or encrypted prior to combining with other files, wherein this initial encoding is described by encoding parameters 2414. This means that all steps shown in FIG. 16, except erasure coding 1610, may be individually applied to each embedded file, and then the same steps (with another parameters) are applied to a data segment produced from the logical file.

For files stored within the distributed storage system, object-based file system keeps a pair given by and including file ID and file root MDR. Pairs are organized into logical tables and the system can operate with them as with key-value pairs. Logical tables are arranged as B+ tree or another structure designed for efficient data retrieval in a block-oriented storage context. Frequently used part of logical tables is cached on the client side, where it arranged as a data structure for maintaining key-value pairs under condition of high insert volume, e.g., log-structured merge (LSM) tree. Logical tables distributed over storage nodes can be updated by timeout or if the amount of changes exceeds a threshold (i.e., in the case of high workload).

Logical tables can be partitioned into segments, which are encoded into chunks encapsulated into a package and distributed over storage nodes. Erasure coding or replication is employed to guarantee protection against storage nodes failures and to provide high speed retrieval even in the case of storage node outages. Partition scheme for logical tables is also packed in encoded chunks encapsulated in packages. Segments of logical tables are retrieved on demand and cached on the client side. Partition scheme is optimized in order to minimize the number of packages being transferred from storage nodes, that is to maximize probability that simultaneously needed parts of the tree are packed together.

Figure 25:
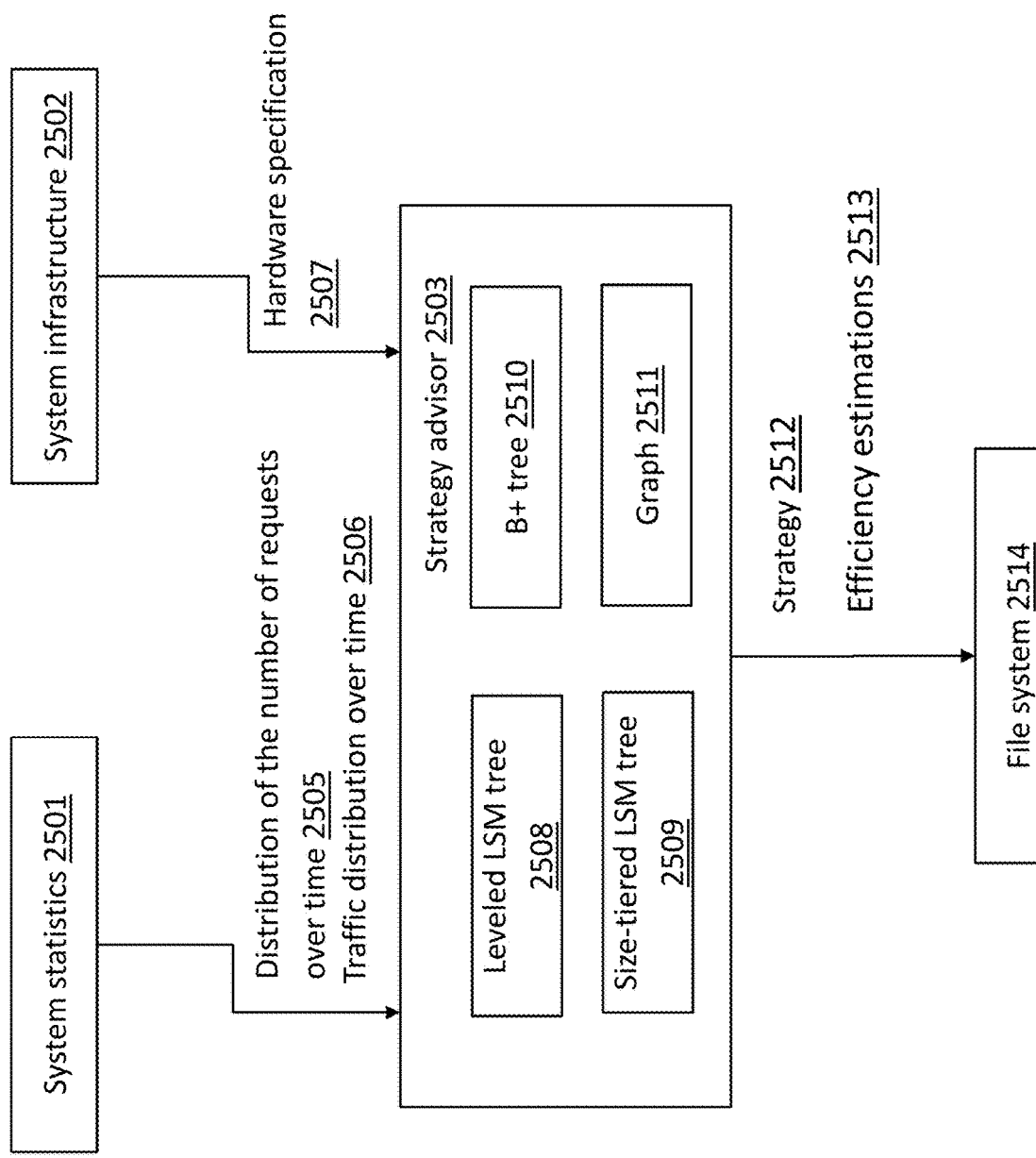
FIG. 25 is a schematic block diagram illustrating selection of a data representation structure for file system management within server cluster cache for metadata, in accordance with an example implementation.

FIG. 25 is a schematic block diagram illustrating an example selection of a data representation structure for file system management within server cluster cache for metadata. Various data structures have different advantages and disadvantages. A data structure can be selected based on analysis of a particular distributed storage system. Distribution of the number of requests over time 2505, being a part of system statistics 2501, can be employed by strategy advisor 2503 to identify predominant operations and operations performed with high frequency over some periods of time. Traffic distribution over time 2506 represents an amount of data processed by the system, when performing various operations. Thus, distribution of the number of requests over time 2505 characterize intensity of various operations, while traffic distribution over time 2506 characterize their significance. System infrastructure 2502 is also of great importance, so hardware specification 2507 is also utilized by strategy advisor 2503. If the number of write requests is much higher than the number of read requests, then LSM tree is an appropriate structure, since it is designed specially for the case of intensive insertions. However, search over LSM tree may not be as fast over a B+ tree, and so smaller latency for read operation is provided by B+ tree 2510. A more general data structure than a tree may be needed in the case of some functional requirements, for these cases directed graph 2511, e.g., with cycles, is employed. There are two types of LSM trees: leveled LSM tree 2508 and size-tiered LSM tree 2509. Size-tiered LSM tree 2509 is selected only if write operations are performed with excessive intensity, while the number of read operations is disparagingly small. Leveled LSM tree with its performance characteristics stands between B+ tree and size-tiered LSM tree. Selected strategy 2512 is utilized by object-based file system 2514. Efficiency estimates 2513 for the strategy 2512 are provided to be compared with statistical data, which will be further obtained during system lifetime according to selected strategy 2512.

Details and features of the present application directed to erasure coding is now provided.

Systems and methods to encode data, retrieve and repair data, as well as to distribute data over storage nodes are provided. Proposed methods are optimized for the needs of cloud storage systems, e.g., security is provided via information dispersal. High storage efficiency can be provided by the selected construction of error correcting code. Low latency is guaranteed by network load balancing, low complexity encoding and small I/O overhead in the case of repair.

Figure 26:
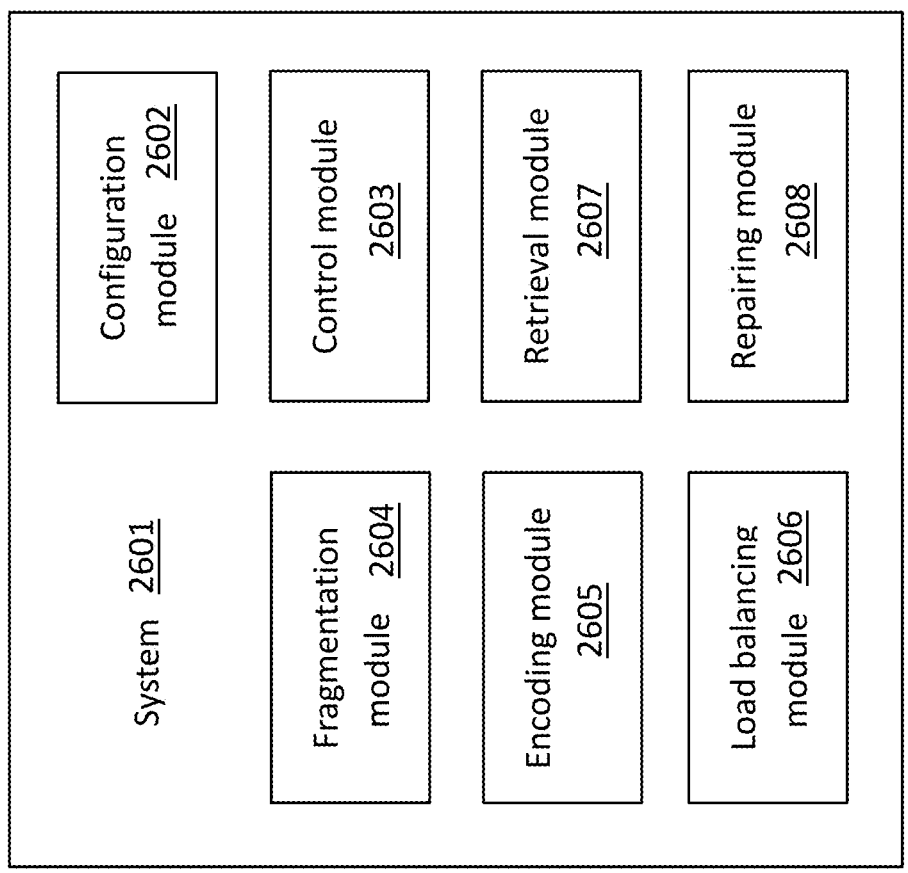
FIG. 26 shows modules of a system, arranged to execute error-correction coding, in accordance with an example implementation.

FIG. 26 shows modules of an example system 2601, arranged to execute data encoding and decoding using an error-correcting code. The system 2601 comprises five modules, arranged to execute data processing, which are managed by a control module 2603 according to system configuration provided by configuration module 2602. Configuration module 2602 keeps specification of the employed error-correcting code together with encoding and decoding settings. Specification of an error-correcting code includes at least code parameters; if an error-correcting code is based on a number of component codes, then the code specification also comprises specifications of component codes and their composition scheme. Fragmentation module 2604 performs partition of original data into segments. Each segment is processed in an individual manner. Segments may have different sizes or the same size; segment size depends on the system requirements. Encoding module 2605 performs encoding of segments with error-correcting code. Chunks of encoded data are assigned to storage nodes by load balancing module 2606 to provide low latency data retrieval. Retrieval module 2607 performs reconstruction of original data from a sufficient number of encoded chunks, downloaded from storage nodes. In the case of storage node failure an old storage node is replaced by a new one, and repairing module 2608 is employed to reconstruct data within a new storage node.

Figure 27:
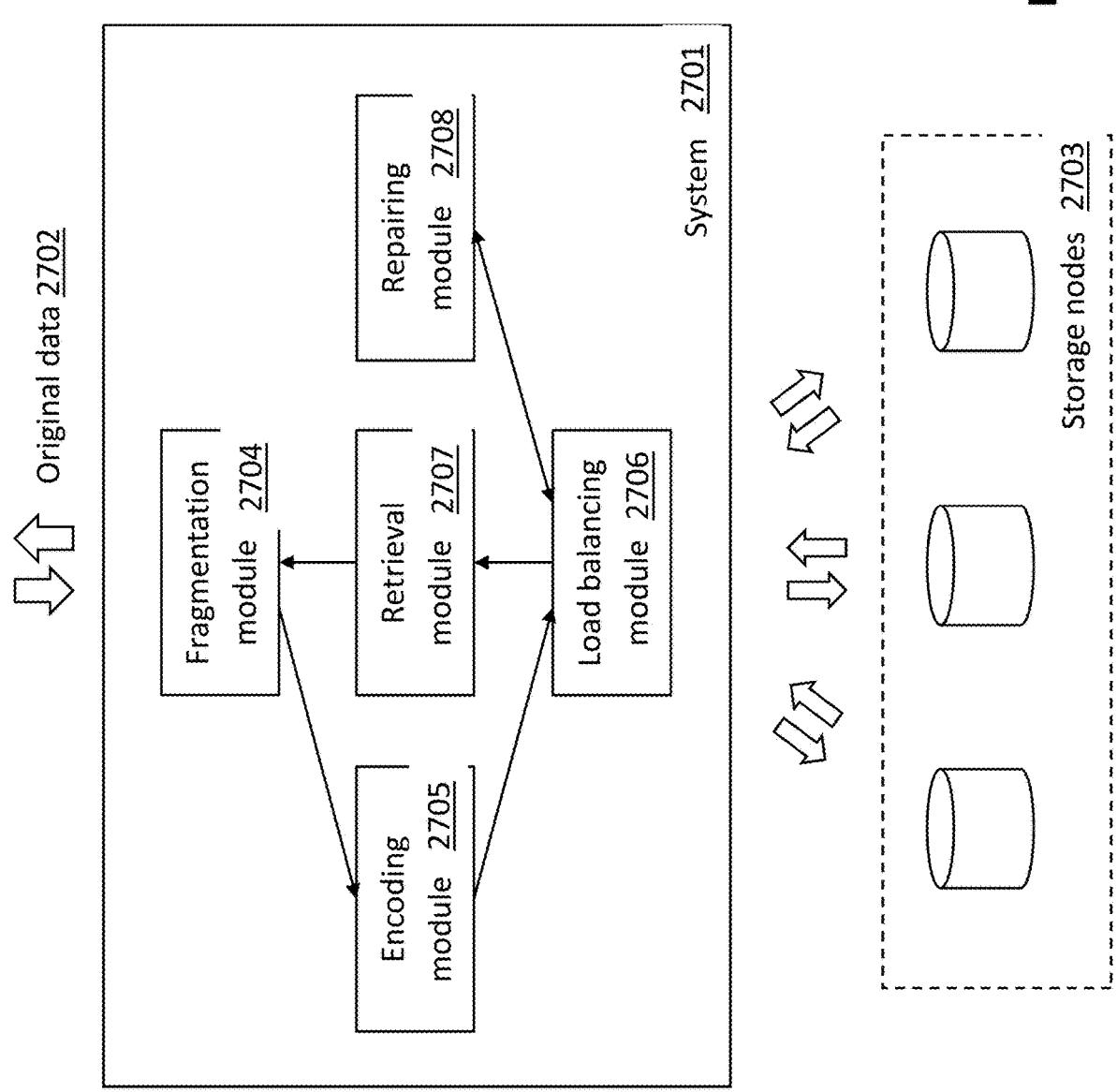
FIG. 27 is a schematic block diagram illustrating the interrelationship of modules of a system, arranged to execute error-correction coding, and environment of the system, in accordance with an example implementation.

FIG. 27 is a schematic block diagram illustrating an example interrelationship of modules of a system, arranged to execute error-correction coding, and environment of the system. Original data 2702 is encoded and distributed over storage nodes 2703 by the system 2701, as well as retrieved from storage nodes 2703 on demand.

Original data 2702, received by the system 2701, is partitioned into segments by fragmentation module 2704. Then a number of encoded chunks are generated for each segment by encoding module 2705. Load balancing module 2706 generates mapping of encoded chunks to storage nodes, where mapping is optimized to reduce average latency for segment retrieval operation. Encoded chunks are further transmitted to storage nodes 2703 according to the mapping. Storage nodes 2703 work independently from each other and may be located in different areas. Observe that mapping may be generated by load balancing module 2706 in parallel with data encoding by module 2705, or mapping generation may be combined with transmission of encoded chunks to storage nodes 2703.

Upon request, original data 2702 is reconstructed from encoded chunks distributed over storage nodes 2703 as follows. Load balancing module 2706 selects several storage nodes, from which encoded chunks are downloaded for a particular segment. Retrieval module 2707 performs reconstruction of a segment from a sufficient number of encoded chunks. Observe that in the case maximum distance separable (MDS) codes possibility of data reconstruction does not depend on the positions of encoded chunks within a codeword; however, the present invention mostly deals with non-MDS codes, wherein positions of encoding chunks affect data reconstruction possibility and computational complexity. Obtained segments are further combined by fragmentation module 2704 in order to recover original data 2702.

In the case of storage node failure an old storage node is replaced by a new one, and repairing module 2708 is employed to reconstruct data within a new storage node. Repairing module 2708 is able to reconstruct lost encoded chunks from a sufficient number of available encoded chunks, produced from the same segment.

Figure 28:
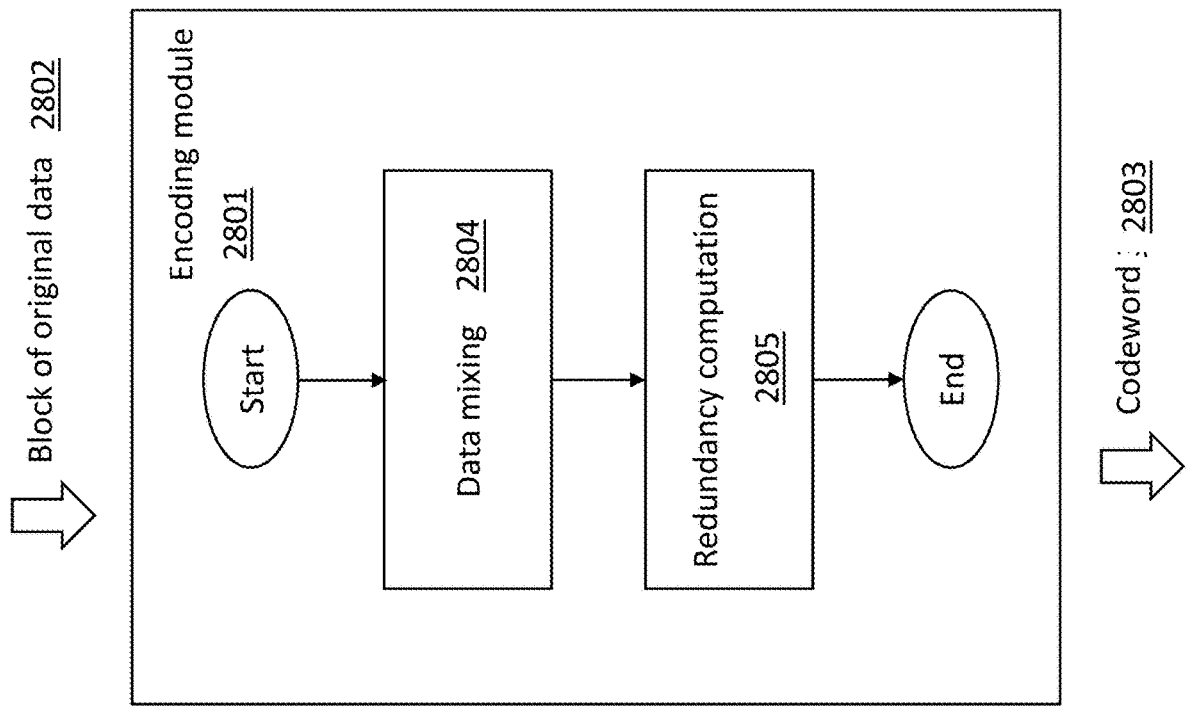
FIG. 28 shows a flow diagram of steps executed within encoding module in the case of system supporting only full block WRITE requests, in accordance with an example implementation of the present application.

FIG. 28 shows a flow diagram of example steps executed within encoding module 3801. The case of full block encoding is considered. Prior to actual encoding, a block of original data 3802 is divided into K chunks and encoding results in a codeword 3803, consisting of N encoded chunks, where K is dimension of an error-correcting code and N is its length. Chunks of block 3802 and encoded chunks of codeword 3803 have the same size. During encoding each chunk is considered as a sequence of elements and i'th elements of K chunks of block 3802 are encoded into i'th elements of N chunks of codeword, where element size is defined by error-correcting code parameters. Thus, computations for elements with different indices are performed in parallel, e.g., using vectorization. For the sake of simplicity, but without loss of generality, description of the invention is given for the case of chunks consisting of a single element. Thus, encoding is further described for a block of original data 3802, consisting of K elements, and codeword 3803, consisting of N elements.

High storage efficiency and high erasure correction capability are provided by the selected construction of error-correcting code, where storage efficiency is given by code rate K/N. Error-correcting code is may be specified by any of its K×N generator matrices. Security is guaranteed by encoding using such generator matrix G, that any chunk with original data can be reconstructed only from at least s encoded chunks, where s is referred as mixing degree. Thus, even if up to s−1 storage nodes are compromised, a malicious adversary will not be able to recover original data.

This approach is implemented as follows. An K×N generator matrix G of mixing degree s is represented as $G=MG^{(syst)}$, where M is K×K non-singular matrix and $G^{(syst)}$ is generator matrix for systematic encoding, i.e., K columns of matrix $G^{(syst)}$ constitute identity matrix, indices of these columns are further referred as systematic positions. Observe that mixing degree of matrix M is at least s, matrix M is further referred as mixing matrix. Given block of original data 3802 x of length K, encoding module computes codeword 3803 $c=xMG^{(syst)}$. At step 3804 a mixed vector $x^{(mix)}$ of length K is computed as $x^{(mix)}=xM$. Observe the codeword c comprises K elements of mixed vector $x^{(mix)}$, further referred as mainstream elements, while other N−K codeword elements are computed at step 3805, these N−K are further referred as standby elements. At step 3805 Multiplication of the mixed vector $x^{(mix)}$ by K×(N−K) submatrix R of generator matrix $G^{(syst)}$ is performed, wherein submatrix R can include N−K columns at non-systematic positions.

Codeword elements are classified into mainstream elements and standby elements in order to arrange low complexity retrieval of original data. More particularly, mixing matrix M is optimized to insure that K original data elements may be reconstructed from K mainstream elements with low computation complexity. Moreover, if mixing degree s<K and partial retrieval is supported by the system, then mixing matrix M is further optimized to insure that individual original data elements may be reconstructed from the smallest possible number of mainstream elements. Observe that this number could not be lower than s. Thus, mainstream elements are requested in priority from storage nodes.

Original data elements are reconstructed from mainstream elements as result of multiplication by matrix $M^{-1}$, where $M^{-1}$ is inverse matrix for M. In order to reduce encoding and retrieval complexity the number of zeros and units within matrices M and $M^{-1}$ is maximized. However, the number of non-zero elements in each column of matrix $M^{-1}$ must be at least s, since matrix M has mixing degree s. Observe that encoding complexity depends on complexity of multiplication of a vector by matrix M, while retrieval complexity depends on complexity of multiplication of a vector by matrix $M^{-1}$.

A class of mixing matrices of the following structure is introduced for the case of $$s \le \frac{K}{2}$$

$$M = P^{(left)} S P^{(right)},$$

where $P^{(left)}$ and $P^{(right)}$ are K×K permutation matrices, and S is a block-diagonal matrix composed from non-singular matrices $S_i$ of mixing degree at least s, thus $$S = \begin{pmatrix} S_0 & 0 & \dots & 0 \\ 0 & S_1 & \dots & 0 \\ \vdots & \vdots & \ddots & \vdots \\ 0 & 0 & \dots & S_{v-1} \end{pmatrix}.$$

So, dimension of each full rank matrix $S_i$ is at least s×s. Permutation matrix $P^{(left)}$ defines a permutation within original data vector x, while permutation matrix $P^{(right)}$ defines a permutation within mixed data vector $x^{(mix)}$. Inverse matrix $S^{-1}$ has the same structure as matrix S, more particularly, $$S^{-1} = \begin{pmatrix} S_0^{-1} & 0 & \dots & 0 \\ 0 & S_1^{-1} & \dots & 0 \\ \vdots & \vdots & \ddots & \vdots \\ 0 & 0 & \dots & S_{v-1}^{-1} \end{pmatrix}.$$

In the case of cloud storage systems it is particularly important to reduce network load. If the number of original data elements to be written is equal to K, i.e., full block write operation, then the number of encoded chunks transferred to storage nodes is always equal to the length N of an error-correcting code. If a whole block of original data needed to be recovered, then the number of encoded chunks transferred from storage nodes is lower bounded by K. However, in the case of partial write/read operations it is possible to provide much lower network load, than in the case of full block write/read operations. Thus, in the case of partial write operation network load is reduced due to block-diagonal structure of matrix S. Similarly, for partial read operation network load is reduced due to block-diagonal structure of matrix $S^{-1}$. For example, if only elements of original data corresponding to matrix $S_i$ are written, then the number of codeword elements to be updated is upper bounded by the sum of the number of standby elements and dimension of matrix $S_i$. In order to retrieve elements of original data corresponding to matrix $S_i$ it is sufficient to download from storage nodes mainstream elements corresponding to matrix $S_i$.

Moreover, block-diagonal structure of matrices S and $S^{-1}$ insures low computational complexity for encoding and retrieval of original data.

Figure 29:
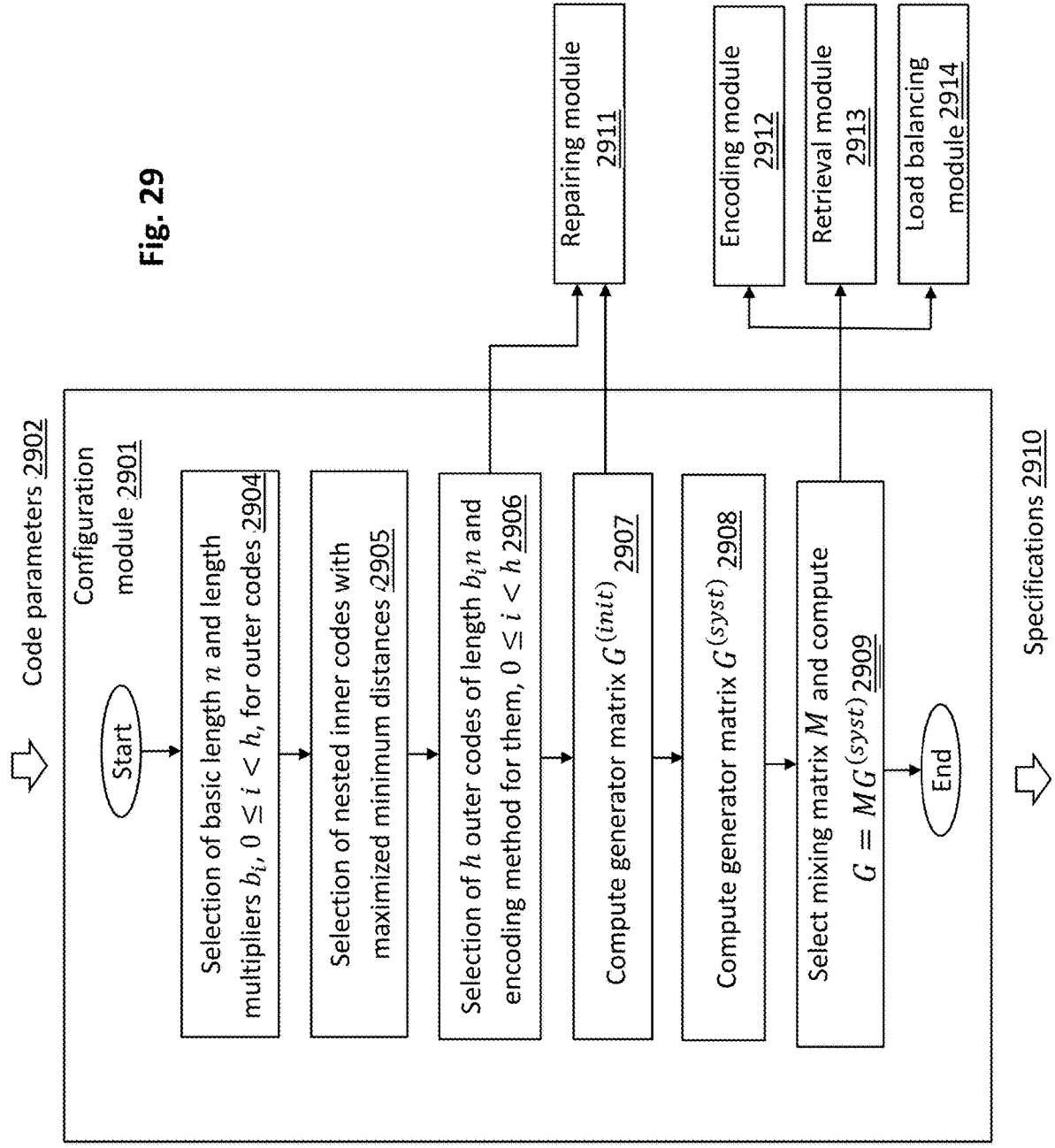
FIG. 29 is a schematic block diagram illustrating design of an error-correcting code, where the error-correcting code specifies configuration of other modules of the system, in accordance with an example implementation of the present application.

FIG. 29 is a schematic block diagram illustrating design of an error-correcting code according to an example implementation of the present application. Specifications of the error-correcting code and corresponding mixing matrix are further utilized by other modules of the system.

Error-correcting code being employed is an (N=nt, K, D) linear block code C over Galua field GF ($2^m$), where code length N is the number of elements in codeword vector and code dimension K is the number of elements in the data vector and minimum distance D is the smallest number of positions in which two codewords of code C are different. Configuration module 2901 receives code dimension K and code length N≥K as input arguments 2902. An (N=nt, K, D) error-correcting code C is constructed by configuration module 2901 as follows. Code C comprises a number of component codes, wherein component codes are classified into two categories: outer codes and inner codes. Lengths of outer codes are divisible by n, while inner codes have the same length t. Structure of code C is such that decoding in code C reduces to decoding in its component codes. For example, any single erasure may be recovered in a code of length t, so values of no more than t−1 elements are required. Particular values of n and t may be received as input arguments 2902 together with N and K, or selected by the configuration module 2901 at step 2904 together with length multipliers $b_0, \ldots, b_{h-1}$, where h is the number of outer codes. Lengths of h outer codes are given by $nb_0, \ldots, nb_{h-1}$.

At step 2905 a set of nested inner codes is selected, wherein minimum distances of inner codes are maximized. All inner codes in the set have length t. Dimension of inner codes is upper bounded by $u=\Sigma_{i=0}^{h-1} b_i$. First of all, (t, u, $w_0$) linear code $C_0^{(inner)}$ is selected as inner code with the highest dimension, wherein minimum distance $w_0$. Then, such generator matrix $G_0^{(inner)}$ for the code $C_0^{(inner)}$ is selected, that minimum distances of codes generated by matrices $G_i^{(inner)}$ have the highest possible minimum distances $w_i$, where $G_i^{(inner)}$ is a matrix consisting of the last $\Sigma_{j=i}^{h-1} b_j$ rows of matrix $G_0^{(inner)}$, 0≤i<h. For example, maximum distance separable (MDS) code, e.g., Reed-Solomon code, or binary linear code can be selected as code $C_0^{(inner)}$. Observe that only code $C_0^{(inner)}$ will be employed for encoding, while the whole set of inner codes is utilized for data retrieval and repair.

At step 2906 outer codes $C_i^{(outer)}$ are selected, where 0≤i<h and h is such that $\Sigma_{9=0}^{h-1} b_i = u$. Codes $C_i^{(outer)}$ have such parameters ($b_i n, k_i, d_i$), that $$\frac{k_0}{b_0} \leq \frac{k_1}{b_1} \leq \ldots \leq \frac{k_{h-1}}{b_{h-1}},$$

$\Sigma_{i=0}^{h-1} k_i = K$ and minimum distance D of code C is maximized, as well as minimum distances $d_i$, 0≤i<h. Reed-Solomon codes or other MDS codes can be employed as outer codes $C_i^{(outer)}$. Observe that condition $\Sigma_{i=0}^{h-1} k_i = K$ is needed to ensure required total dimension K. Further generator matrices in systematic form $G_i^{(outer)}$ are selected for outer codes $C_i^{(outer)}$, 0≤i<h.

At step 2907 code C is specified by its generator matrix $G^{(init)}$ obtained from matrices $G_0^{(inner)}$ and $G_i^{(outer)}$, 0≤i<u, as follows. First, K×un matrix $G^{(outer)}$ is constructed from $k_i \times b_i n$ matrices $G_i^{(outer)}$, 0≤i<h $$G^{(outer)} = \begin{pmatrix} G_0^{(outer)} & 0 & \ldots & 0 \\ 0 & G_1^{(outer)} & \ldots & 0 \\ \vdots & \vdots & \ddots & \vdots \\ 0 & 0 & \ldots & G_{h-1}^{(outer)} \end{pmatrix}.$$

Observe that the number of columns of each matrix $G_i^{(outer)}$ is multiple of n, 0≤i<h, and parameters of contiguous matrices $G_i^{(outer)}$ and $G_{i+1}^{(outer)}$ are such, that $$\frac{k_i}{k_{i+1}} \leq \frac{b_i}{b_{i+1}}.$$

Second, matrix $G^{(inner)} = G_0^{(inner)} \otimes U^{(n \times n)}$ is computed, where $U^{(n \times n)}$ is n×n matrix consisting of units and ⊗ denotes Kronecker product. Since $G_0^{(inner)}$ is u×t matrix, matrix $G^{(inner)}$ has un rows and tn columns. Third, K×N generator matrix $G^{(init)}$ is computed as $G^{(init)} = G^{(outer)} \cdot G^{(inner)}$, where N=tn. Observe that matrix $G^{(outer)}$ depends only on selected outer codes, while matrix $G^{(inner)}$ depends only on selected inner codes.

At step 2908 systematic generator matrix $G^{(syst)}$ is obtained from $G^{(inner)}$. More particularly, linear operations over rows of K×N matrix $G^{(inner)}$ are employed in order to obtain K×N matrix $G^{(syst)}$ comprising K×K identity matrix. According to one implementation, Gaussian elimination is utilized.

At step 2909 generator matrix $G=MG^{(syst)}$ is computed, where selected mixing matrix M is such that any element of vector x can be reconstructed only from at least s elements of codeword c=xG. Generator matrix G specifies encoding scheme for designed error-correcting code C of dimension K and length N.

Obtained generator matrix G, comprising mixing matrix M as submatrix, is further utilized by encoding module 2912, retrieval module 2913 and load balancing module 2914. Generator matrix $G^{(init)}$ together with generator matrices for inner and outer codes are utilized by repairing module 2911, wherein repairing module 2911 performs recovering of codeword elements by decoding in code C assuming that generator matrix $G^{(init)}$ was used for encoding. All code specifications 2910 are also stored within configuration module.

According to one implementation, minimum distance of inner codes is at least 2. So, inner code $C_0^{(inner)}$ is able to recover at least one erasure. From the structure of matrix $G^{(init)}$ it can be seen, that a codeword c of the code C can include n codewords of (t, u<t, $w_0 \geq 2$) code $C_0^{(inner)}$, so any element $c_i$ can be expressed as a linear combination of at most t−1 other elements $c_j$, 0≤j<N, 0≤i<N. Thus, any erased codeword element may be locally decoded using at most t−1 other codeword elements, provided that their values are available.

Observe that if all length multipliers $b_i$ are equal to one, then the proposed construction code C reduces to an instance of generalized concatenated code with outer codes of length n and inner codes of length t. On the other hand, if the number of outer codes h is equal to one, then there is one outer code of length $nb_0$ and one inner code of dimension u=1, and the proposed construction of code C reduces to an instance of regenerating code.

Computation of generator matrix in systematic form $G^{(syst)}$ from generator matrix $G^{(init)}$, performed at step 2908, is further described in more details. Recall, that a×b matrix is referred as a matrix in systematic form when it contains a×a identity matrix as a submatrix, a≤b, and a set of column indices containing this submatrix is referred as a set of systematic positions. It is assumed that the generator matrices $G_i^{(outer)}$, 0≤i<h, are in the systematic form with the set of systematic positions $A_j^{(outer)} \subseteq \{0, 1, \ldots, b_in-1\}$, $|A_j^{(outer)}| = k_i$, satisfying the following conditions:

$$A_{i,0}^{(outer)} \subseteq A_{i,1}^{(outer)} \subseteq \ldots \subseteq A_{i,b_i-1}^{(outer)}, \text{ where}$$
$$A_{i,j}^{(outer)} = \{a \in A_i^{(outer)} | jn \le a < (j+1)n\};$$

$$A_{0,0}^{(outer)} \subseteq A_{0,b_0-1}^{(outer)} \subseteq A_{1,0}^{(outer)} \subseteq A_{1,b_1-1}^{(outer)} \subseteq \ldots \subseteq A_{h-1,0}^{(outer)} \subseteq A_{h-1,b_{h-1}-1}^{(outer)}.$$

Let $A_0^{(inner)}$ be a some set of systematic positions for the code $C_0^{(inner)}$, then for the code C there exists a generator matrix $G^{(syst)}$ with systematic positions $A = \{a + n\hat{a} | a \in A_i^{(outer)}, \hat{a} = \sum_{j=0}^{i-1} b_j \text{ and } \hat{a} \in A_0^{(inner)}\}$. Given set of systematic positions $A_0^{(inner)}$ for the code $C_0^{(inner)}$, corresponding systematic generator matrix $G_0^{(inner,syst)}$ may be obtained as $G_0^{(inner,syst)} = L^{(inner)} \cdot G_0^{(inner)}$, wherein $L^{(inner)}$ is a non-singular matrix. Then $G^{(syst)} = L \cdot G^{(init)}$, wherein a K×K matrix L is obtained from matrix $L^{(inner)}$ by substituting $L^{(inner)}[i,j] \cdot Q^{(i,j)}$ instead of $L^{(inner)}[i,j]$, where B[i,j] is j'th element of i'th row of matrix B and $Q^{(i,j)}$ is $s_i \times s_j$ binary matrix, such that $Q^{(i,j)}[g,j]=1$ for $g+in \in A$ and $Q^{(i,j)}[g,j]=0$, otherwise, where $s_i = |\{a \in A | in \le a < (i+1)n\}|$.

Figure 30:
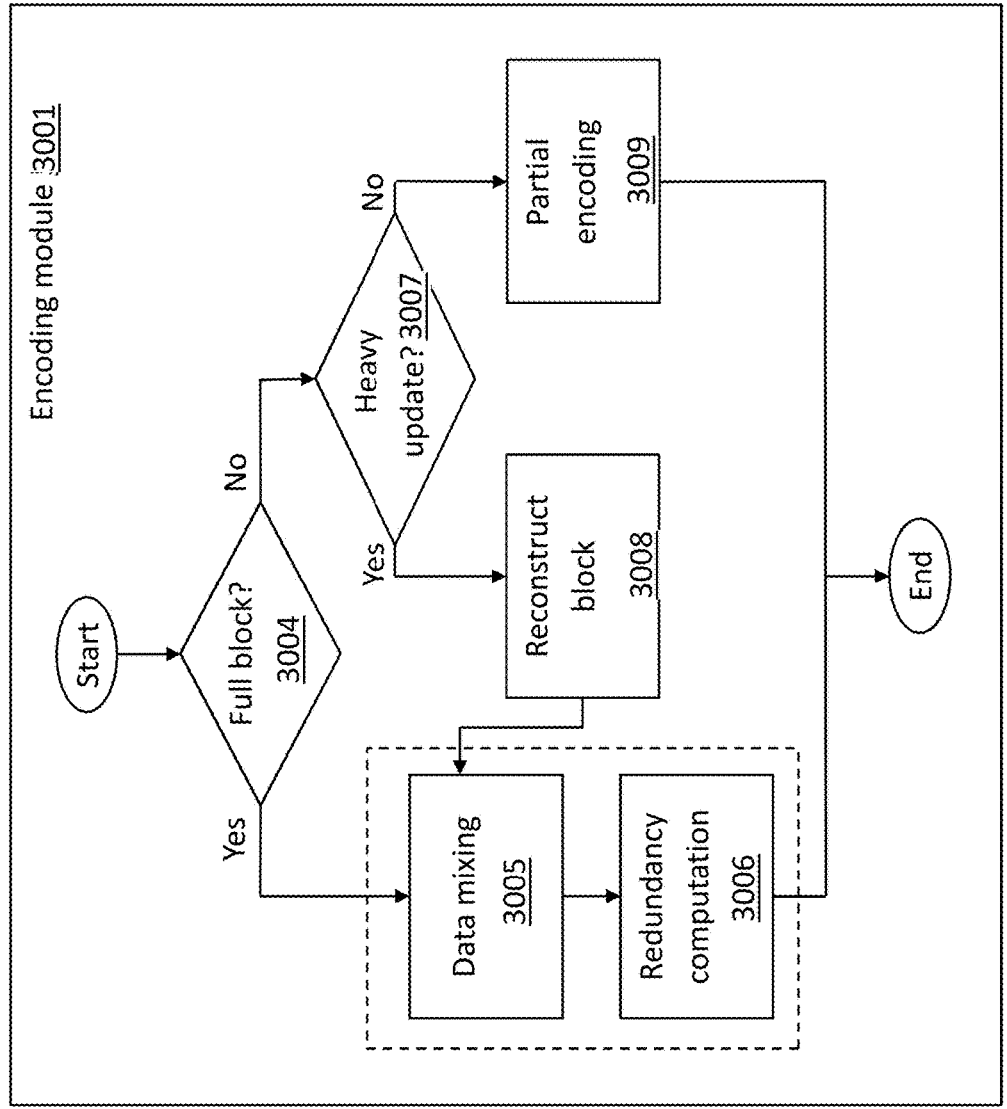
FIG. 30 shows a flow diagram of steps executed within encoding module in the case of system supporting both full block WRITE and part block WRITE requests, in accordance with an example implementation of the present application.

FIG. 30 shows a flow diagram of steps executed within encoding module in the case of system supporting both full block WRITE and part block WRITE requests. Upon receiving WRITE request with full/partial block of original data 3002, encoding module 3001 selects encoding strategy. If a full block is received, the only possible strategy is full block encoding, comprising data mixing step 3005 and redundancy computation step 3006. An output of step 3006 is a whole codeword 3003. If a part of block is received, then choice of strategy 3007 is made depending on the number of original data elements within partial block and their positions. More particularly, a strategy at step 3007 is selected to minimize network traffic, i.e., the number of encoded chunks being transferred between storage nodes and client side. Minimization of network traffic is crucial for cloud storage; however, computational complexity may be also taken into consideration. If full block encoding strategy appears to be more efficient, then missing elements of the partial block are reconstructed at step 3008. If partial block encoding strategy is more preferable, then at step 3009 difference between received partial block and the initial one is encoded and the initial codeword is updated according to encoding result, wherein the initial codeword is downloaded from storage nodes and the initial block of original data is reconstructed from the initial codeword. An output of step 3009 is a partial codeword 3003.

Figure 31:
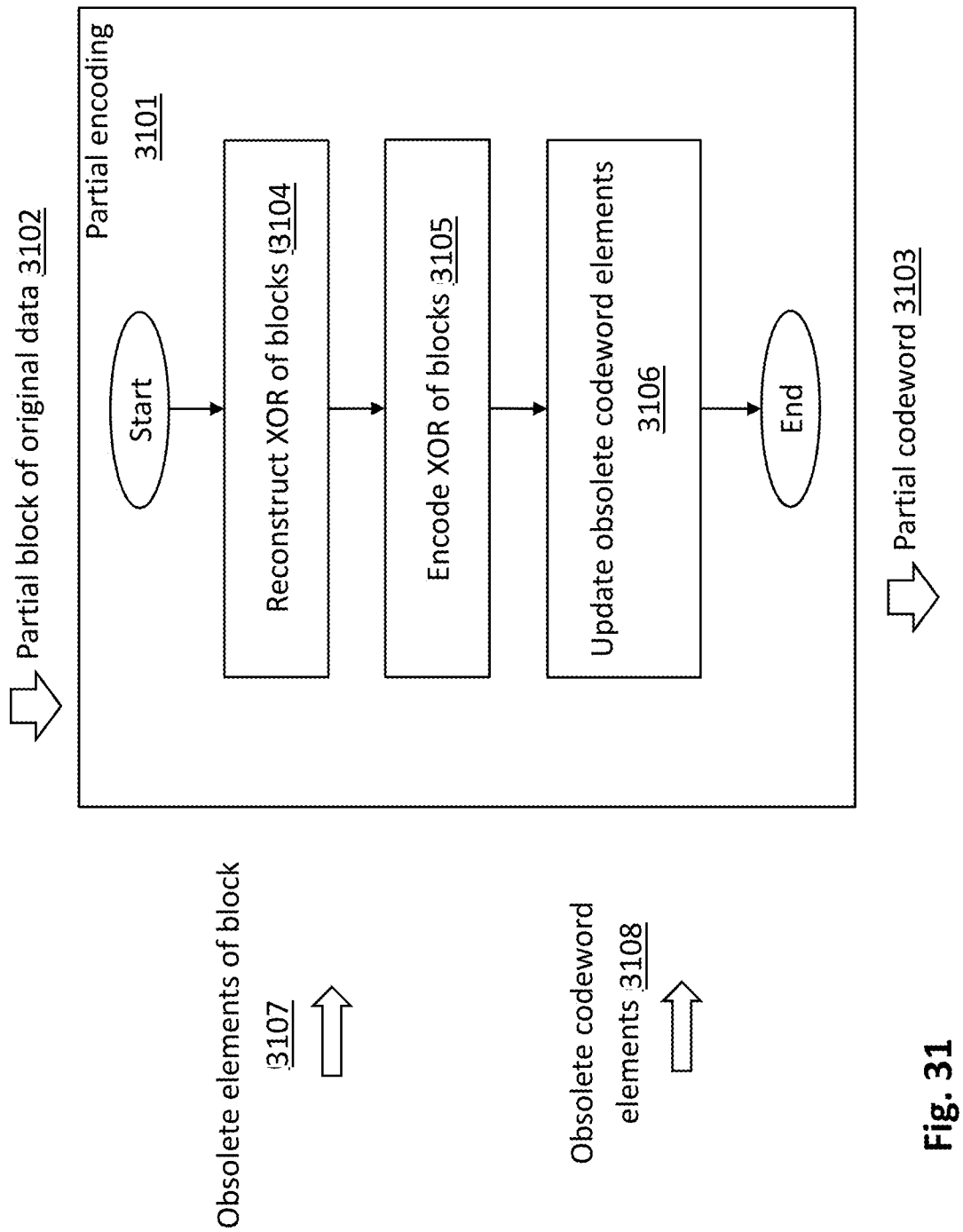
FIG. 31 shows a flow diagram of steps executed to update encoded data if only a few elements of original data are modified, in accordance with an example implementation of the present application.

FIG. 31 shows a flow diagram of steps executed to update a few elements within a block of original data, wherein partial encoding 3101 is employed in order to update codeword elements. Encoding 3101 of partial block of original data 3102 results in partial codeword 3103. At step 3104 difference $x^{(XOR)}$ between input partial block of original data 3102 $x^{(new)}$ and obsolete values of the same elements $x^{(old)}$

3107 is computed as $x^{(XOR)} = x^{(old)} \oplus x^{(new)}$. Obsolete elements of the block 3107 may be recovered on demand; however, their values are usually pre-fetched by the system. At step 3105 encoding of block differences $x^{(XOR)}$ is performed in order to obtain codeword difference $c^{(XOR)}G$. Recall that structure of the generator matrix G of selected error-correcting code is such, that if vector $x^{(XOR)}$ contains only a few non-zero elements, then the obtained vector $c^{(XOR)}$ also contains only a few non-zero elements. Partial block encoding is employed only to update a few elements within a block, so original data difference vector $x^{(XOR)}$ always contains only a few non-zero elements. Thus, the number of codeword elements to be updated and further transmitted to storage nodes is small. At step 3106 new values of codeword elements $c^{(new)}$ are obtained from obsolete codeword elements 3108 $c^{(old)}$ and codeword difference $c_{(XOR)}$. Since error-correcting code C is a linear block code, new values of elements are computed as $c^{(new)} = c^{(old)} \oplus c^{(XOR)}$. Here obsolete codeword $c^{(old)}$ corresponds to obsolete original data $x^{(old)}$, i.e., they are related by $c^{(old)} = x^{(old)}G$. Observe that if $c^{(old)}$ was not pre-fetched from storage nodes, than it is sufficient to request codeword elements $c_j^{(old)}$, where i is such that $c_j^{(XOR)} \ne 0$, and then transmit to storage nodes $c_j^{(new)} = c_j^{(old)} \oplus c_j^{(XOR)}$, 0≤j<N. The number of codeword elements to be updated is given by $|\{G[\text{supp}(x^{(XOR)}),j] \ne 0 | 0 \le j < N\}|$, where supp(z) is the set of indices of non-zero elements of vector z. Thus, in order to update a few original data elements it is unnecessary to perform encoding of a full block of original data and transmit all N elements of obtained codeword to storage nodes.

Figure 32:
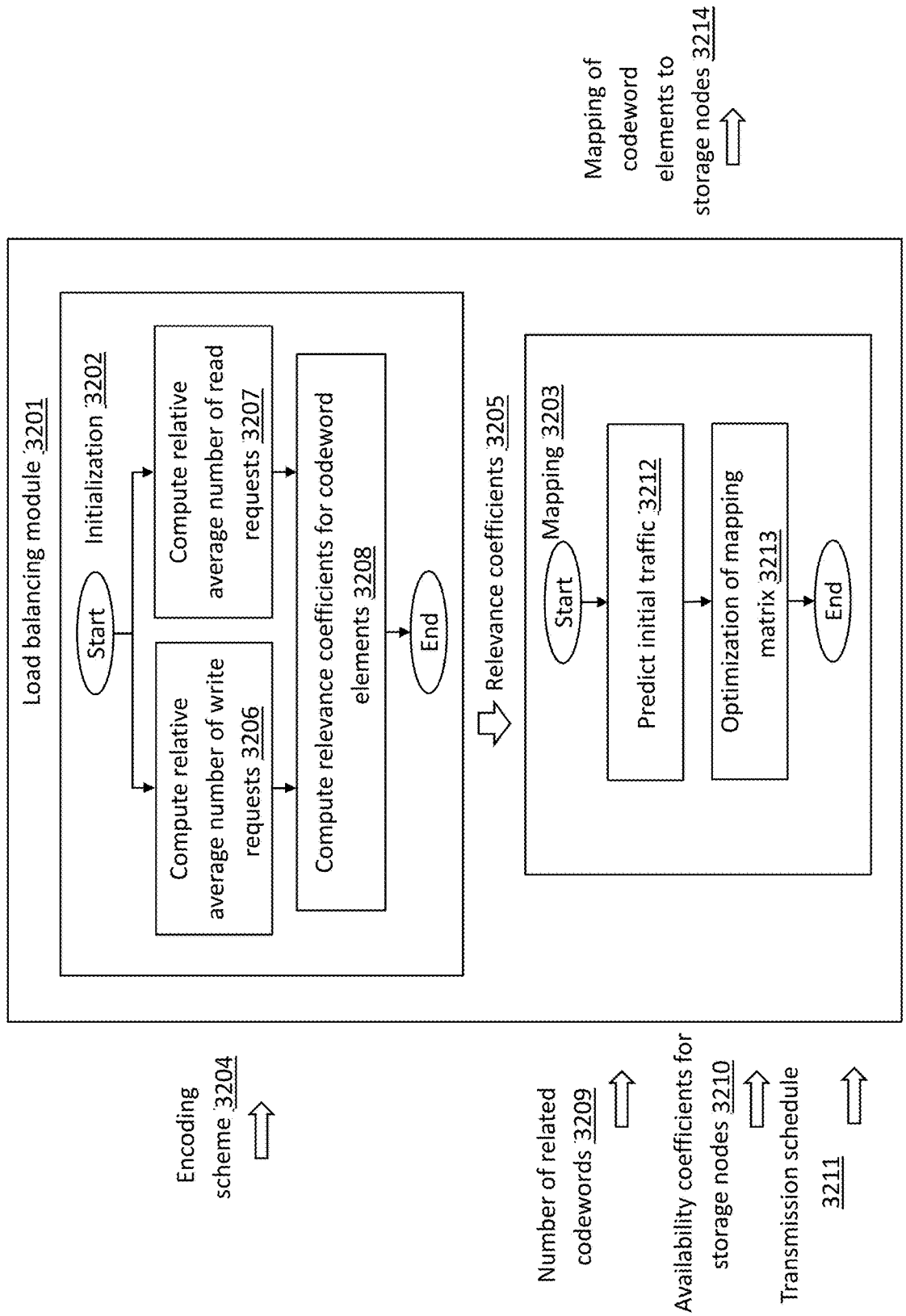
FIG. 32 is a schematic block diagram illustrating initialization of load balancing module and steps performed to map encoded data to storage nodes, in accordance with an example implementation.

FIG. 32 is a schematic block diagram illustrating initialization of load balancing module and steps performed to map encoded data to storage nodes.

In order to minimize latency for READ and WRITE operations one need to balance load for storage nodes according to available network bandwidth. However, due to reliability requirement none of storage nodes may receive more than one element of each codeword. Load balancing module 3201 can include two components, wherein the first component performs initialization 3202 and the second component computes mapping 3203.

Initialization of load balancing module 3201 consists in computation of relevance coefficients 3205 for N positions of codeword elements, wherein codewords belongs to a pre-selected (N, K) error-correcting code and computations are based on the analysis of pre-selected encoding scheme 3204 for this code.

Initialization component 3202 receives encoding scheme 3204, e.g., generator matrix G of the pre-selected code, as input argument.

At step 3206 relative average number of WRITE requests $\delta^{(WRITE)}$ is computed for each codeword element $c_i$ $$\delta^{(WRITE)}(i) = P^{(full\ WRITE)} \cdot 1 + P^{(part\ WRITE)} \frac{wt(G[-,i])}{K},$$

$$0 \le i < N,$$

where $P^{(full\ WRITE)}$ is probability of full block WRITE operation, $P^{(part\ WRITE)}$ is probability of part block WRITE operation and wt(G[−,i]) is the number of non-zero elements within i-th column of K×N generator matrix G.

In particular, if only full block WRITE requests are supported by the system, then $P^{(part\ WRITE)} = 0$ and relative average number of WRITE requests is the same for all codeword elements.

At step 3207 relative average number of READ requests $\delta^{(READ)}$ is computed for each codeword element $c_i$ $$\delta^{(READ)}(i) = \begin{cases} (1 - P^{(repair)}) \\ \left(P^{(full\ READ)} \cdot 1 + \right. \\ \left. P^{(part\ READ)} \frac{wt(M^{-1}[-, m_i])}{K} \right), & i \in A, \\ P^{(repair)} \cdot \theta(i), & i \in \{0, \ldots, N-1\} \setminus A, \end{cases}$$

where $P^{(full\ READ)}$ is probability of full block READ operation, $P^{(part\ READ)}$ is probability of part block READ operation, $P^{(repair)}$ is probability that READ operation that READ operation performed for the purpose of repair (in a view of storage node failure or unavailability), $\theta(i)$ shows average utilization of i'th codeword element in the case of repair, A is the set of K codeword elements, which are employed for low-complexity reconstruction of original data, i.e., data retrieval when corresponding storage nodes are available. The set of codewords elements $c_i$ with $i \in A$ is referred as mainstream group, while the set of other codeword elements is referred as standby group. K×K matrix M can include columns of matrix G corresponding to mainstream elements, i.e., $G_{-,i}$ with $i \in A$. Here $m_i = |\{j \in A | j < i\}|$ and $wt(M^{-1}[-, m_i])$ is the number of non-zero elements within $m_1$'th column of inverse matrix to matrix M. Observe that $(1-P^{(repair)})$ is the probability of READ operation for the purpose of information retrieval when storage nodes corresponding to elements of mainstream group are available.

In particular, if only full block READ requests are supported by the system, then $P^{(part\ READ)}=0$ and relative average number of READ request is the same for all elements of mainstream group.

At step 3208 relevance coefficient $\varphi(i)$ is computed for each codeword element $c_i$ based on the relative average numbers of READ requests $\delta^{(READ)}(i)$ and WRITE requests $\delta^{(WRITE)}(i)$ $$\varphi(i) = \rho^{(WRITE)}\delta^{(WRITE)}(i) + \rho^{(READ)}\delta^{(READ)}(i), 0 \leq i < N,$$

where coefficients $\rho^{(WRITE)}$ and $\rho^{(READ)}$ show cost of WRITE and READ operations, respectively.

Output of initialization component 3202 is given by relevance coefficients $\varphi(i)$ 3205 for codeword elements $c_i$, $0 \leq i < N$, which are passed to mapping component 3203.

Mapping component 3203 receives a number $\phi$ of related codewords 3209 and transmission schedule 3211 as input arguments, while relevance coefficients 3205 and availability coefficients for storage nodes 3210 are received as input parameters. Thus, mapping component 3203 execute computations each time, when a number of related codewords 3209 and transmission schedule 3211 are received. Transmission schedule 3211 is optional, by default it is equal to zero. Two codewords are referred as related if READ request is predicted to be for both of them simultaneously, e.g., codewords produced from the same file. Availability coefficients for storage nodes 3210 are based on the bandwidth information and traffic prediction, e.g., average latency estimation in the case of WRITE and READ requests.

At step 3212 for each storage node initial network traffic $\tau(i)$ is predicted based on transmission schedule 3211. At step 3213 $\phi \times N$ mapping matrix $\mu$ is optimized. Here $\phi \times N$ matrix is referred as mapping matrix if each of its rows is given by some permutation of vector $(0, 1, \ldots, N-1)$. Given mapping matrix $\mu$, traffic induced by $\phi$ codewords is estimated for i'th storage node as $\Phi(i) = \sum_{j=0}^{\phi-1} \varphi(\mu[j,i])$. Thus, traffic prediction for i'th storage node is given by $\tau(i) + \Phi(i)$, where $\tau(i)$ is initial network traffic prediction for the i'th storage node. Optimization of mapping matrix $\mu$ consists in selection of such permutations, that $$\frac{\tau(0) + \Phi(0)}{a_0} \approx \ldots \approx \frac{\tau(n-1) + \Phi(n-1)}{a_{n-1}},$$

where $a_i$ is availability coefficient for the i'th storage node.

Optimized $\phi \times N$ mapping matrix $\mu$ specifies mapping of codeword elements to storage nodes, wherein a set of codeword elements assigned to the g'th storage node is given by elements $c_{\mu[j,g]}^{(j)}$, $0 \leq j < \phi$, where $c_t^{(j)}$ is the t'th element of the j'th codeword.

Let us describe how original data can be reconstructed from codeword elements distributed over storage nodes. Most of the time all storage nodes are available and original data x can be easily reconstructed from codeword elements of mainstream group. More particularly, $x = c^{(main)}S^{-1}$, where $c^{(main)}$ is a codeword subvector consisting of $c_i$, $i \in A$, and $S^{-1}$ is inverse matrix to matrix S. Since matrix S is block-diagonal matrix, $S^{-1}$ is also block-diagonal matrix:

$$S^{-1} = \begin{pmatrix} S_0^{-1} & 0 & \ldots & 0 \\ 0 & S_1^{-1} & \ldots & 0 \\ \vdots & \vdots & \ddots & \vdots \\ 0 & 0 & \ldots & S_{v-1}^{-1} \end{pmatrix},$$

where $S_g^{-1}$ is inverse matrix to matrix $S_g$, $0 \leq g < v$. Since each matrix $S_g$ specifies a linked subset $L_g$ of mainstream group, such that $c^{(main)}[L_g] = x[L_g]S_g$, original data can be reconstructed as $x[L_g] = c^{(main)}[L_g]S_g^{-1}$, $0 \leq g < v$. Observe that cardinality of the set $L_g$ is equal to the dimension of matrix $S_g$. If only $x_j$, $j \in L_g$, is required then it can be computed as $$x_j = c^{(main)}[L_g]S_g^{-1}[-, r],$$

where $r = j - \sum_{i=0}^{g} |L_g|$ and $B[-, i]$ is the t'th column of matrix B.

This expression is employed in the case of full block data retrieval, as well as in the case of partial data retrieval.

Thus, if some elements $x_j$ of original data are required, then

Corresponding linked subsets $L_g$ are identified;

Elements of mainstream group, belonging to identified linked subsets $L_g$, are requested from storage nodes;

Required elements of original data are computed: $x_j = c^{(main)}[L_g]S_g^{-1}[-, r]$.

Figure 33:
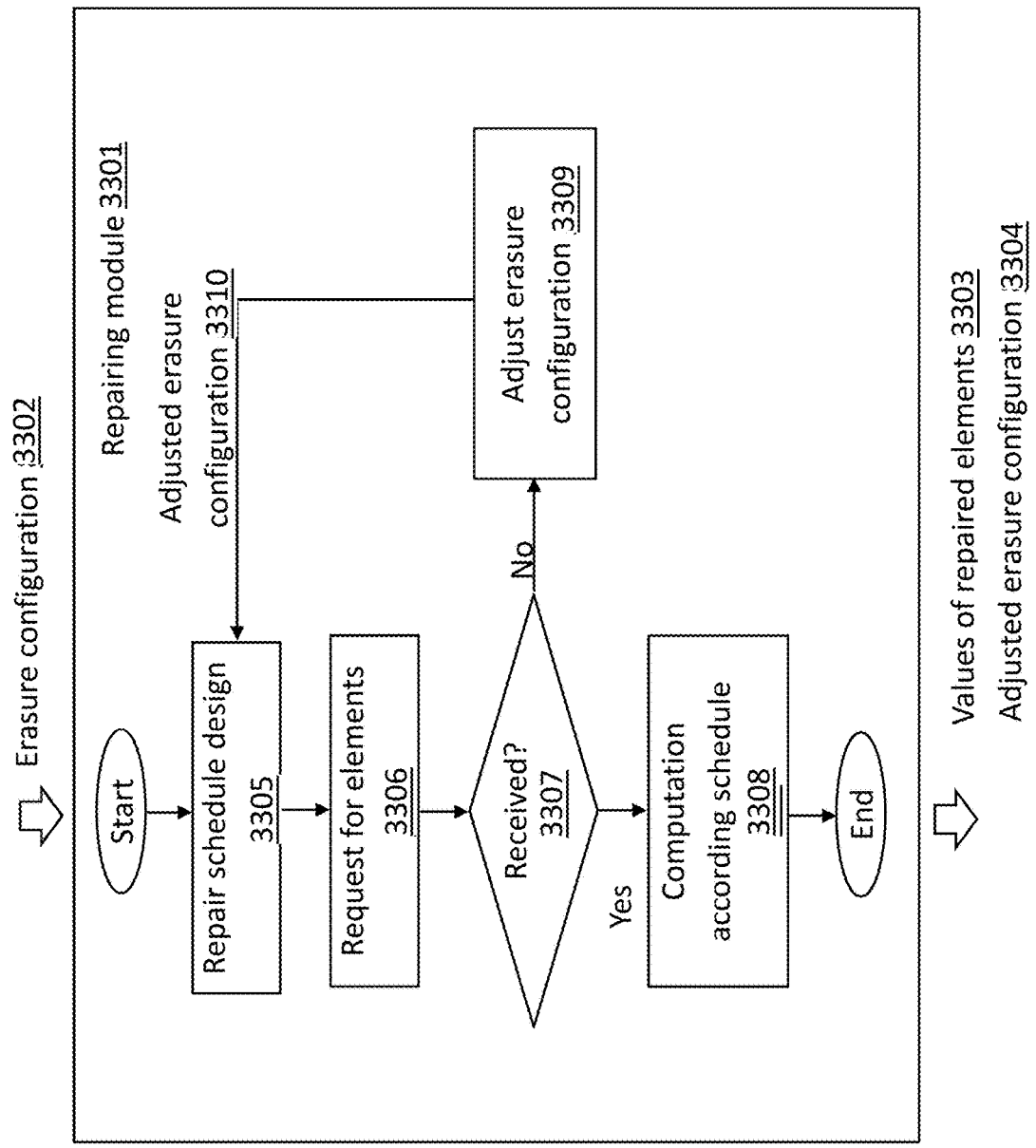
FIG. 33 shows flow diagram of steps executed within repairing module for reconstruction of erased elements of encoded data, in accordance with an example implementation of the present application.

FIG. 33 shows flow diagram of example steps executed within repairing module for reconstruction of erased elements of encoded data. In the case of storage node failure an old storage node is replaced by a new one, and repairing module 3301 is employed to reconstruct data within a new storage node. Moreover, repairing module 3301 is also employed, when required element of original data cannot be reconstructed from elements of mainstream group, since some of them are unavailable due to storage node outage. In both cases these unavailable codeword elements are referred as erased elements. Positions of erased elements within codeword constitute erasure configuration e: $e_i=1$ if i'th codeword element is erased and $e_i=0$, otherwise, $0 \leq i < N$. It is assumed that erasure configuration is known prior to repair, but values of codeword elements are unknown.

Repairing module 3301 receives erasure configuration 3302 as input argument. Repairing module 3301 compute values of erased elements 3303 and adjusted erasure configuration 3304 as follows. At step 3305 repair schedule is constructed. Within step 3305 all operations are performed over erasure configurations, thus actual values of elements are not required. Repair schedule designed to minimize the number of codeword elements to be transmitted from storage nodes. Repair schedule comprises specification of operations to be performed over non-erased codeword elements in order to obtain values of erased codeword elements. Repair schedule also contains list of positions of employed non-erased elements. Codeword elements are requested according to this list from storage nodes at step 3306. If all requested codeword elements are received 3307, then values of erased codeword elements are computed according to the repair schedule at step 3308. However, if not all required codeword elements were received within a time limit, then at step 3309 erasure configuration is adjusted by appending to it positions of requested but not received codeword elements. Adjusted erasure configuration 3310 is employed to design a new schedule at step 3305.

Figure 34:
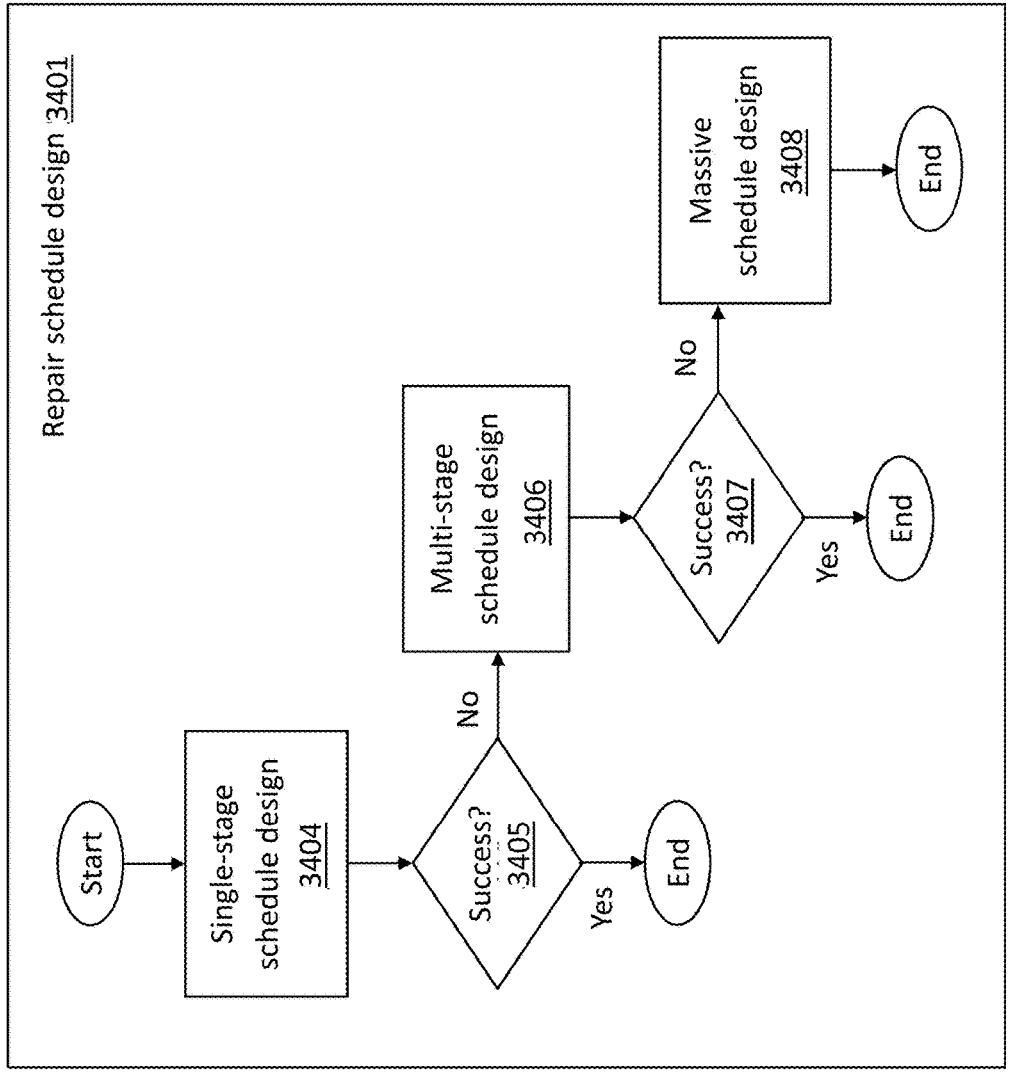
FIG. 34 shows flow diagram of attempts to repair encoded data using different strategies, in accordance with an example implementation of the present application.

FIG. 34 shows flow diagram of attempts to recover codeword elements using different strategies in accordance with one or more implementations. According to the present invention one of three repair strategies is selected. These strategies are referred as single-stage repair, multi-stage repair and massive repair. Choice of strategy depends on the number of erasures and structure of erasure configuration. Single-stage repair has the lowest complexity and it is the most commonly used one. Multi-stage repair include single-stage repair as the first step. Massive repair is used only in the case of single-stage and multi-stage repair failures, since its complexity is higher than complexity of multi-stage repair.

Output of repair schedule design 3401 is given by repair schedule 3403, constructed to recover erasure configuration 3402. At step 3404 an attempt to recover erased elements within single-stage repair strategy is made. If repair schedule was successfully 3405 designed at step 3404, then this schedule is returned as output repair schedule 3403. If single-stage repair failed to recover all erasures, then an attempt to recover them within multi-stage repair is made at step 3406. Upon success, multi-stage repair schedule is returned as output repair schedule 3403, otherwise repair schedule 3403 is designed according to massive repair strategy 3408.

Figure 35:
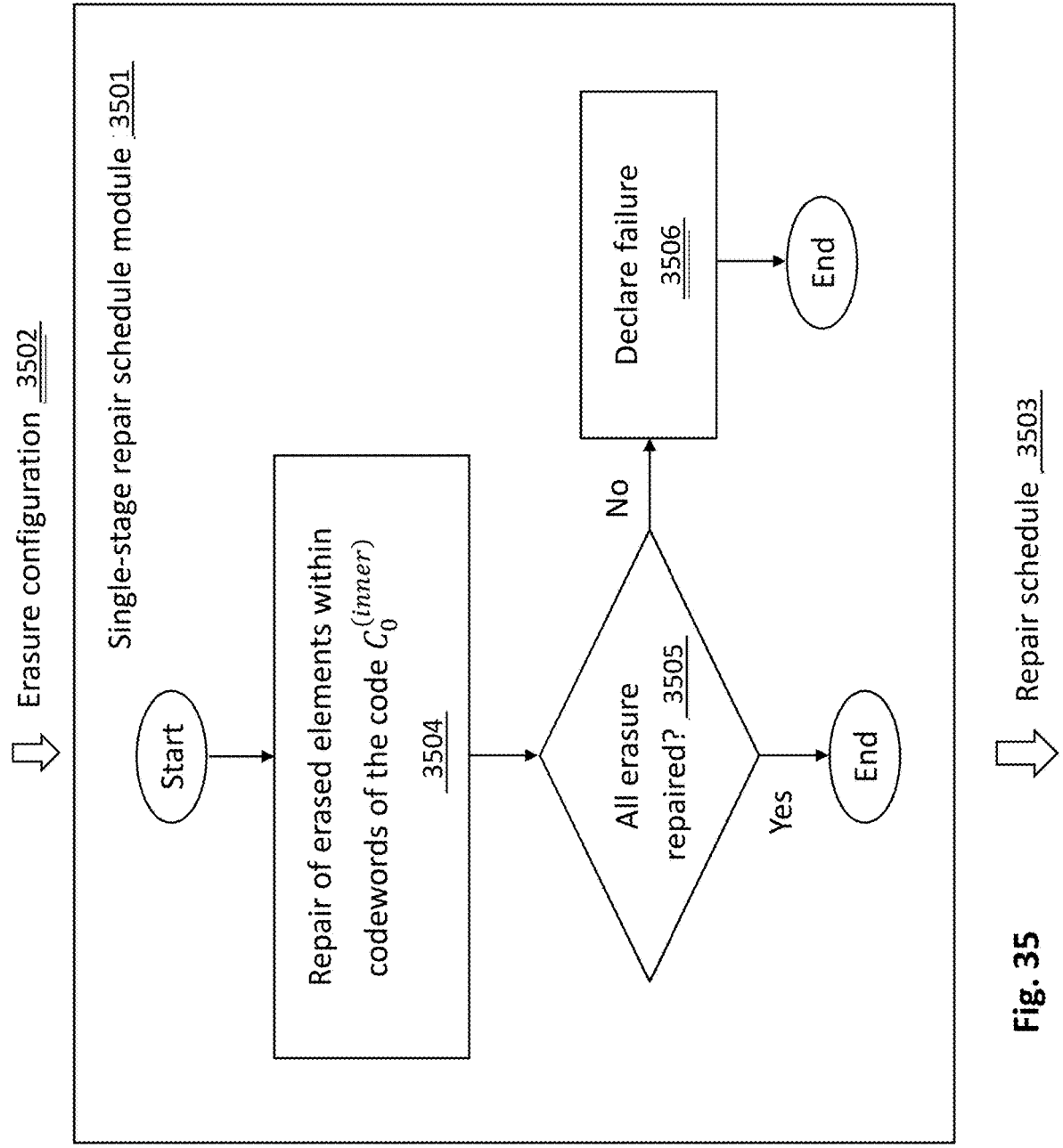
FIG. 35 shows flow diagram of repairing steps corresponding to single-stage repair strategy, in accordance with an example implementation of the present application.

FIG. 35 shows flow diagram of repairing steps corresponding to single-stage repair strategy. Single-stage repair schedule module 3501 receives erasure configuration 3502 as input argument. Any erasure configuration containing up to $w_0-1$ erasures is recoverable by single-stage repair, where $w_0$ is the minimum distance of inner code $C_0^{(inner)}$. Erasure configurations containing more than $(t-u)n$ erasures could not be recovered with single-stage repair, so such erasure configurations are passed to multi-stage repair schedule module. If the number of erasures is between $w_0$ and $(t-u)n$, then there is possibility that this erasure configuration may be recovered by single stage repair.

Recall that it is possible to identify sets $T_0, \ldots, T_{n-1}$ consisting of t elements, such that codeword c of the error-correcting code C can include n codewords $c[T_j]$ of the $(t, u, w_0)$ code $C_0^{(inner)}$, $0 \le j < n$; and also recall, that the code $C_0^{(inner)}$ is able to correct up to $w_0-1$ erasures. At step 3504 single-stage repair performs recovering of erased elements within each codeword $c[T_j]$ independently. Thus, if the number of erased elements within $c[T_j]$ is less than the minimum distance $w_0$, $0 \le j = n$, then there exists a single-stage repair schedule to reconstruct all erased elements. There is possibility that up to $t-u$ erasures may be recovered within $c[T_j]$. If all erasures are reparable 3505, the single stage repair schedule module 3501 declares success and returns repair schedule 3503. Single-stage repair schedule 3503 is such that for each erased element $c_g$, $g \in T_j$, it comprises a representation of $c_g$ as a linear combination of non-erased elements of $c[T_j]$. If there are some unrecoverable erasures, single-stage repair schedule module 3501 declares failure and passes erasure configuration 3502 to multi-stage repair module.

Figure 36:
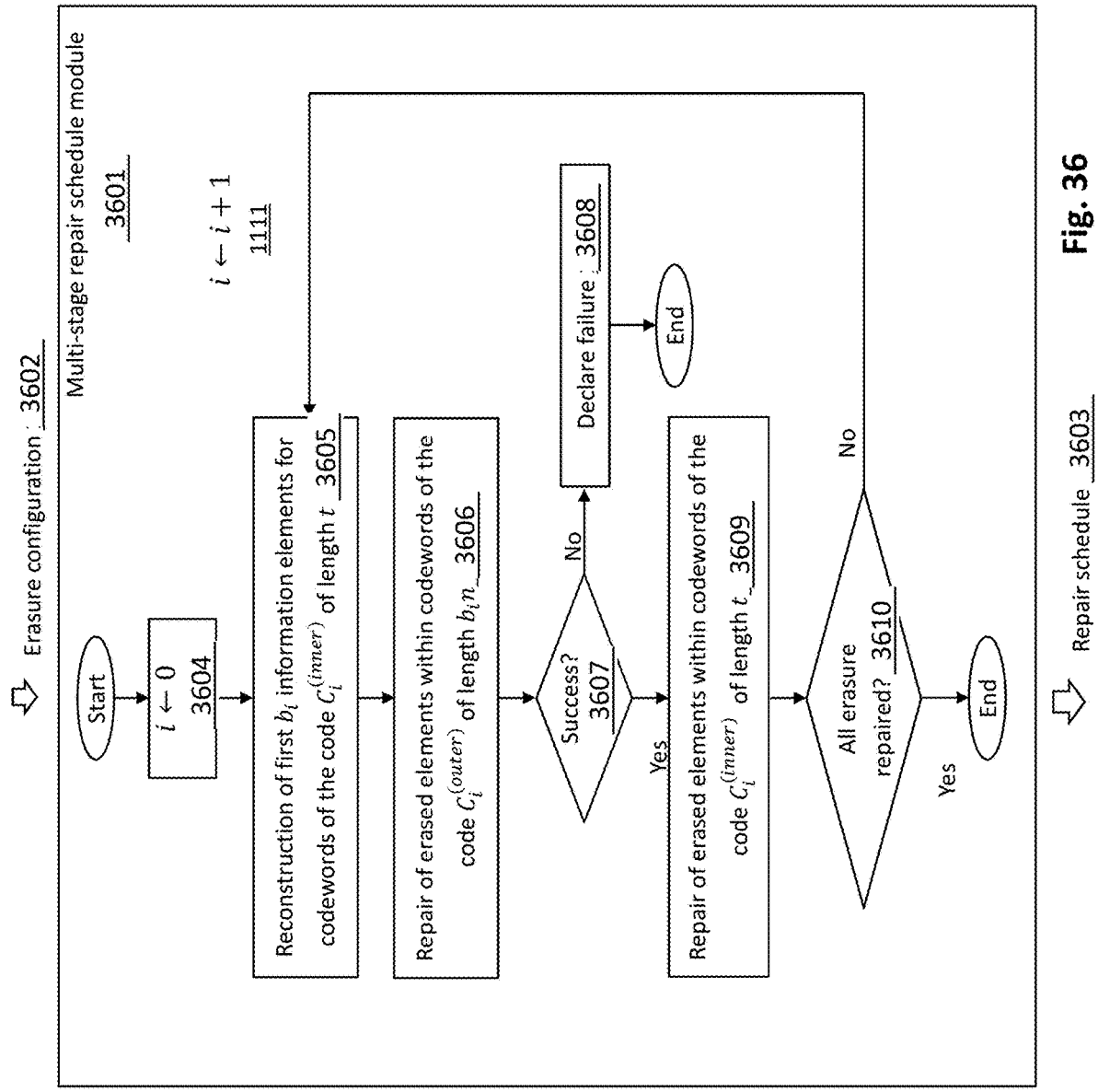
FIG. 36 shows flow diagram of repairing steps corresponding to multi-stage repair strategy, in accordance with an example implementation of the present application.

FIG. 36 shows a flow diagram of repairing steps corresponding to multi-stage repair strategy. Operations are performed over elements of codeword c and elements of temporary vector y, where c is codeword of error-correcting code C and temporary vector y is such that $c[T_j]= y[T_j]G_0^{(inner)}$, $0 \le j < n$. Elements of c and y are treated as variables with unknown values. Positions of erasures within codeword c are given by erasure configuration e 3602, received by the multi-stage schedule module 3601 as an input argument. Temporary erasure configuration ê is related to the vector y. Actual repair stage is shown by variable i, which is initially assigned to zero at step 3604. Multi-stage repair proceeds as follows.

At step 3605 reconstruction of first $b_i$ information elements for codewords of the code $C_i^{(inner)}$ is performed as follows. Each of n codewords of an inner code is processed individually. For j'th codeword of an inner code elements $y_g$ are expressed via elements $c_p$ whether it is possible, where $g \subset T_j \cap A_i^{(outer)}$, $0 \le j < n$ and $p \in T_j$ is such that $e_p=0$. Successfully expressed elements $y_g$ are marked as recovered, i.e., $ê_g \leftarrow 0$, otherwise marked as erased, i.e., $ê_g \leftarrow 1$. Observe that $|T_j \cap A_i^{(outer)}|=b_i$.

At step 3606 erased elements within codewords of the code $C_i^{(outer)}$ are repaired. Thus, each erased element $y_g$ is expressed via non-erased elements $y_p$, where $g \in A_i^{(outer)}$ is such that $ê_g=1$, and $p \in A_i^{(outer)}$ is such that $ê_p=0$. On success each element $y_g$ is marked as recovered $ê_g \leftarrow 0$.

If each element $y_g$ was successfully recovered at step 3606, i.e., $ê_g=0$ for all $g \in A_i^{(outer)}$, then at step 3607 a decision is made to proceed with step 3609. Otherwise, failure of multi-stage repair is declared at step 3608 and proceed with the massive repair schedule design.

At step 3609 erased elements within codewords of the inner code $C_i^{(inner)}$ are repaired. Each of n codewords of an inner code is processed individually. Each erased element $c_g$ is expressed via non-erased elements $c_p$ whether it is possible, $g \in T_j$ is such that $e_g=1$, and $p \in T_j$ is such that $e_p=0$, $0 \le g < N$. Successfully expressed elements $c_g$ are marked as recovered, i.e., $e_g \leftarrow 0$.

If all erasures within erasure configuration 3602 are repaired prior to step 3610, i.e., $e_g=0$ for all $0 \le g < N$, then obtained multi-stage repair schedule is returned as output repair schedule 3603. Otherwise, stage index is increased $i \leftarrow i+1$ 3611 and multi-stage repair schedule design proceeds with step 3605.

Massive repair schedule module receives erasure configuration as input argument. Error correction capability of massive repair is limited only by code construction. Thus, any erasure configuration containing less than D erasures is recoverable by massive repair, where D is the minimum distance of error-correcting code C. If the number of erasures is between D and N−K, then there is possibility that this erasure configuration may be recovered by massive stage repair. Observe that in the case of MDS codes values of N−K is equal to D−1; however, error-correcting code C does not belong to MDS codes. Massive repair can be implemented in several ways.

First, in the case of short codes it is possible to keep list of parity checks for a code. Observe that if one parity check comprises all codeword elements of another parity check, then there is no need to keep the first parity check. Repair using parity checks is performed as follows. In order to repair g codeword elements, such group of g parity checks is selected, that i'th erased codeword element participates only in the i'th parity check from and the total number of different codeword elements participating in parity checks of $\Pi^{(g)}$ is minimized. The second condition corresponds to minimization of the number of READ requests. Alternatively, instead of the second condition one can optimize $\Pi^{(g)}$ to reduce latency. For that $\Pi^{(g)}$ consisting of highly available codeword elements is selected, where highly available elements are elements which can be quickly transferred from storage nodes or cached elements. Repair with parity checks may be utilized for components codes of the error-correcting code C.

Second, in the case of long codes massive repair, based on Gaussian elimination, can be employed. It proceeds as follows. At first step K non-erased highly available codeword elements Ω are selected, wherein elements Ω are such that corresponding columns of generator matrix are linearly independent. Thus, latency is minimized. Observe that the number of READ requests is equal to K. At the second step matrix r is constructed from columns of generator matrix corresponding to elements Ω and g columns corresponding to elements being repaired. At the third step Gaussian elimination is applied to rows of matrix Γ in order to obtain matrix in systematic form, wherein systematic positions correspond to elements Ω. Values of elements being repaired are obtained by multiplication of sequence of elements Ω by non-systematic part of matrix Γ.

If a code of arbitrary length is required, then puncturing and shortening may be applied to the (N=nt, K, D) code C in order to obtain a code of length Ñ<N.

The application is now further described in connection with the following points.

Point 1. A method for distributing data of a plurality of files over a plurality of respective remote storage nodes, the method comprising:
splitting into segments, by at least one processor configured to execute code stored in non-transitory processor readable media, the data of the plurality of files;
encoding, by the at least one processor, each segment into a number of codeword chunks, wherein each codeword chunk together with encoding parameters and identifiers constitute a package, and codeword chunks do not contain any piece of the original segment;
generating, by the at least one processor, metadata for at least one file of the plurality of files and metadata for related segments of the at least one file, wherein the metadata for the at least one file contains information to reconstruct the at least one file from the segments, and metadata for the related segments contains information for reconstructing the related segments from corresponding packages;
encoding, by the at least one processor, the metadata into package, wherein the encoding corresponds to a respective security level and a protection against storage node failure;
assigning, by the at least one processor, packages to remote storage nodes, wherein the step of assigning corresponds to optimized workload distribution as a function of available network bandwidth;
transmitting, by the at least one processor, each of the packages to at least one respective storage node; and
retrieving, by the at least one processor, at least one of the plurality of files, as a function iteratively accessing and retrieving packages of metadata and file data.

Point 2. The method of point 1, wherein the step of data splitting provides data within a respective segment that comprises a part of one individual file or several files.

Point 3. The method of point 2, further comprising aggregating a plurality of files for a segment as a function of minimizing a difference between segment size and a total size of embedded files, and a likelihood of joint retrieval of embedded files.

Point 4. The method of point 1, wherein the step of file segment encoding includes deduplication as a function of hash-based features of the file.

Point 5. The method of point 1, wherein the step of segment encoding includes encryption, wherein at least one segment is encrypted entirely with an individual encryption key.

Point 6. The method of point 1, wherein the step of segment encoding includes encryption, wherein at least one segment is partitioned into a number of pieces, and each piece is separately encrypted, wherein a number of encryption keys per segment ranges from one to the number of pieces.

Point 7. The method of point 5 or 6, wherein the encryption key is generated as a function of data being encrypted and random data;

Point 8. The method of point 5 or 6, wherein individual encryption keys for segments are encrypted with a key encryption key and distributed over respective storage nodes, wherein the key encryption key is generated using a password-based key derivation function.

Point 9. The method of point 1, wherein the step of segment encoding comprises erasure coding of mixing degree s, where codeword chunks are produced from information chunks using a linear block error correction code and mixing degree s indicates that at least s codeword chunks are required to reconstruct any information chunk.

Point 10. The method of point 9, wherein respective erasure coding techniques are selected for data segment encoding and metadata encoding, such that metadata is protected from at least the same number of storage node failures as corresponding data segment.

Point 11. The method of point 1, wherein the step of assigning of packages to remote storage nodes minimizes retrieval latency for a group of related segments.

Point 12. The method of point 11, wherein retrieval latency is minimized as a function of at least statistical data used to compute availability coefficients for storage nodes, wherein an availability coefficient characterizes predicted average download speed and its fluctuations for respective storage node.

Point 13. The method of point 12, wherein retrieval latency is minimized as a function of at least availability coefficients for storage nodes and relevance coefficients for codeword positions, wherein a relevance coefficient is a function of information representing an employed erasure correction coding scheme and significance of the respective codeword position for data retrieval.

Point 14. The method of point 1, wherein general metadata for a file and individual metadata for related segments is divided into two parts, in which one part is individually packed in packages and another part is appended to packages containing respective encoded data segments.

Point 15. The method of point 1, wherein the files distributed over remote storage nodes are managed by an object-based file system that is distributed over remote storage nodes and at least partially cached on a client storage devices.

Point 16. The method of point 15, further comprising selecting a tree representation for a locally cached part of a file system, where the choice is based on a request analysis and a hardware specification, and alternatives are given by a log-structured merge-tree, B+ tree or a directed graph.

Point 17. The method of point 16, wherein a file system tree maintains references for files having a size greater than a segment size and references for logical files containing a number of embedded files, where reference provide access to the respective file distributed over storage nodes.

Point 18. The method of point 1, further comprising arranging temporary storage of file data within a local cache by:

operating over compound blocks of data;

dividing memory space into regions with compound blocks of equal size;

employing a file structure to optimize file arrangement within the local cache; and performing garbage collection to arrange free compound blocks.

Point 19. The method of point 18, wherein contiguous small blocks of data are combined into large compound blocks, where small blocks correspond to a block-based file system, and compound blocks correspond to an object-based file system.

Point 20. The method of point 18, wherein cache memory includes a plurality of regions, and further wherein each region comprises a number of compound blocks, wherein compound blocks are of the same size at least within each region.

Point 21. The method of point 18, wherein arranging temporary storage of file data within a local cache further includes cache optimization employing information representing a file structure.

Point 22. The method of point 21 wherein cache optimization is simplified by classifying files depending on respective access patterns into several categories, and employing the same cache management strategy for files of the same category.

Point 23. The method of point 18, wherein garbage collector releases less significant compound blocks, where significance estimates are obtained from time of the last access and a data access pattern.

Point 24. The method of point 1, wherein a method of file data retrieval from remote storage nodes, the method comprising:

accessing, by at least one processor configured to execute code stored in non-transitory processor readable media, file metadata references within a local cache or within remote storage nodes;

receiving, by the at least one processor, a plurality of packages containing file metadata from remote storage nodes, where the packages are requested in advance by metadata references;

receiving, by the at least one processor, a plurality of other packages containing encoded file segments from storage nodes, where the packages are requested in advance by data references, where data references are obtained as a part of file metadata;

reconstructing, by the at least one processor, file data from the packages as a function of metadata that represents parameters of encoding scheme and file splitting scheme.

Point 25. The method of point 24, wherein file retrieval speed is enhanced by caching metadata from a plurality of files on the client side.

Point 26. The method of claim 9, wherein method for erasure coding, comprising:

executing, by at least one processor configured to execute code stored in non-transitory processor readable media, data encoding with an error-correction code C to produce N codeword chunks, wherein the error-correction code C of length N=tn is based on 2h component codes: h outer codes of lengths $b_i n$, $0 \leq i < h$, and h inner codes of length t;

distributing, by the at least one processor, N codeword chunks over a set of storage nodes, wherein mapping of codeword chunks to storage nodes is optimized to balance network load among storage nodes;

executing, by the at least one processor, reconstruction of data chunks from codeword chunks, wherein codeword chunks are requested from storage nodes on demand and the number of required codeword chunks is minimized; and executing, by the at least one processor, data repair, wherein erased codeword chunks are reconstructed from other codeword chunks, and further wherein a number of requests to storage nodes for codeword chunks is minimized.

Point 27. The method of point 26, wherein dimensions of outer codes and length multipliers $b_1$ are selected to maximize minimum distance of code C.

Point 28. The method of point 26, wherein data is partitioned into K information chunks prior to encoding, and encoding is implemented as multiplication of vectors consisting of K elements of information chunks by K×N generator matrix of code C, wherein the generator matrix comprises K×K sparse matrix, such that its inverse matrix is also sparse.

Point 29. The method of point 28, wherein K×N generator matrix of code C comprises a matrix obtained by column and row permutations from the K×K block-diagonal matrix.

Point 30. The method of point 28, wherein K×N generator matrix of code C comprises K×K block-diagonal matrix.

Point 31. The method of point 26, wherein a codeword of code C comprises n groups of t elements, and further wherein any single erased codeword chunk within a group may be repaired as linear combination of other t−1 chunks of the same group.

Point 32. The method of point 26, wherein erased codeword chunk are reconstructed by multi-stage decoding, and further wherein each decoding stage comprises decoding in one inner code and one outer code, where correction capability of employed inner codes increase with stage index and stages are terminated upon recovering of all erasures within the codeword.

Point 33. The method of point 32, wherein an inner code in each subsequent stage has higher minimum distance, than an inner code employed in previous stage.

Point 34. The method of point 26, wherein dimensions of outer codes $k_i$ divided by respective length multipliers $b_i$ constitute non-decreasing sequence, that is $k_0/b_0 \leq k_1/b_1 \leq \ldots \leq k_{h-1}/b_{h-1}$.

Point 35. The method of point 34, wherein outer codes are a maximum distance separable codes, e.g., Reed-Solomon codes.

Point 36. The method of point 26, wherein inner codes are nested codes of the same length and with maximized minimum distances.

Point 37. The method of point 36, wherein inner codes are a maximum distance separable codes, e.g., Reed-Solomon codes.

Point 38. The method of point 36 and 34, wherein inner codes are binary linear block codes with maximum possible minimum distances $w_i$ and length multipliers $b_i$ are such that $w_0 < w_1 < \ldots < w_{h-1}$.

Point 39. The method of point 26 and 29 or 30, wherein updating of several information chunks, corresponding to the same s×s submatrix of the block-diagonal matrix, results in no more than N−K+s updated codeword chunks, where N is the length and K is the dimension of employed error-correction code.

Point 40. The method of point 26 and 29 or 30, wherein retrieval of several information chunks, corresponding to the same s×s submatrix of the block-diagonal matrix requires s codeword chunks to be downloaded from storage nodes.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for distributing data of a plurality of files over a plurality of respective remote storage nodes, the method comprising:
    splitting into segments, by one or more processors configured to execute code stored in non-transitory processor readable media, the data of the plurality of files;
    encoding, by the one or more processors, each segment into a number of codeword chunks, wherein none of the codeword chunks contains any of the segments;
    packaging each codeword chunk with at least one encoding parameter and identifier;
    generating, by the one or more processors, metadata for at least one file of the plurality of files and metadata for related segments of the at least one file, wherein the metadata for the at least one file contains information to reconstruct the at least one file from the segments, and metadata for the related segments contains information for reconstructing the related segments from corresponding packages;
    encoding, by the one or more processors, the metadata into at least one package, wherein the encoding corresponds to a respective security level and a protection against storage node failure;
    reducing retrieval latency by computing: i) availability coefficients for storage nodes using statistical data, wherein each availability coefficient characterizes predicted average download speed for a respective storage node; and ii) relevance coefficients for codeword positions;
    assigning, by the one or more processors, a plurality of packages to remote storage nodes, wherein the step of assigning corresponds to optimized workload distribution and available network bandwidth, including as a function of at least the availability coefficients and the relevance coefficients;
    transmitting, by the one or more processors, each of the packages to at least one respective storage node; and
    retrieving, by the one or more processors, at least one of the plurality of files, as a function iteratively accessing and retrieving the packages of metadata and file data.

2. The method of claim 1, wherein the step of splitting into segments provides data within a respective segment that comprises a part of one individual file or several files.

3. The method of claim 2, further comprising aggregating a plurality of files for a segment as a function of minimizing a difference between segment size and a total size of embedded files, and a likelihood of joint retrieval of embedded files.

4. The method of claim 1, wherein the step of encoding each segment includes deduplication as a function of hash-based features of the file.

5. The method of claim 1, wherein the step of encoding each segment includes encryption, wherein at least one segment is encrypted entirely with an individual encryption key.

6. The method of claim 5, wherein the encryption key is generated as a function of data being encrypted.

7. The method of claim 5, wherein each of a plurality of respective individual encryption keys is encrypted with a respective key encryption key and distributed over a respective storage node, wherein each respective key encryption key is generated using a password-based key derivation function.

8. The method of claim 1, wherein the step of encoding each segment includes encryption, wherein at least one segment is partitioned into pieces, wherein each piece is separately encrypted, and further wherein a number of encryption keys per segment ranges from one to the number of pieces.

9. The method of claim 1, wherein the step of encoding each segment comprises erasure coding of mixing degree S, wherein codeword chunks are produced from information chunks using a linear block error correction code, and mixing degree S requires at least S codeword chunks to reconstruct any information chunk.

10. The method of claim 9, wherein respective erasure coding techniques are used for data segment encoding and metadata encoding, such that metadata is protected from at least storage node failure.

11. The method of claim 1, wherein the step of assigning packages to remote storage nodes minimizes retrieval latency for a group of related segments.

12. The method of claim 1, wherein a relevance coefficient is a function of information representing an employed erasure correction coding scheme and significance of the respective codeword position for data retrieval.

13. The method of claim 1, wherein metadata for a file and metadata for related segments is divided into two parts, in which one part is individually packed in packages and another part is appended to packages containing respective encoded data segments.

14. The method of claim 1, further comprising arranging temporary storage of file data within a local cache by:
    operating over compound blocks of data;
    dividing memory space into regions with compound blocks of equal size;
    employing a file structure to optimize file arrangement within the local cache; and
    performing garbage collection to arrange free compound blocks.

15. The method of claim 14, wherein arranging temporary storage of file data within a local cache further includes cache optimization employing information representing a file structure.

16. The method of claim 15, wherein cache optimization is simplified by classifying files based on respective a plurality of categories of access patterns, and employing respective cache management strategy for similarly categorized files.

* * * * *